US008636969B2

(12) United States Patent
Weston et al.

(10) Patent No.: US 8,636,969 B2
(45) Date of Patent: Jan. 28, 2014

(54) EMM19STAR NOVEL ZEOLITIC IMIDAZOLATE FRAMEWORK MATERIAL, METHODS FOR MAKING SAME, AND USES THEREOF

(71) Applicant: ExxonMobil Research & Engineering Company, Annandale, NJ (US)

(72) Inventors: Simon Christopher Weston, Annandale, NJ (US); Mobae Afeworki, Phillipsburg, NJ (US); Zheng Ni, Annandale, NJ (US); John Zengel, Clinton, NJ (US); David Lawrence Stern, Fairfax, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/838,186

(22) Filed: Mar. 15, 2013

(65) Prior Publication Data

US 2013/0259792 A1    Oct. 3, 2013

Related U.S. Application Data

(60) Provisional application No. 61/618,057, filed on Mar. 30, 2012.

(51) Int. Cl.
*B01J 29/00* (2006.01)
*B01D 53/02* (2006.01)
*B01D 53/14* (2006.01)

(52) U.S. Cl.
USPC ........ 423/210; 423/351; 423/437.1; 423/700; 548/108; 502/60; 502/62; 95/90; 95/116; 95/128; 95/138; 95/127; 95/140; 95/137; 95/136; 95/139; 95/143

(58) Field of Classification Search
USPC ............... 423/210, 351, 437.1, 700; 548/108; 502/60, 62; 95/90, 116, 128, 138, 127, 95/140, 137, 136, 139, 143
See application file for complete search history.

(56) References Cited

U.S. PATENT DOCUMENTS

| 8,540,802 | B2* | 9/2013 | Yaghi et al. | ..................... 95/128 |
| 2007/0202038 | A1 | 8/2007 | Yaghi et al. | |
| 2009/0211440 | A1 | 8/2009 | Reyes et al. | |
| 2009/0211441 | A1 | 8/2009 | Reyes et al. | |
| 2009/0214407 | A1* | 8/2009 | Reyes et al. | .................... 423/230 |
| 2009/0216059 | A1 | 8/2009 | Reyes et al. | |
| 2010/0132549 | A1* | 6/2010 | Yaghi et al. | ..................... 95/128 |
| 2010/0307336 | A1 | 12/2010 | Ni et al. | |
| 2012/0222555 | A1* | 9/2012 | Gupta et al. | ..................... 95/136 |
| 2013/0023402 | A1* | 1/2013 | Yaghi et al. | ..................... 502/62 |

FOREIGN PATENT DOCUMENTS

WO    2008140788 A1    11/2008
WO    2010141310 A1    12/2010

OTHER PUBLICATIONS

Xiaochun et al., "[Zn(bim)2] • (H20)1.67: A metalorganic open-framework with sodalite topology", Chinese Science Bulletin, 2003, 48 (15), pp. 1531-1534.
Morris et al., "A Combined Experimental-Computational Study on the Effect of Topology on Carbon Dioxide Adsorption in Zeolitic Imidazolate Frameworks", J. Phys. Chem. C 2012, 116, pp. 24084-24090.
Bloch et al., "Hydrocarbon Separations in a Metal-Organic Framework with Open Iron(II) Coordination Sites", Science, 2012, 335 (6076), pp. 1606-1610.
Kim et al., "Postsynthetic Ligand Exchange as a Route to Functionalization of 'Inert' Metal-Organic Frameworks", Chemical Science, vol. 3, 2012, pp. 126-130.
Burnett et al., "Stepwise Synthesis of Metal-Organic Frameworks: Replacement of Structural Organic Linkers", Journal of the American Chemical Society, vol. 133, 2011, pp. 9984-9987.
Park et al., "Exceptional Chemical and Thermal Stability of Zeolitic Imidazolate Frameworks", Proceedings of the National Academy of Sciences of U.S.A., vol. 103, 2006, pp. 10186-10191.
Hayashi et al., "Zeolite A Imidazolate Frameworks", Nature Materials, vol. 6, 2007, pp. 501-506.
Banerjee et al., "High-Throughput Synthesis of Zeolitic Imidazolate Frameworks and Application to CO2 Capture", Science, vol. 319, 2008, pp. 939-943; ISSN: 1095-9203.
Wang et al., "Colossal Cages in Zeolitic Imidazolate Frameworks as Selective Carbon Dioxide Reservoirs", Nature, vol. 453, 2008, pp. 207-212.
Banerjee et al., "Control of Pore Size and Functionality in Isoreticular Zeolitic Imidazolate Frameworks and their Carbon Dioxide Selective Capture Properties", Journal of the American Chemical Society, vol. 131, 2009, pp. 3875-3877.
Morris et al., "A Combined Experimental-Computational Investigation of Carbon Dioxide Capture in a Series of Isoreticular Zeolitic Imidazolate Frameworks", Journal of the American Chemical Society, vol. 132, 2010, pp. 11006-11008.
Phan et al., "Synthesis, Structure, and Carbon Dioxide Capture Properties of Zeolitic Imidazolate Frameworks", Accounts of Chemical Research, vol. 43, 2010, pp. 58-67.
Morris et al., "Crystals as Molecules: Postsynthesis Covalent Functionalization of Zeolitic Imidazolate Frameworks", Journal of the American Chemical Society, vol. 130, 2008, pp. 12626-12627
Ockwig et al., "Reticular Chemistry: Ocurrence and Taxonomy of Nets and Grammar for the Design of Frameworks", Accounts of Chemical Research, vol. 38, 2005, pp. 176-182.
Seoane et al., "Insight into the crystal synthesis, activation and application of ZIF-20", The Royal Society of Chemistry Advances, vol. 1, 2011, pp. 917-922.

(Continued)

*Primary Examiner* — Timothy Vanoy
(74) *Attorney, Agent, or Firm* — David M. Weisberg

(57) ABSTRACT

A method is provided for forming a zeolitic imidazolate framework composition using at least one reactant that is relatively insoluble in the reaction medium. Also provided herein is a material made according to the method, designated either as EMM-19 or as EMM-19*, and a method of using same to adsorb and/or separate gases, such as carbon dioxide.

32 Claims, 26 Drawing Sheets

(56) References Cited

OTHER PUBLICATIONS

Beldon, P.J. et al., "Rapid room-temperature synthesis of zeolitic imidazolate frameworks by using mechanochemistry", Angew. Chem. Int. Ed., Dec. 10, 2010, pp. 9640-9643, vol. 49, No. 50, Wiley-VCH, Weinheim.

Hayashi, Hideki et al., "Zeolite A imidazolate frameworks", Nature Materials, Jul. 1, 2007, pp. 501-506, vol. 6, No. 7, Nature Publishing Group.

Zhu, Al-Xin et al., "Zeolitic metal azolate frameworks (MAFs) from ZnO/Zn(OH)2 and monoalkyl-substituted imidaoles and 1,2,4-triazoles: Efficient syntheses and properties", Microporous and Mesoporous Materials, Nov. 28, 2011, pp. 42-49, vol. 157, No. 28, Elsevier, Inc.

Banerjee, Rahul, et al., "High-Throughput Synthesis of Zeolitic Imidazolate Frameworks and Application of Co2 Capture", Science, Feb. 15, 2008, pp. 939-943, vol. 319, No. 5865, American Assoc. for the Advancement of Science, Washington, D.C.

Park, Kyo Sung et al., "Exceptional chemical and thermal stability of zeolitic imidazolate frameworks", Proceedings of the National Academy of Sciences, Jul. 5, 2006, p. 10187, vol. 103, No. 27, PNAS, Nat'l. Academy of Sciences.

Huang, Xiao-Chun et al., "Ligand-Directed Strategy for Zeolite-Type Metal-Organic Frameworks: Zinc(II) Imidazolates with Unusual Zeolitic Topologies", Angew. Chem. Int. Ed., Feb. 27, 2006, pp. 1557-1559, vol. 45, No. 10, Wiley-VCH, Weinheim.

Lin, Jian-Bin et al., "Solvent/additive-free synthesis of porous/zeolitic metal azolate frameworks from metal oxide/ hydroxide", Chem. Commun., 2011, p. 9185-9187, vol. 47, Royal Society of Chemistry.

International Search Report with Written Opinion for PCT/US2013/034318 dated Oct. 9, 2013.

* cited by examiner

EMM19STAR NOVEL ZEOLITIC IMIDAZOLATE FRAMEWORK MATERIAL, METHODS FOR MAKING SAME, AND USES THEREOF

CROSS-REFERENCE TO RELATED APPLICATIONS

This application claims the benefit of U.S. Ser. No. 61/618,057, filed Mar. 30, 2012, the entire contents of which are hereby incorporated by reference.

This application is also related to two other co-pending U.S. applications, filed on even date herewith and entitled "Linker Exchange in Zeolitic Imidazolate Frameworks" and "EMM-19: Novel Zeolitic Imidazolate Framework Material, Methods for Making Same, and Uses Thereof", respectively, the entire contents of each of which are also incorporated by reference herein.

FIELD OF THE INVENTION

This invention relates to porous crystalline materials, their synthesis and their use.

BACKGROUND OF THE INVENTION

One known family of porous crystalline materials are zeolitic materials, which are based on the 3-dimensional, four-connected framework structure defined by corner-sharing [TO$_4$] tetrahedra, where T is any tetrahedrally coordinated cation. Among the known materials in this family are silicates that contain a three-dimensional microporous crystal framework structure of [SiO$_4$] corner sharing tetrahedral units, aluminosilicates that contain a three-dimensional microporous crystal framework structure of [SiO$_4$] and [AlO$_4$] corner sharing tetrahedral units, aluminophosphates that contain a three-dimensional microporous crystal framework structure of [AlO$_4$] and [PO$_4$] corner sharing tetrahedral units, and silicoaluminophosphates (SAPOs), in which the framework structure is composed of [SiO$_4$], [AlO$_4$] and [PO$_4$] corner sharing tetrahedral units. Included in the zeolitic family of materials are over 200 different porous framework types, many of which have great commercial value as catalysts and adsorbents.

Zeolitic imidazolate frameworks or ZIFs have properties similar to inorganic zeolitic materials. ZIFs are based on [M(IM)$_4$] tetrahedral bonds in which IM is an imidazolate type linking moiety and M is a transition metal. These materials are generally referred to as zeolitic imidazolate frameworks or ZIFs since the angle formed by imidazolates (IMs) when bridging transition metals is similar to the 145° angle of the Si—O—Si bond in zeolites. ZIF counterparts of a large number of known zeolitic structures have been produced. In addition, porous framework types, hitherto unknown to zeolites, have also been produced. Discussion of this research can be found in, for example, the following publications from Yaghi and his co-workers: "Exceptional Chemical and Thermal Stability of Zeolitic Imidazolate Frameworks", *Proceedings of the National Academy of Sciences of U.S.A.*, Vol. 103, 2006, pp. 10186-91, "Zeolite A Imidazolate Frameworks", *Nature Materials*, Vol. 6, 2007, pp. 501-6, "High-Throughput Synthesis of Zeolitic Imidazolate Frameworks and Application to CO$_2$ Capture", *Science*, Vol. 319, 2008, pp. 939-43, "Colossal Cages in Zeolitic Imidazolate Frameworks as Selective Carbon Dioxide Reservoirs", *Nature*, Vol. 453, 2008, pp. 207-12, "Control of Pore Size and Functionality in Isoreticular Zeolitic Imidazolate Frameworks and their Carbon Dioxide Selective Capture Properties". *Journal of the American Chemical Society*, Vol. 131, 2009, pp. 3875-7, "A Combined Experimental-Computational Investigation of Carbon Dioxide Capture in a Series of Isoreticular Zeolitic Imidazolate Frameworks", *Journal of the American Chemical Society*, Vol. 132, 2010, pp. 11006-8, and "Synthesis, Structure, and Carbon Dioxide Capture Properties of Zeolitic Imidazolate Frameworks", *Accounts of Chemical Research*, Vol. 43, 2010, pp. 58-67.

Much of this work on ZIF structures is summarized in U.S. Patent Application Publication No. 2007/0202038, the entire contents of which are incorporated herein by reference. In particular, the '038 publication discloses a zeolitic framework, comprising the general structure: M-L-M, wherein M comprises a transition metal and L is a linking moiety comprising a structure selected from the group consisting of I, II, III, or any combination thereof:

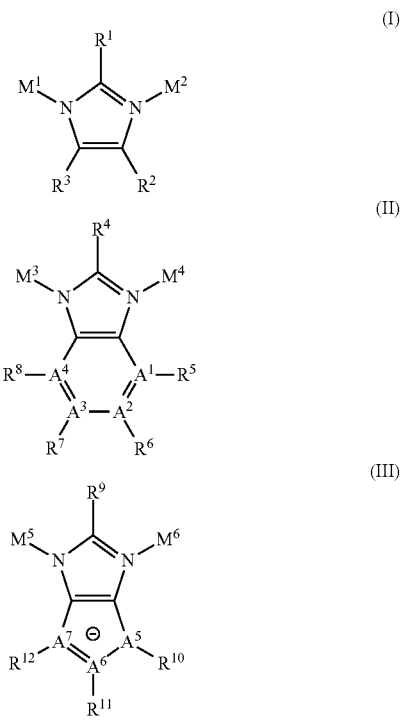

wherein $A^1$, $A^2$, $A^3$, $A^4$, $A^5$, $A^6$, and $A^7$ can be either C or N, wherein $R^5$-$R^8$ are present when $A^1$ and $A^4$ comprise C, wherein $R^1$, $R^4$ or $R^9$ comprise a non-sterically hindering group that does not interfere with M, wherein $R^2$, $R^3$, $R^5$, $R^6$, $R^7$, $R^8$, $R^{10}$, $R^{11}$, and $R^{12}$ are each individually an alkyl, halo-, cyano-, nitro-, wherein $M^1$, $M^2$, $M^3$, $M^4$, $M^5$, and $M^6$ each comprise a transition metal, wherein when the linking moiety comprises structure III, $R^{10}$, $R^{11}$, and $R^{12}$ are each individually electron withdrawing groups.

In a more recent work by Ni et al., the structure and synthesis of mixed-valence ZIFs are disclosed in U.S. Patent Application Publication No. 2010/0307336. Specifically, the authors disclose in the '336 publication a porous crystalline material having a tetrahedral framework comprising a general structure. $M^1$-IM-$M^2$, wherein $M^1$ comprises a metal having a first valency, wherein $M^2$ comprises a metal having a second valency different from said first valency, and wherein IM is imidazolate or a substituted imidazolate linking moiety. Such materials can sometimes be described as iso-structural to known ZIF materials.

ZIF materials may be conventionally prepared by dissolving sources of metal ions and sources of imidazolate or substituted imidazolate linkers in an appropriate solvent to form a reaction mixture and then maintaining this reaction mixture under conditions sufficient to form the crystalline ZIF materials as a precipitate. For example, in U.S. Patent Applicaton Publication No. 2007/0202038, it is stated that ZIF materials may be prepared using solvothermal techniques. These techniques may involve combining a hydrated metal salt (e.g., nitrate) and an imidazole-type organic compound in an amide solvent, such as N,N-diethylformamide (DEF), followed by heating (e.g., to 85-150° C.) the resultant solutions for 48-96 hours to precipitate with a zeolitic framework.

One problem with the precipitation or solvothermal method for forming ZIF materials is that it affords one little or no control over the framework type of the zeolitic material obtained. For example, as reported in the literature, when a ZIF is crystallized from a solution of zinc ions and 5-azabenzimidazole molecules, the resulting ZIF material (i.e., ZIF-22) tends to have the LTA framework type; see, for example, the aforementioned article "Zeolite A Imidazolate Frameworks", *Nature Materials*, Vol. 6, 2007, pp. 501-6 by Yaghi and his co-workers.

Another problem with the precipitation or solvothermal method for forming ZIF materials is that it may be difficult or impossible to incorporate a desired functional group on an imidazolate-type linker into a ZIF of the desired framework type. As noted above, conventional synthesis of ZIF-22 results in a LTA structure having a 5-azabenzimidazolate linker. The 5-aza group on the linker has functionality as a Lewis base, so it could have affinity for a gas molecule with an electrophilic center, such as carbon dioxide. However, ZIF-22 is not exceptional among ZIF materials in terms of $CO_2$ adsorption; see Example 5 of the present application and see also the $CO_2$ adsorption data, reported in the aforementioned *Nature Materials* 2007 article, for ZIF-20, which is the purine counterpart of ZIF-22 (i.e., having "aza" functional groups at both the 5- and 7-positions instead of only at the 5-position. In fact, neither ZIF-22 nor ZIF-20 was even mentioned by Yaghi and his co-workers when they reviewed the $CO_2$ adsorption performance of ZIFs in "Synthesis, Structure, and Carbon Dioxide Capture Properties of Zeolitic Imidazolate Frameworks", *Accounts of Chemical Research*, Vol. 43, 2010, pp. 58-67. Without being bound by theory. ZTF-22's mediocre performance in $CO_2$ adsorption is believed to be a result of the 5-azabenzimidazolate linkers within the structure not being close enough to each other, which in turn can be due to the presence of large cages in the framework type LTA (i.e. small β cages separated by large α cages). Therefore, in order to enhance $CO_2$ adsorption, it would be extremely desirable to have a ZIF composition that has the 5-azabenzimidazolate linker and a reduction in or absence of large cages, e.g. the framework type SOD (i.e., only small β cages), which has not been produced by the conventional method despite intense study on this synthesis system.

Accordingly, it would be desirable to provide methods for preparing ZIF materials affording greater control over the resulting structure, for example, affording the possibility of incorporating desired functional groups into ZIF materials having a desired framework type.

SUMMARY OF THE INVENTION

There is provided herein a method for, inter alia, obtaining improved ZIF materials with desired combinations of linker and framework type.

One aspect of the invention relates to a zeolitic imidazolate framework composition with an SOD framework type, wherein the zeolitic imidazolate framework structure is capable of sorbing, at a temperature of ~28° C.: (i) at least 0.60 mmol of $CO_2$ per gram of zeolitic imidazole framework composition at a $CO_2$ partial pressure of ~75 Torr; (ii) at least 0.75 mmol of $CO_2$ per gram of zeolitic imidazole framework composition at a $CO_2$ partial pressure of ~100 Torr; (iii) at least 1.15 mmol of $CO_2$ per gram of zeolitic imidazole framework composition at a $CO_2$ partial pressure of ~200 Torr; and/or (iv) at least 0.35 mmol of $CO_2$ per gram of zeolitic imidazole framework composition at a $CO_2$ partial pressure of ~39 Torr.

Another aspect of the invention (that can be related to the first aspect) relates to a zeolitic imidazolate framework composition having an empirical formula. $Zn(5\text{-azabenzimidazolate})_2$, wherein the zeolitic imidazolate framework structure is capable of sorbing, at a temperature of ~28° C.: (i) at least 0.60 mmol of $CO_2$ per gram of zeolitic imidazole framework composition at a $CO_2$ partial pressure of ~75 Torr; (ii) at least 0.75 mmol of $CO_2$ per gram of zeolitic imidazole framework composition at a $CO_2$ partial pressure of ~100 Torr: (iii) at least 1.15 mmol of $CO_2$ per gram of zeolitic imidazole framework composition at a $CO_2$ partial pressure of ~200 Torr; and/or (iv) at least 0.35 mmol of $CO_2$ per gram of zeolitic imidazole framework composition at a $CO_2$ partial pressure of ~39 Torr.

Still another aspect of the invention (that can be related to either or both of the first two aspects) relates to a porous crystalline material having an empirical formula $Zn(5\text{-azabenzimidazolate})_2$, exhibiting an SOD framework type, and exhibiting an x-ray diffraction pattern with peaks defined by the d-spacing ranges and relative intensity ranges described in any one of Table 1b, Table 1d, Table 7b, Table 8b, and Table 9b.

Yet another aspect of the invention relates to a method of adsorbing a gas comprising contacting the gas (e.g., comprising hydrogen, nitrogen, oxygen, a noble gas, carbon monoxide, carbon dioxide, sulfur dioxide, sulfur trioxide, hydrogen sulfide, ammonia, a hydrocarbon, or an amine) with a porous crystalline material according to any of the three initial aspects of the invention.

Yet still a further aspect of the invention (that can be related to the previous aspect) relates to a method of separating a gas from a fluid stream containing the gas (e.g., comprising hydrogen, nitrogen, oxygen, a noble gas, carbon monoxide, carbon dioxide, sulfur dioxide, sulfur trioxide, hydrogen sulfide, ammonia, a hydrocarbon, or an amine) comprising contacting the fluid stream with a porous crystalline material according to any of the three initial aspects of the invention.

Even a further aspect of the invention relates to a method for forming a zeolitic imidazolate framework composition, said method comprising the steps of: (a) mixing together a reaction medium, a source of a imidazolate or a substituted imidazolate reactant, IM, and a reactant source of metals $M^1$ and $M^2$ to form a synthesis mixture, wherein $M^1$ and $M^2$ comprise the same or different metal cations, at least one of which reactants is relatively insoluble in the reaction medium itself and in the synthesis mixture; (b) maintaining the synthesis mixture having at least one relatively insoluble reactant under conditions sufficient to form a zeolitic imidazolate framework composition having a tetrahedral framework comprising a general structure, $M^1\text{-IM-}M^2$; and (c) treating the zeolitic imidazolate framework composition under conditions sufficient to stably reduce its unit cell volume.

DETAILED DESCRIPTION OF THE EMBODIMENTS

Figure 1:
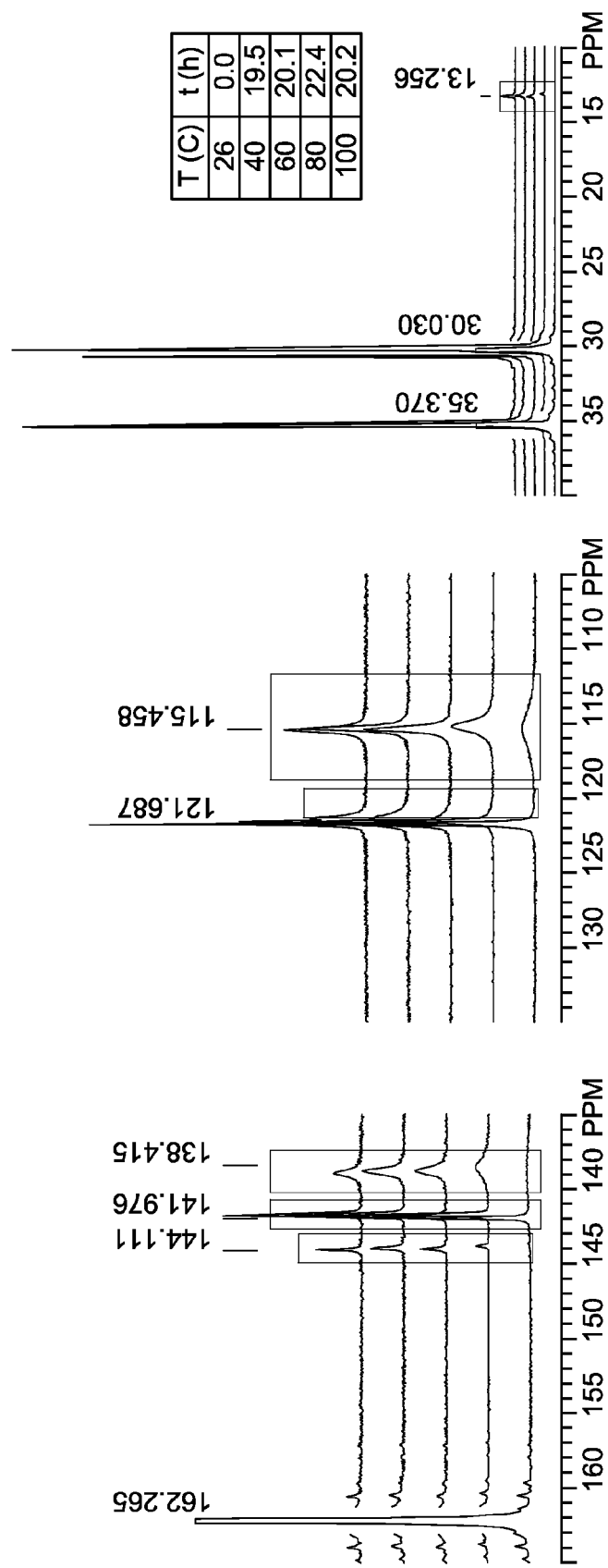
FIG. 1 shows liquid-state 125 MHz $^{13}C$ NMR spectra for five materials prepared in Example 1.

Disclosed herein is an alternative method for making certain porous crystalline materials known in the art as zeolitic imidazolate framework (ZIF) compositions. These ZIF materials may be described as having a tetrahedral framework comprising a general structure, $M^1$-IM-$M^2$, wherein $M^1$ and $M^2$ comprise the same or different metal, and wherein IM is an imidazolate or a substituted imidazolate linking moiety. Though the term "imidazolate" is used to describe IM, $IM^a$, and $IM^b$ herein, it is noted that, at various stages in the methods according to the invention, the relevant IM/$IM^a$/$IM^b$ may be an imidazole (neutral charge) at particular times in the reaction sequence(s); nevertheless, the fact that these components are described using the term "imidazolate" is merely for convenience and uniformity and should be understood to encompass both situations where they are holding/delocalizing a charge and where they are neutral. In the method described herein, the sources of $M^1$ and $M^2$ and/or the source(s) of linking moiety (IM) can be at least partially in solid form, e.g., as a slurry in a liquid medium (solvent/solvent system), whereas conventional ZIF synthesis techniques usually require solvation/solution of reactants. Also disclosed herein are novel ZIF materials designated herein as EMM-19 and EMM-19*, and methods of using EMM-19 and/or EMM-19* to sorb and/or separate gases, such as carbon dioxide.

All publications specifically referred to herein with respect to their relevant teachings concerning aspects of the invention (s) disclosed herein are hereby incorporated by reference in their entirety, as well as with specificity to the element(s) for which they were cited herein.

A. Introduction

Typical synthetic routes for ZIF materials disclosed in the literature are summarized below in Scheme 1, wherein M is a transition metal, typically in the form of a divalent cation, such as $Zn^{2+}$, $Co^{2+}$, $Fe^{2+}$, present in a metal salt starting material that is typically soluble in the synthesis solvent, wherein IM is imidazolate or a substituted imidazolate linker, wherein H-IM is the corresponding neutral molecule of IM, i.e., the protonated form of IM, wherein $M^1$ and $M^2$ are two metals of different valency, wherein $M^1$ is typically a monovalent cation, such as $Li^+$, $Cu^+$, $Ag^+$, present in a metal salt starting material that is typically soluble in the synthesis solvent, and wherein $M^2$ is typically a trivalent metal, such as $B^{3+}$, $Al^{3+}$, $Ga^{3+}$, present in an anionic mononuclear complex tetrakis(1-imidazolyl)metallate with an overall −1 charge. These synthetic routes are referred to herein as "the conventional method".

Scheme 1

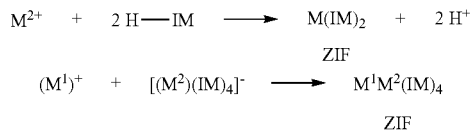

An alternate route of ZIF synthesis is described herein. This alternate route is based on the transition metal reactant(s) and/or the imidazolate reactant being present in a solvent medium in a relatively insoluble form, such as a solid form. One example of this alternate route is based on exchanging the IM linkers in an existing ZIF material, as shown below in Scheme 2, wherein $ZIF^a$ is a relatively insoluble source of transition metal(s) and $ZIF^b$ is a product, wherein M is typically a divalent transition metal, and wherein $M^1$ and $M^2$ are typically a monovalent and a trivalent metal, respectively. These alternate synthetic routes are referred to herein as "the exchange method".

Scheme 2

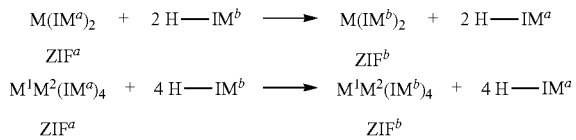

It should be understood that the $H\text{-}IM^b$ as shown in Scheme 2 above may be replaced, in whole or in part, by other sources of $IM^b$, such as salts of $IM^b$.

By employing an existing ZIF as a relatively insoluble starting material, the exchange method can potentially overcome some of the intrinsic limitations of the conventional method for ZIF synthesis. For example, in the conventional method, the introduction of functional group(s) into an IM linker could lead to interactions between these moieties and could therefore cause the formation of specific oligomeric structures in the reaction mixture, which in turn could limit the framework types of ZIF product. However, such limitation(s) could be circumvented by exchanging such a functionalized linker into a pre-formed ZIF with a desired framework type. Additionally or alternately, in a conventional synthesis, the use of a functionalized IM linker with substituent(s) participating in the coordination to metal ions could disrupt the coordination pattern needed for the formation of ZIF frameworks, which could thus lead to non-porous framework structures or even discrete molecular complexes. However, without being bound by theory, the interference of coordinating functional groups would be expected to be greatly reduced when such a functionalized linker is exchanged into a pre-formed ZIF structure. Further additionally or alternately, the deprotonation of H-IM, which may be a key factor controlling the kinetics and thermodynamics of ZIF formation, can be conveniently tuned in the exchange method by judicious choice of IM linker in the ZIF starting material. Still further additionally or alternately, in the conventional method, use of relatively soluble components can result in formation of certain (equilibrium) framework structures, whereas limiting the availability of certain reactants can allow achievement of different (non-equilibrium) framework structures, which can (optionally, sometimes preferably) result in desirable and/or unexpected characteristics.

One specific example of the intrinsic limitations of the conventional method for ZIF synthesis can be found in the aforementioned "Zeolite A Imidazolate Frameworks", *Nature Materials*, Vol. 6, 2007, pp. 501-6, by Yaghi et al. This article reports a systematic study on three conventional ZIF syntheses using purine, 5-azabenzimidazole, and 4-azabenzimidazole as organic linker, respectively (Scheme 3). After exploring a wide synthesis space, including linker/metal molar ratio (from 5 to 10), metal concentration (from 0.05 to 0.2 mol/L), metal source (zinc nitrate and cobalt nitrate), crystallization temperature (from 65° C. to 150° C.), crystallization time (from 1 to 3 days), and addition of base (2 mol/L dimethylamine solution in methanol), the authors observed that the system employing 4-azabenzimidazole linkers always yielded a non-porous ZIF with the framework type DIA (short for diamond), whereas the ones employing purine and 5-azabenzimidazole linkers always produced porous ZIF materials with the framework type LTA (short for Linde type A). The result was corroborated in a recent comprehensive review article by Yaghi et al.; see Table 1 in "Synthesis, Structure, and Carbon Dioxide Capture Properties of Zeolitic Imidazolate Frameworks", *Accounts of Chemical Research*, Vol. 43, 2010, pp. 58-67. In the *Nature Materials* 2007 article, the authors attributed the finding, based on crystallographic data, to favorable intermolecular interactions resulting from the polarity of C—N bond at the 5- and 6-positions in purine and 5-azabenzimidazole (Scheme 4) and the lack thereof in 4-azabenzimidazole. Such attractive interactions were theorized to stabilize double 4-ring (D4R), a crucial building unit for the framework type LTA. All of these publications describe situations in which metal sources (such as metal nitrates) and imidazolates that are relatively soluble in a solvent medium were utilized as reactants. Perhaps because of the difficulties experienced in attaining reliable and useful ZIF materials even using soluble preparations, there has been little if any exploration of metal and/or imidazolate sources that are relatively insoluble in the solvent medium.

Scheme 3

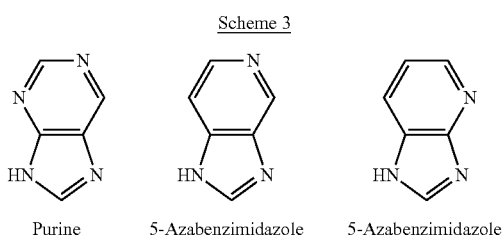 [SMILES: c1ncc2nc[nH]c2n1 ; c1cc2[nH]cnc2cn1 ; c1cnc2nc[nH]c2c1]

Purine     5-Azabenzimidazole     5-Azabenzimidazole

Scheme 4

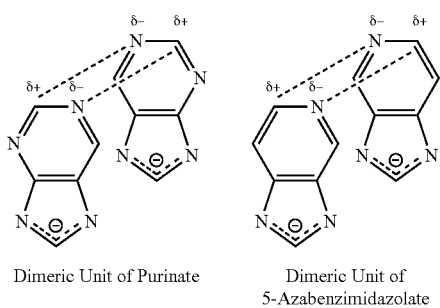

Dimeric Unit of Purinate     Dimeric Unit of
5-Azabenzimidazolate

As shown herein, by using the exchange method, it can be possible to circumvent the formation of D4R units and use 5-azabenzimidazole to synthesize a new ZIF material with a framework type different from that obtained by the conventional method (a "non-equilibrium" framework). i.e., the framework type SOD (short for sodalite) instead of LTA, which is a framework type wherein β-cages are connected by directly sharing 4-rings rather than through D4R units. Specifically, one example of this non-equilibrium framework type can be achieved by exchanging 5-azabenzimidazole into a well-known, commercially-available ZIF-8 material, a Zn(2-methylimidazolate)$_2$ with the framework type SOD. The new composition disclosed herein, i.e., a Zn(5-azabenzimidazolate)$_2$ with the non-equilibrium framework type SOD, is referred to herein as EMM-19.

Additionally, it has been unexpectedly found that, under certain conditions, relatively insoluble reactants can also be reacted to form ZIF materials whose framework type is disparate from the framework type made using relatively soluble reactants, even though the chemical composition of the respective materials would be otherwise identical. For instance, though zinc nitrate and 5-azabenzimidazole can be solubly reacted in a combination of N,N-dimethylformamide and triethylamine to form Zn(5-azabenzimidazolate)$_2$ with the (equilibrium) framework type LTA (i.e., ZIF-22; see, e.g., Example 4 below), certain particle sizes of relatively insoluble zinc oxide can be combined with 5-azabenzimidazole in N,N-dimethylformamide to form Zn(5-azabenzimidazolate)$_2$ with the non-equilibrium framework type SOD (i.e. EMM-19: see, e.g., Examples 13, 16-24, 26, and 28 below). Reactants that are "relatively insoluble", as used herein, in a solvent/solvent system/reaction medium should be understood to exhibit a substantially visible particulate appearance in the reaction medium (e.g. appear like a slurry), and/or should be understood to have less than 50% solubility (e.g., less than about 60% solubility, less than about 70% solubility, less than about 75% solubility, less than about 80% solubility, less than about 85% solubility, less than about 90% solubility, or less than about 95% solubility) in the solvent/ solvent system/reaction medium at the reaction conditions. As used herein, individual reactants are defined to be less than 50% soluble, for example, if less than 50% by weight of each reactant is individually dissolved in the solvent/solvent system/reaction medium after ~1 hour of moderate stirring (e.g., at ~10-40 rpm) at the reaction conditions, or conversely if at least 50% by weight of each reactant remains undissolved in the solvent/solvent system/reaction medium after ~1 hour of moderate stirring (e.g., at ~10-40 rpm) at the reaction conditions.

EMM-19 has been found to exhibit desirable gas adsorption properties. The uses of ZIFs for gas storage and separation have been documented in a PCT Publication by Yaghi and co-workers (WO 2008/140788, entitled "Adsorptive Gas Separation of Multi-Component Gases") and a series of publications by Reyes, Ni, and co-workers (U.S. Patent Application Publication Nos. 2009/0211440 entitled "Separation of Hydrogen from Hydrocarbons Utilizing Zeolitic Imidazolate Framework Materials"; 2009/0211441 entitled "Separation of Carbon Dioxide from Methane Utilizing Zeolitic Imidazolate Framework Materials"; 2009/0214407 entitled "Separation of Carbon Dioxide from Nitrogen Utilizing Zeolitic Imidazolate Framework Materials"; and 2009/0216059 entitled "Separation of Methane from Higher Carbon Number Hydrocarbons Utilizing Zeolitic Imidazolate Framework Materials"). The most striking example disclosed in the works by Reyes, Ni, and co-workers can be seen in the room-temperature $CO_2$ adsorption isotherm of ZIF-7, a Zn(benzimidazolate)$_2$ with the framework type SOD. The isotherm has a hysteretic shape and features a sharp rise in the adsorption branch starting at a low $CO_2$ partial pressure of 60 kPa (0.6 atm), which is indicative of a structural transition induced by favorable framework-$CO_2$ interactions and makes ZIF-7 a promising material for $CO_2$ separation. We have now found that, by incorporating a basic heteroatom such as nitrogen into the linker of ZIF-7, e.g., by exchanging benzimidazolate with 5-azabenzimidazolate to produce EMM-19, the framework-$CO_2$ interactions can be enhanced, and the threshold partial pressure for favorable $CO_2$ adsorption can be further reduced.

B. The Linker Exchange ZIF Synthesis Method

In a step of the exchange method described herein, a first zeolitic imidazolate framework composition can be provided or selected. The first zeolitic imidazolate framework composition ($ZIF^1$) can have a first organic linker composition ($IM^a$). Unreacted species or impurities can preferably be removed from the as-synthesized form of $ZIF^1$ prior to exchange with a second organic linker composition ($IM^b$). These unreacted species or impurities may be removed by appropriate techniques, e.g., involving washing and drying. For example, the as-synthesized form of $ZIF^1$ may be washed with a suitable solvent, such as DMF, followed by solvent exchange with methanol, acetonitrile, or the like, decanting solvent and drying, for example, under vacuum at ~250° C. A first zeolitic imidazolate framework composition sufficiently (substantially) free of unreacted species or impurities may be purchased from commercial vendors.

In another step of the method, a liquid composition comprising a second organic linker composition ($IM^b$) can be provided. The second organic linker composition may be present in a liquid composition, for example, in the form of the protonated form of the imidazolate type linker composition and/or in the form of a salt of the imidazolate type linker composition. This protonated form of the imidazolate type linker composition is referred to herein as H-$IM^b$. The second organic linker composition ($IM^b$) can be different from the first organic linker composition ($IM^a$) in many embodiments. $IM^b$ may advantageously comprise a functionality lacking in $IM^a$.

The liquid composition may comprise a solution of a second organic linker composition ($IM^b$) in a solvent. The solvent may be a polar organic solvent, such as N,N-dimethylformamide (DMF), N,N-diethylformamide (DEF), N,N-dimethylacetamide (DMAc), 1,3-dimethylpropyleneurea (DMPU), a sulfoxide (e.g., dimethylsulfoxide or DMSO), a phosphoramide (e.g., hexamethylphosphoramide), acetonitrile (MeCN), triethylamine (TEA), or a combination thereof. Alternatively, though not strictly organic, aqueous solvents such as aqueous ammonia and ethanol mixtures, can be used as solvents for the linker composition(s).

Though polar organic compounds such as N,N-dimethylformamide (DMF) are suggested as solvents herein, it should be understood that a solvent (or solvent system) useful in the methods according to the invention and/or useful in making products according to the invention should at least be able to solvate and/or solubilize the reactants to the extent necessary to allow reaction to occur at a reasonable rate (or over a reasonable reaction time). They can also typically be present in a substantially liquid phase at operating/reaction conditions (and optionally but preferably also at STP). Additionally, in the case of synthesis of certain ZIFs, the solvent system may need to include a Brønsted or Lewis base (hydrogen acceptor) component, in order for the reaction to proceed (for instance in, but not limited to, cases where one component of the solvent is not sufficiently basic). Whether that Brønsted or Lewis base component comprises a portion of the single solvent molecule itself or includes a separate component having hydrogen acceptor functionality is not necessarily critical. It should further be understood that these aspects of the solvent/solvent system may be equally applicable to "conventional" (solvothermal, etc.) syntheses as well as to the linker exchange synthesis methods detailed herein, as the aforementioned aspects can advantageously relate generally to ZIF and/or MOF synthesis reactions.

In certain embodiments, solvents (and/or solvent systems) particularly useful in the invention can additionally or alternately exhibit a relatively high vapor pressure and/or a relatively low boiling point. For instance, in some such embodiments, a relatively high vapor pressure can represent at least 2.5 kPa at about 20° C., for example at least about 3.0 kPa at about 20° C., at least about 3.5 kPa at about 20° C. at least about 4.0 kPa at about 20° C., at least about 4.5 kPa at about 20° C. at least about 5.0 kPa at about 20° C., at least about 5.5 kPa at about 20° C., at least about 6.0 kPa at about 20° C., at least about 6.5 kPa at about 20° C., at least about 7.0 kPa at about 20° C., at least about 7.5 kPa at about 20° C., at least about 8.0 kPa at about 20° C., at least about 8.5 kPa at about 20° C., at least about 9.0 kPa at about 20° C., or at least about 9.5 kPa at about 20° C. Optionally, if an upper bound on vapor pressure is needed and/or desired, the relatively high vapor pressure can be about 30 kPa or less at about 20° C., e.g., about 25 kPa or less at about 20° C., about 20 kPa or less at about 20° C., about 15 kPa or less at about 20° C., or about 10 kPa or less at about 20° C. Additionally or alternately, in some such embodiments, a relatively low boiling point can represent 99° C. or less, e.g., about 98° C. or less, about 96° C. or less, about 95° C. or less, about 93° C. or less, about 91° C. or less, about 90° C. or less, about 88° C. or less, about 86° C. or less, about 85° C. or less, about 83° C. or less, about 81° C. or less, or about 80° C. or less. Optionally, if a lower bound on boiling point is needed and/or desired (preferably, the solvent can have a boiling point above ambient temperature, so as to be in a liquid phase), the relatively low boiling point can be at least about 25° C., e.g., at least about 30° C., at least about 35° C., at least about 40° C., at least about 45° C., at least about 50° C., at least about 55° C., at least about 60° C., at least about 65° C., at least about 70° C., at least about 75° C., or at least about 80° C. One such non-limiting example of a solvent system having both a relatively low boiling point and a relatively high vapor pressure includes a mixture of acetonitrile and triethylamine.

In another step of the method, the first zeolitic imidazolate framework composition ($ZIF^1$) can be contacted with the liquid composition comprising $IM^b$. This contact may take place by combining (1) the first $ZIF^1$, (2) the solvent, and (3) a source of $IM^b$, such as H-$IM^b$, in any order. For example, $ZIF^1$ and H-$IM^b$ may first be combined, and the solvent may be added to this combination, accomplishing the simultaneous formation of a liquid composition comprising H-$IM^b$ and contact of this composition with $ZIF^1$. In a convenient embodiment, the source of $IM^b$ can first be dissolved in the solvent, and either the resulting solution can be added to $ZIF^1$ or $ZIF^1$ can be added to the solution.

The molar ratio of the first organic linker ($IM^a$) in the first ZIF ($ZIF^1$) to $IM^b$ in the contacted or combined mixture of $ZIF^1$ with the liquid mixture comprising $IM^b$ may be from 0.1 to 20. e.g., from 0.1 to 15, from 0.1 to 10, from 0.1 to 7, from 0.1 to 5, from 0.1 to 3, from 0.1 to 2, from 0.1 to 1.5, from 0.2 to 20, from 0.2 to 15, from 0.2 to 10, from 0.2 to 7, from 0.2 to 5, from 0.2 to 3, from 0.2 to 2, from 0.2 to 1.5, from 0.3 to 20, from 0.3 to 15, from 0.3 to 10, from 0.3 to 7, from 0.3 to 5, from 0.3 to 3, from 0.3 to 2, from 0.3 to 1.5, from 0.5 to 20, from 0.5 to 15, from 0.5 to 10, from 0.5 to 7, from 0.5 to 5, from 0.5 to 3, from 0.5 to 2, from 0.5 to 1.5, from 0.8 to 20, from 0.8 to 15, from 0.8 to 10, from 0.8 to 7, from 0.8 to 5, from 0.8 to 3, from 0.8 to 2, from 0.8 to 1.5, from 1 to 20, from 1 to 15, from 1 to 10, from 1 to 7, from 1 to 5, from 1 to 3, from 1 to 2, from 1 to 1.5, from 1.5 to 20, from 1.5 to 15, from 1.5 to 10, from 1.5 to 7, from 1.5 to 5, from 1.5 to 3, from 1.5 to 2, from 2 to 20, from 2 to 15, from 2 to 10, from 2 to 7, from 2 to 5, or from 2 to 3. When complete or substantially (e.g., at least 90%) complete exchange of $IM^a$ with $IM^b$ is desired, the molar ratio of $IM^b$ to H-$IM^a$ may advantageously be at least 1, e.g., at least 1.2, at least 1.5, or at least 2.

The combined mixture of $ZIF^1$ with the liquid composition comprising $IM^b$ can be maintained under conditions sufficient to achieve at least partial exchange of $IM^a$ with $IM^b$, thereby effectively converting $ZIF^1$ at least partially into $ZIF^2$. The contact may take place for a sufficient time to achieve at least partial exchange, e.g. from at least 1 hour to as much as 10 days, from 1 hour to 7 days, from 1 hour to 5 days, from 1 hour to 3 days, from 2 hours to 10 days, from 2 hours to 7 days, from 2 hours to 5 days, from 2 hours to 3 days, from 4 hours to 10 days, from 4 hours to 7 days, from 4 hours to 5 days, from 4 hours to 3 days, from 8 hours to 10 days, from 8 hours to 7 days, from 8 hours to 5 days, from 8 hours to 3 days, from 12 hours to 10 days, from 12 hours to 7 days, from 12 hours to 5 days, from 12 hours to 3 days, from 18 hours to 10 days, from 18 hours to 7 days, from 18 hours to 5 days, from 18 hours to 3 days, from 24 hours to 10 days, from 24 hours to 7 days, from 24 hours to 5 days, or from 24 hours to 3 days. The temperature of the combined mixture of $ZIF^1$ with the liquid composition comprising $IM^b$ may range, for example, from a temperature of about −78° C. (dry-ice bath temperature) to the boiling temperature of the solvent (the normal boiling point of N,N-dimethylformamide is about 153° C.), from about 0° C. (ice water bath temperature) to at least 10° C. below the boiling temperature of the solvent, or from about 15° C. to at least 15° C. below the boiling temperature of the solvent (or alternately to about 100° C.). When contact takes place in a pressurized vessel, the temperature may exceed the boiling temperature of the solvent. For example, the contact may take place at room temperature or greater, such as from about 18° C. to about 200° C. or from about 75° C. to about 150° C. In certain embodiments where complete or substantially (e.g., 90% or greater) complete exchange of $IM^a$ with $IM^b$ is desired, the time of contact may be from 20 hours to 72 hours and the temperature of contact may be from 130° C. to 150° C.

After $ZIF^1$ is exchanged with $IM^b$ to form $ZIF^2$, the $ZIF^2$ may be recovered and treated, if necessary or desired (e.g., to remove molecules from the pore space of the $ZIF^2$). This treatment may involve techniques for activating the as-synthesized form of a ZIF prepared by solvothermal methods, for example, as described in U.S. Patent Application Publication Nos. 2007/0202038 and 2009/0211440. For example, the recovered $ZIF^2$ may be washed with DMF, solvent exchanged with acetonitrile (e.g., 3 exchanges in ~3 days) and dried, for example, under vacuum at about 200° C. for ~3 hours. The dried product may then be soaked in acetonitrile, e.g., at ~75° C. for ~24 hours, followed by a final rinse with fresh acetonitrile, to produce the acetonitrile-exchanged product. Finally the acetonitrile-exchanged product may be placed under vacuum, e.g., less than about 10 mTorr at ~70° C. for about 10-18 hours, to yield the activated form of $ZIF^2$.

$M^1$ and $M^2$ may be one or more transition metals as described for ZIFs in U.S. Patent Application Publication No. 2007/0202038. Such transition metals can include, but are not necessarily limited to, Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, and Uub.

$M^1$ and $M^2$ may additionally or alternately comprise other metals. For example, as described in U.S. Patent Application Publication No. 2010/0307336, $M^1$ may be a metal having a first valency, and $M^1$ may be a metal having a second valency different from said first valency.

In one such embodiment, $M^1$ may be a monovalent metal cation, including $Li^+$, $Na^+$, $K^+$, $Cs^+$, $Rb^+$, $Cu^+$, $Ag^+$, and/or $Au^+$ (e.g., including or being $Li^+$, $Cu^+$, and/or $Ag^+$, particularly including or being $Li^+$). Additionally or alternately, in such an embodiment, $M^2$ may be a trivalent element cation, including $B^{3+}$, $Al^{3+}$, $Ga^{3+}$, $In^{3+}$, $Fe^{3+}$, $Cr^{3+}$, $Sc^{3+}$, $Y^{3+}$, and/or $La^{3+}$, wherein La is any lanthanide metal (e.g., including $B^{3+}$, $Al^{3+}$, and/or $Ga^{3+}$, particularly including $B^{3+}$).

In certain embodiments, $M^1$ and $M^2$ may both be the same. When $M^1$ and $M^2$ are both the same, they may advantageously comprise or be a transition metal, for example Zn.

The zeolitic imidazolate framework materials described herein. e.g., $ZIF^1$ and $ZIF^2$, may have a tetrahedral framework comprising a structure selected from the group consisting of IV, V, VI, or any combination thereof:

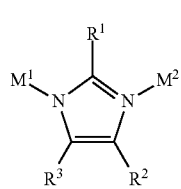

(IV)

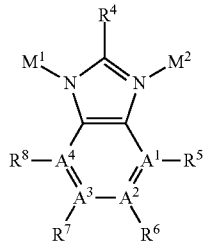

(V)

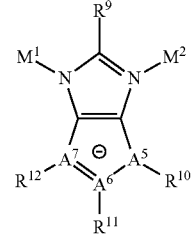

(VI)

wherein $A^1$, $A^2$, $A^3$, and $A^4$ can each independently be selected from the group of elements consisting of C, N, P, and B, and each of $A^5$, $A^6$, and $A^7$ can be either C or N; wherein $R^5$-$R^8$ can individually be present when their corresponding $A^1$-$A^4$ comprises C; wherein $R^1$, $R^4$, and/or $R^9$ may advantageously comprise a non-sterically hindering group that does not (substantially) interfere with the adjacent $M^1$ or $M^2$; wherein $R^2$ and $R^3$, as well as $R^5$, $R^6$, $R^7$, and/or $R^*$, when present, may each individually be hydrogen, alkyl, halo, cyano, or nitro; wherein $M^1$ and $M^2$ may comprise the same or different metal cation; and wherein $R^{10}$-$R^{12}$ can individually be present when their corresponding $A^5$-$A^7$ comprises C, in which case one or more of $R^{10}$-$R^{12}$ being present can optionally but advantageously be electron withdrawing groups.

In one embodiment, each of $R^1$, $R^4$, and $R^9$ can be independently selected from hydrogen, methyl, ethyl, nitro, formyl, halo, and cyano groups.

Suitable electron withdrawing groups for each of $R^{10}$, $R^{11}$, and $R^{12}$ can include, but are not necessarily limited to nitro, cyano, fluoro, and chloro groups.

According to an example of a particular embodiment, the first zeolitic imidazolate framework composition may comprise the structure of formula IV, and the second zeolitic imidazolate framework composition may comprise the structure of formula V.

Examples of family members of the zeolitic imidazolate framework materials described herein can comprise structures selected from the group consisting of VII, VIII, IX, X, XI, XII, XIII, XIV, XV, XVI, XVII, XVIII, and combinations thereof:

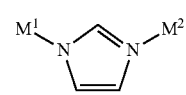

(VII)

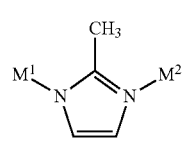

(VIII)

(IX) 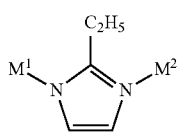

(X) 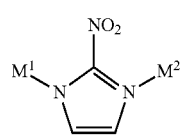

(XI) 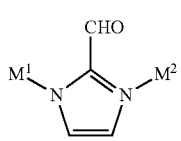

(XII) 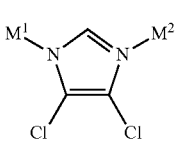

(XIII) 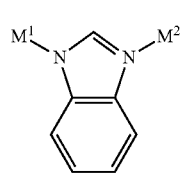

(XIV) 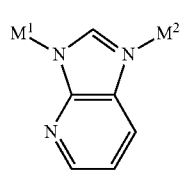

(XV) 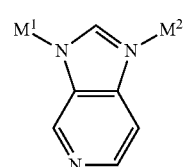

(XVI) 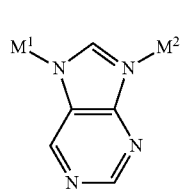

(XVII) 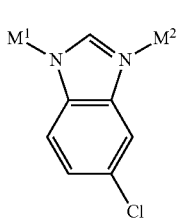

(XVIII) 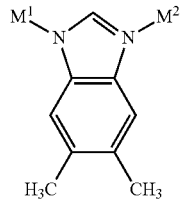

The imidazolate linking moieties in the above formulae have been successfully used in the conventional syntheses of ZIFs, for example as reported by Yaghi and his co-workers in the following publications: "Exceptional Chemical and Thermal Stability of Zeolitic Imidazolate Frameworks", *Proceedings of the National Academy of Sciences of U.S.A.*, Vol. 103, 2006, pp. 10186-91; "Zeolite A Imidazolate Frameworks", *Nature Materials*, Vol. 6, 2007, pp. 501-6; "High-Throughput Synthesis of Zeolitic Imidazolate Frameworks and Application to $CO_2$ Capture", *Science*, Vol. 319, 2008, pp. 939-43; "Colossal Cages in Zeolitic Imidazolate Frameworks as Selective Carbon Dioxide Reservoirs", *Nature*, Vol. 453, 2008, pp. 207-12; and "Crystals as Molecules: Postsynthesis Covalent Functionalization of Zeolitic Imidazolate Frameworks", *Journal of the American Chemical Society*, Vol. 130, 2008, pp. 12626-7, inter alia.

According to examples of particular embodiments of the exchange method described herein, the first zeolitic imidazolate framework composition may comprise a structure of formulae VII, VIII, IX, X, XI, and/or XII (e.g., the structure of formula VIII), and the second zeolitic imidazolate framework composition may comprise a structure of formulae XIII, XIV, XV, XVI, XVII, and/or XVIII (e.g., of formulae XIII, XIV, XV, and/or XVI, or of formula XV).

C. The Solid Metal Oxide (Relatively Insoluble Reactant) Synthesis Method

It should be noted that the linker exchange method described herein is one example of using a reactant that is relatively insoluble in the reaction medium to form a ZIF material. In the linker exchange case, the source of the metal(s) can operably be the first ZIF, or $ZIF^a$, which is typically relatively insoluble in the reaction medium. Nevertheless, another example of a relatively insoluble source of the metal(s) can include an inorganic metal compound, such as a metal oxide. Generally, Scheme 3 below shows the metal oxide analog of the "conventional" synthesis method, termed herein the "solid metal oxide" method, wherein M is typically a divalent transition metal such as described above and wherein $M^1$ and $M^2$ are typically a monovalent and a trivalent metal such as described above, respectively, and wherein IM is imidazolate or a substituted imidazolate, wherein H-IM is the corresponding neutral molecule of IM, i.e., the protonated form of IM.

Scheme 3

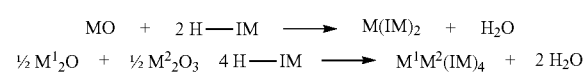

One of the surprising aspects of the solid metal oxide method can be that the ZIF materials can possess chemical compositions that are matched with a non-equilibrium framework type (i.e., a framework type different than attainable with a conventional synthesis method involving relatively soluble reactants and/or different than attained using a conventional synthesis method with relatively soluble reactants under standard/expected synthesis conditions). Advantageously, the non-equilibrium framework type can allow the resultant ZIF product to have additional and/or more cost-efficient uses. However, in some cases, the solid metal oxide method can be the only reaction scheme available to produce certain matches of chemical composition with framework type, and it can be desirable for that reason. In other cases, the solid metal oxide method can be a more (or the most) efficient reaction scheme for producing certain matches of chemical compositions with framework type, e.g., as compared to conventional (relatively soluble) synthesis methods and/or linker exchange methods.

Nevertheless, it is believed that, even if the product of the solid metal oxide scheme would have an equilibrium framework type (i.e., a framework type similar or identical to that attainable/attained using a conventional method synthesis with relatively soluble reactants under standard/expected synthesis conditions), the solid metal oxide method could still be advantageous, because it can advantageously be relatively cleaner than the linker exchange scheme. Indeed, in the solid metal oxide scheme, the inorganic oxide absorbs the two protons to form only water byproduct during the reaction, and there are neither additional imidazolate by-product (shown in Scheme 2) nor metal salt counterion by-product (not shown in Scheme 1) formed as impurities during this reaction. Furthermore, the water by-product being more environmentally friendly and the ubiquity of metal oxide reactants can tend to suggest that this scheme would be more viable for commercial scale-up than the other two schemes.

Specifically, a solid metal oxide ZIF synthesis method can include the following steps: (a) providing a liquid composition comprising a source of an imidazolate or a substituted imidazolate, IM, in a reaction medium; (b) providing a source of metals $M^1$ and $M^2$, wherein $M^1$ and $M^2$ comprise the same or different metal cations, at least one of which metals source(s) is a metal oxide that is relatively insoluble in the reaction medium and in the liquid composition; and (c) contacting the liquid composition with the source(s) of metals under conditions sufficient to produce a zeolitic imidazolate framework composition having a tetrahedral framework comprising a general structure, $M^1$-IM-$M^2$. In an advantageous embodiment, the framework type of the product zeolitic imidazolate framework composition can be different from the framework type obtained when a zeolitic imidazolate framework composition is prepared by crystallizing substantially soluble sources of $M^1$, $M^2$ and IM in the same, or alternatively in a different, reaction medium.

This solid metal oxide synthesis method can further be generalized into a "relatively insoluble reactant" synthesis method, which can include the following steps: (a) mixing together a reaction medium, a source of a imidazolate or a substituted imidazolate reactant, IM, and a reactant source of metals $M^1$ and $M^2$ to form a synthesis mixture, wherein $M^1$ and $M^2$ comprise the same or different metal cations, at least one of which reactants is relatively insoluble in the reaction medium itself and in the synthesis mixture; and (b) maintaining the synthesis mixture having at least one relatively insoluble reactant under conditions sufficient to form a zeolitic imidazolate framework composition having a tetrahedral framework comprising a general structure, $M^1$-IM-$M^2$. Again, in an advantageous embodiment, the framework type of the product zeolitic imidazolate framework composition can be different from the framework type obtained when a zeolitic imidazolate framework composition is prepared by crystallizing substantially soluble sources of $M^1$, $M^2$ and IM in the same, or alternatively in a different, reaction medium.

The reaction medium can include, but is not limited to, a polar organic solvent, such as N,N-dimethylformamide (DMF), N,N-diethylformamide (DEF), N,N-dimethylacetamide (DMAc), 1,3-dimethylpropyleneurea (DMPU), a sulfoxide (e.g., dimethylsulfoxide or DMSO), a phosphoramide (e.g., hexamethylphosphoramide), acetonitrile (MeCN), triethylamine (TEA), or a combination thereof. Alternatively, though not strictly organic, aqueous solvents such as aqueous ammonia and ethanol mixtures, can be used as solvents/liquid media.

Though polar organic compounds such as N,N-dimethylformamide (DMF) are suggested as solvents herein, it should be understood that a solvent (or solvent system) useful in the methods according to the invention and/or useful in making products according to the invention should at least be able to solvate and/or solubilize the reactants to the extent necessary to allow reaction to occur at a reasonable rate (or over a reasonable reaction time). They can also typically be present in a substantially liquid phase at operating/reaction conditions (and optionally but preferably also at STP). Additionally, in the case of synthesis of certain ZIFs, the solvent system may need to include a Brønsted or Lewis base (hydrogen acceptor) component, in order for the reaction to proceed (for instance in, but not limited to, cases where one component of the solvent is not sufficiently basic). Whether that Brønsted or Lewis base component comprises a portion of the single solvent molecule itself or includes a separate component having hydrogen acceptor functionality is not necessarily critical. It should further be understood that these aspects of the solvent (solvent system) for ZIF syntheses may be equally applicable to "conventional" (solvothermal, etc.) syntheses as well as to the linker exchange synthesis methods detailed herein.

In certain embodiments, solvents (and/or solvent systems) particularly useful in the invention can additionally or alternately exhibit a relatively high vapor pressure and/or a relatively low boiling point. For the purposes of clarification, these characteristics are defined with regard to the solvents (and/or solvent systems) before any reaction has occurred (and thus prior to the presence of any reaction products or by-products such as water). For instance, in some such embodiments, a relatively high vapor pressure can represent at least 1.0 kPa at about 20° C., for example at least 1.5 kPa at about 20° C., at least 2.0 kPa at about 20° C. at least 2.5 kPa at about 20° C., at least about 3.0 kPa at about 20° C., at least about 3.5 kPa at about 20° C., at least about 4.0 kPa at about 20° C., at least about 4.5 kPa at about 20° C., at least about 5.0 kPa at about 20° C. at least about 5.5 kPa at about 20° C., at least about 6.0 kPa at about 20° C. at least about 6.5 kPa at about 20° C., at least about 7.0 kPa at about 20° C., at least about 7.5 kPa at about 20° C., at least about 8.0 kPa at about 20° C., at least about 8.5 kPa at about 20° C., at least about 9.0 kPa at about 20° C., or at least about 9.5 kPa at about 20° C. Optionally, if an upper bound on vapor pressure is needed and/or desired, the relatively high vapor pressure can be about 30 kPa or less at about 20° C., e.g., about 25 kPa or less at about 20° C., about 20 kPa or less at about 20° C., about 15 kPa or less at about 20° C. or about 10 kPa or less at about 20° C. Additionally or alternately, in some such embodiments, a relatively low boiling point can represent about 140° C. or less, e.g., about 130° C. or less, about 120° C. or less, about 110° C. or less, about 105° C. or less, about 100° C. or less, 99° C. or less, about 98° C. or less, about 96° C. or less, about 95° C. or less, about 93° C. or less, about 91° C. or less, about 90° C. or less, about 88° C. or less, about 86° C. or less, about 85° C. or less, about 83° C. or less, about 81° C. or less, or about 80° C. or less. Optionally, if a lower bound on boiling point is needed and/or desired (preferably, the solvent can have a boiling point above ambient temperature, so as to be in a liquid phase), the relatively low boiling point can be at least about 25° C., e.g., at least about 30° C., at least about 35° C., at least about 40° C., at least about 45° C., at least about 50° C. at least about 55° C., at least about 60° C., at least about 65° C., at least about 70° C., at least about 75° C. or at least about 80° C. One such non-limiting example of a solvent system having both a relatively low boiling point and a relatively high vapor pressure includes a mixture of acetonitrile and triethylamine.

When $M^1$ and $M^2$ are both divalent metals (whether the same or different), they can each advantageously comprise a metal of Group 2 of the Periodic Table, a transition metal, or a rare earth metal (e.g., selected from the group consisting of Be, Mg, Ca, Sr, Ba, Ra, Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, and Uub; such as Zn. When $M^1$ is a monovalent metal and $M^2$ is a trivalent metal, then $M^1$ can comprise a metal from Group 1 of the Periodic Table or a monovalent transition metal (e.g., Li, Na, K, Cs, Rb, Cu, Ag, or Au; such as Li, Cu, or Ag; or such as Li), and $M^2$ can comprise a metal from Group 13 of the Periodic Table or a trivalent transition metal (e.g., B, Al, Ga, In, Fe, Cr, Sc, Y, or La; such as B, Al, or Ga; such as B).

Sources of such metals can advantageously be the at least one reactant that is relatively insoluble in the reaction medium, at least in the linker exchange and solid metal oxide methods, and optionally but preferably in the relatively insoluble reactant method as well. Examples of such relatively insoluble metal sources can depend (sometimes heavily) on the nature of the reaction medium, can typically (but need not always be) inorganic, and can include, but are by no means limited to, oxides, hydroxides, oxyhydroxides, nitrides, phosphides, sulfides, halides (such as fluorides, chlorides, bromides, and/or iodides), or the like, or combinations thereof. Obviously, in one preferred embodiment, the source(s) of the metal(s) can comprise an oxide.

The source of the metals being relatively insoluble does not necessarily mean that a ZIF material can be synthesized in an acceptable yield, that a ZIF material can be successfully synthesized at all, and/or that a ZIF material having acceptable levels and/or types of impurities can be attained, as there can be other factors. Indeed, not all relatively insoluble metal oxide reactants may accomplish the goal of forming a ZIF material at all or to acceptable purity levels. For example, the synthesis methods according to the invention can advantageously result in a solid ZIF-containing product whose molar purity of the desired ZIF material can be acceptable, which can mean more than 50% purity (i.e., less than 50% impurities), e.g., at least about 60%, at least about 65%, at least about 70%, at least about 75%, at least about 80%, at least about 85%, at least about 90%, at least about 95%, at least about 96%, at least about 97%, or substantially pure (i.e., no statistically significant detectable impurities). In the solid metal oxide method, for example, when the metal is Zn, the particle size and/or particle size distribution of the relatively insoluble zinc oxide reactant can greatly affect the ability to attain any desired ZIF material in the product and/or to attain an acceptable purity level of the desired ZIF material in the product. Thus, in some embodiments, the average (mean) particle size of the relatively insoluble reactant can be less than 5 microns, e.g., less than 3 microns, less than 2 microns, less than 1 micron, less than 750 nm, less than 600 nm, less than 500 nm, less than 400 nm, less than 300 nm, less than 250 nm, less than 200 nm, less than 150 nm, less than 100 nm, less than 75 nm, less than 50 nm, less than 40 nm, less than 30 nm, less than 25 nm, less than 20 nm, less than 15 nm, or less than 10 nm. Additionally or alternately in some embodiments, the particle size distribution of the relatively insoluble reactant can be such that there are no more than 5% of particles (e.g., no more than 3% of particles or no more than 1% of particles) having a particle size of at least 10 microns, e.g., at least 7 microns, at least 5 microns, at least 4 microns, at least 3 microns, at least 2 microns, at least 1 micron, at least 750 nm, at least 600 nm, at least 500 nm, at least 400 nm, at least 300 nm, at least 250 nm, or at least 200 nm.

The source of the imidazolate or substituted imidazolate, IM, can comprise, consist essentially of, or be any one or more of the structures disclosed herein, e.g., including but not limited to one or more of structures I-XVIII (or one or more of structures IV-XVII), or particularly 5-azabenzimidazolate. In the linker exchange and solid metal oxide methods, the source of IM can typically be H-IM, which can also typically be soluble (completely, substantially, or relatively) in the reaction medium. Nevertheless, in these methods, the source of IM can instead optionally be relatively insoluble in the reaction medium. Furthermore, in the relatively insoluble reactant method generally, the source of IM can be either soluble (completely, substantially, or relatively) or relatively insoluble in the reaction medium—again, H-IM can be an exemplary source of IM, but is not necessarily the only possible IM source.

In the non-conventional ZIF synthesis methods according to the invention, the conditions sufficient to form a ZIF material can support at least partial reaction, can allow achievement of a desirably/acceptably high ZIF purity level, and/or can allow achievement of a desirably/acceptably low impurity level (particularly of certain types of undesirable and/or contaminant impurities for certain further applications, such as those described herein. Such sufficient conditions can include, but are not necessarily limited to, a contact/crystallization time from at least 1 hour to as much as 10 days, e.g., from 1 hour to 7 days, from 1 hour to 5 days, from 1 hour to 3 days, from 2 hours to 10 days, from 2 hours to 7 days, from 2 hours to 5 days, from 2 hours to 3 days, from 4 hours to 10 days, from 4 hours to 7 days, from 4 hours to 5 days, from 4 hours to 3 days, from 8 hours to 10 days, from 8 hours to 7 days, from 8 hours to 5 days, from 8 hours to 3 days, from 12 hours to 10 days, from 12 hours to 7 days, from 12 hours to 5 days, from 12 hours to 3 days, from 18 hours to 10 days, from 18 hours to 7 days, from 18 hours to 5 days, from 18 hours to 3 days, from 24 hours to 10 days, from 24 hours to 7 days, from 24 hours to 5 days, or from 24 hours to 3 days; a temperature of about −78° C. (dry-ice bath temperature) up to the boiling temperature of the reaction medium (when the contact/crystallization takes place in a pressurized vessel, the temperature may exceed the boiling temperature of the reaction medium at atmospheric pressure), e.g., from about 0° C. (ice water bath temperature) to at least 10° C. below the boiling temperature of the solvent, or from about 15° C. to at least 15° C. below the boiling temperature of the solvent (or alternately to about 100° C.), such as from about 15° C. to about 300° C., from about 15° C. to about 250° C., from about 15° C. to about 200° C., from about 15° C. to about 150° C., from about 15° C. to about 100° C., from about 15° C. to about 80° C., from about 15° C. to about 75° C., from about 15° C. to about 70° C., from about 15° C. to about 65° C., from about 15° C. to about 60° C., from about 15° C. to about 50° C., from about 25° C. to about 300° C., from about 25° C. to about 250° C., from about 25° C. to about 200° C., from about 25° C. to about 150° C., from about 25° C. to about 100° C., from about 25° C. to about 80° C., from about 25° C. to about 75° C., from about 25° C. to about 70° C., from about 25° C. to about 65° C., from about 25° C. to about 60° C., from about 25° C. to about 50° C., from about 35° C. to about 300° C., from about 35° C. to about 250° C., from about 35° C. to about 200° C., from about 35° C. to about 150° C., from about 35° C. to about 100° C., from about 35° C. to about 80° C., from about 35° C. to about 75° C., from about 35° C. to about 70° C., from about 35° C. to about 65° C., from about 35° C. to about 60° C., from about 35° C. to about 50° C., from about 50° C. to about 300° C., from about 50° C. to about 250° C., from about 50° C. to about 200° C., from about 50° C. to about 150° C., from about 50° C. to about 100° C., from about 50° C. to about 80° C., from about 50° C. to about 75° C., or from about 50° C. to about 70° C.; and a reaction pressure from about 1 kPaa to about 10 MPaa, e.g., from about 1 kPaa to about 5 MPaa, from about 1 kPaa to about 2 MPaa, from about 1 kPaa to about 1 MPaa, from about 1 kPaa to about 500 kPaa, from about 1 kPaa to about 300 kPaa, from about 1 kPaa to about 200 kPaa, from about 10 kPaa to about 100 kPaa, from about 10 kPaa to about 10 MPaa from about 10 kPaa to about 5 MPaa, from about 10 kPaa to about 2 MPaa, from about 10 kPaa to about 1 MPaa, from about 10 kPaa to about 500 kPaa, from about 10 kPaa to about 300 kPaa, from about 10 kPaa to about 200 kPaa, from about 10 kPaa to about 100 kPaa, from about 90 kPaa to about 10 MPaa from about 90 kPaa to about 5 MPaa, from about 90 kPaa to about 2 MPaa, from about 90 kPaa to about 1 MPaa, from about 90 kPaa to about 500 kPaa, from about 90 kPaa to about 300 kPaa, from about 90 kPaa to about 200 kPaa, from about 100 kPaa to about 10 MPaa from about 100 kPaa to about 5 MPaa, from about 100 kPaa to about 2 MPaa, from about 100 kPaa to about 1 MPaa, from about 100 kPaa to about 500 kPaa, from about 100 kPaa to about 300 kPaa, from about 100 kPaa to about 200 kPaa, or from about 100 kPaa to about 150 kPaa.

The product ZIF materials made according to these methods can have equilibrium or non-equilibrium framework types, including, but not necessarily limited to, ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAG, CAN, CAS, CDO, CFI, CGF, CGS, CHA, CHI, CLO, CON, CRB, CZP, DAC, DDR, DFO, DFT, DIA, DOH, DON, EAB, EDI, EMT, EON, EPI, ERI, ESV, ETR, EUO, EZT, FAR, FAU, FER, FRA, FRL, GIS, GIU, GME, GON, GOO, HEU, IFR, IHW, ISV, ITE, ITH, ITW, IWR, IWV, IWW, JBW, KFI, LAU, LCS, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, POZ, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG, ZNI, and ZON (e.g., selected from the group consisting of CRB, DFT, CAG, SOD, MER, RHO, ANA, LTA, DIA, ZNI, GME, LCS, FRL, GIS, POZ, MOZ, and combinations thereof).

D. ZIF Structures and Uses

The zeolitic imidazolate framework materials disclosed herein may have tetrahedral framework structures of any type. The framework types of the zeolitic imidazolate framework materials are denoted herein by a code consisting of three upper-case letters, in a similar manner to that used in the zeolite literature. It must be pointed out that a system of three-lower-case-letter symbols was introduced by O'Keeffe and Yaghi for the designation of the framework types of metal-organic frameworks (MOFs), meta-organic polyhedra (MOPs), zeolitic imidazolate frameworks (ZIFs), and covalent-organic frameworks (COFs). General information about the latter can be found, for example, in the publication by O'Keeffe and Yaghi et al. "Reticular Chemistry: Occurrence and Taxonomy of Nets and Grammar for the Design of Frameworks", *Accounts of Chemical Research, Vol.* 38, 2005, pp. 176-82, and at http://rcsr.anu.edu.au/home, the Reticular Chemistry Structure Resource (RCSR) website. For the purpose of uniformity, all framework type codes used in this publication are in upper-case letters. It is also noted that the concepts "framework type", "framework structure", "topology", and "net" are used essentially interchangeably in the relevant literature. Though the methods and compositions recited herein are often described with reference only to ZIFs (and sometimes also to MOFs), it is contemplated that the concepts and/or steps regarding those methods and compositions herein could be generalized (and thus be similarly applicable) to other organic adducts of inorganic crystalline materials, such as MOFs, MOPs, COFs, and/or the like.

ZIFs can include such structures iso-structural to known zeolites and related minerals, as well as structures unique to the field of ZIFs, for example, those identified in U.S. Patent Application Publication Nos. 2007/0202038 and 2010/0307336, including ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAG, CAN, CAS, CDO, CFI, CGF, CGS, CHA, CHI, CLO, CON, CRB, CZP, DAC, DDR, DFO, DFT, DIA, DOH, DON, EAB, EDI, EMT, EON, EPI, ERI, ESV, ETR, EUO, EZT, FAR, FAU, FER, FRA, FRL, GIS, GIU, GME, GON, GOO, HEU, IFR, IHW, ISV, ITE, ITH, ITW, IWR, IWV, IWW, JBW, KFI, LAU, LCS, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, POZ, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG, ZNI, and ZON. Such structures can include a tetrahedral framework type selected from the group consisting of CRB. DFT. CAG, SOD, MER, RHO, ANA, LTA, DIA, ZNI, GME, LCS, FRL, GIS, POZ, MOZ, and combinations thereof.

The present porous crystalline materials in the as-synthesized form can generally contain guest species, typically solvent and/or template molecules, within the tetrahedral frameworks. The guest species can be removed, e.g., by evacuation at a relatively low pressure (such as less than 50 mTorr) and optionally but typically at a temperature from about 70° C. to about 300° C., or alternately by exchange with an organic solvent of relatively small molecular size (e.g., acetonitrile), followed by evacuation, such as using the previously described process. The removal of guest species can result in an increase in internal pore volume that can be used to adsorb various gases, such as carbon dioxide, carbon monoxide, sulfur dioxide, sulfur trioxide, hydrogen sulfide, hydrocarbons, hydrogen, nitrogen, oxygen, noble gases, ammonia, amines, or combinations thereof.

When the ZIF materials, e.g., prepared by the non-conventional methods described herein, include EMM-19, i.e., are synthesized to have the SOD framework type and/or the empirical formula of Zn(5-azabenzimidazole)$_2$, the as-synthesized EMM-19 portion of the product (e.g. made in DMF) can exhibit an XRD pattern with the ranges of d-spacings and corresponding relative peak intensities shown in Table 1b herein. When the guest molecules have been removed from these as-synthesized materials, the acetonitrile-exchanged EMM-19 portion of the product can exhibit an XRD pattern with the ranges of d-spacings and corresponding relative peak intensities shown in Table 1d herein.

It is noted that there appeared to be a slight difference in XRD patterns between the as-synthesized EMM-19 and the acetonitrile-exchanged EMM-19, even though there is strictly no templating agent contained within its pore structure. Though the peak pattern seemed relatively similar across the XRD spectrum, their respective peaks appeared to be shifted relative to each other. Though there are other possible explanations for this behavior, it was hypothesized that the materials retained their (SOD) framework type but exhibited alteration of their crystalline unit cell dimensions relative to each other. Without being bound by theory, due to the relatively low vapor pressure and relatively high boiling point of DMF, it was surmised that, despite best efforts, the as-synthesized EMM-19 material may contain some residual DMF, which can persist even under conditions of evacuation in preparation for XRD characterization. Again, without being bound by theory, it is believed that the presence of relatively high vapor pressure and/or relatively low boiling point reaction media (e.g., through thorough solvent exchange with MeCN, in this case, but also in cases where the ZIF material is made using only such reaction media such that even the as-synthesized product only contains, for example, MeCN) can indeed be removed (to an appreciably low detectable limit) under less severe (temperature and pressure) conditions, such as those employed in preparation for XRD characterization.

In an effort to potentially remove the effect of the reaction medium on the characterization of the ZIF product, a modified EMM-19 material (still chemically Zn(5-azabenzimidazole)$_2$ and still having SOD framework type) was stumbled upon, termed herein "EMM-19*" or "EMM-19-STAR", which exhibited an order of magnitude increase over ZIF-22 in $CO_2$ adsorption over the entire range of (sub)atmospheric partial pressures, and a marked increase even over the activated EMM-19 material in particularly low $CO_2$ partial pressure adsorption (e.g., below about 100 kPa). This EMM-19* material also seemed to exhibit an even further peak shift in its XRD spectrum from the activated EMM-19 material, notably resulting in a difference between the EMM-19* material the activated EMM-19 material. Though the EMM-19' material was attained experimentally by removing substantially all the MeCN from an acetonitile-exchanged EMM-19 sample and storing the resulting sample under $N_2$ gas for a significant period of time (at least 10 days, such as for about 26 days), after which time the characterization differences were noticed.

Zeolitic imidazolate framework materials, e.g., prepared by the non-conventional methods described herein, such as those having the SOD framework type and/or the empirical formula of Zn(5-azabenzimidazole)$_2$, may have unique carbon dioxide sorption capacities. For example, under conditions comprising a temperature of 28° C., the zeolitic imidazolate framework product material may sorb: (i) at least 0.30 mmol of $CO_2$ per gram of zeolitic imidazole framework composition (e.g., at least 0.35 mmol/g, at least 0.40 mmol/g, at least 0.45 mmol/g, at least 0.50 mmol/g, at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, or at least 1.0 mmol/g) at a $CO_2$ partial pressure of ~75 Torr; (ii) at least 0.35 mmol of $CO_2$ per gram of zeolitic imidazole framework composition (e.g., at least 0.40 mmol/g, at least 0.45 mmol/g, at least 0.50 mmol/g, at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, or at least 1.3 mmol/g) at a $CO_2$ partial pressure of ~100 Torr; and/or (iii) at least 0.50 mmol of $CO_2$ per gram of zeolitic imidazole framework composition (e.g., at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, at least 1.3 mmol/g, at least 1.4 mmol/g, at least 1.5 mmol/g, at least 1.6 mmol/g, at least 1.7 mmol/g, or at least 1.8 mmol/g) at a $CO_2$ partial pressure of ~200 Torr. Though there is not necessarily an upper limit on $CO_2$ sorption capacity, at the relatively low partial pressures listed here, the zeolitic imidazolate framework materials according to the invention can typically sorb up to 5 mmol/g $CO_2$.

Additionally or alternately, under conditions comprising a temperature of 28° C., the EMM-19* ZIF product material may sorb: (i) at least 0.60 mmol of $CO_2$ per gram of zeolitic imidazole framework composition (e.g., 0.65 mmol/g, at least 0.70 mmol/g, at least 0.75 mmol/g, at least 0.80 mmol/g, at least 0.85 mmol/g, at least 0.90 mmol/g, at least 0.95 mmol/g, or at least 1.0 mmol/g) at a $CO_2$ partial pressure of ~75 Torr; (ii) at least 0.75 mmol of $CO_2$ per gram of zeolitic imidazole framework composition (e.g., at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, or at least 1.3 mmol/g) at a $CO_2$ partial pressure of ~100 Torr: (iii) at least 1.15 mmol of $CO_2$ per gram of zeolitic imidazole framework composition (e.g., at least 1.2 mmol/g, at least 1.3 mmol/g, at least 1.4 mmol/g, at least 1.5 mmol/g, at least 1.6 mmol/g, at least 1.7 mmol/g, or at least 1.8 mmol/g) at a $CO_2$ partial pressure of ~150 Torr; and/or (iv) at least 0.35 mmol of $CO_2$ per gram of zeolitic imidazole framework composition (e.g., at least 0.40 mmol/g, at least 0.45 mmol/g, at least 0.50 mmol/g, at least 0.55 mmol/g, at least 0.60 mmol/g, at least 0.65 mmol/g, at least 0.70 mmol/g, at least 0.75 mmol/g, at least 0.80 mmol/g, or at least 0.85 mmol/g) at a $CO_2$ partial pressure of ~39 Torr. Though there is not necessarily an upper limit on $CO_2$ sorption capacity, at the relatively low partial pressures listed here, the EMM-19* ZIF product material can typically sorb up to 5 mmol/g $CO_2$.

Additionally envisioned are ZIF materials, e.g., prepared by the non-conventional methods described herein, such as those having the SOD framework type and/or the empirical formula of Zn(5-azabenzimidazole)$_2$, that additionally contain at least 0.30 mmol of sorbed $CO_2$ per gram of zeolitic imidazole framework composition (e.g., at least 0.35 mmol/g, at least 0.40 mmol/g, at least 0.45 mmol/g, at least 0.50 mmol/g, at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, at least 1.3 mmol/g, at least 1.4 mmol/g, at least 1.5 mmol/g, at least 1.6 mmol/g, at least 1.7 mmol/g, at least 1.8 mmol/g, at least 1.9 mmol/g, at least 2.0 mmol/g, at least 2.1 mmol/g, at least 2.2 mmol/g, at least 2.3 mmol/g, at least 2.4 mmol/g, or at least 2.5 mmol/g).

Similarly additionally or alternatively, the EMM-19* ZIF product materials herein can additionally contain at least 0.50 mmol of sorbed $CO_2$ per gram of zeolitic imidazole framework composition (e.g., at least 0.55 mmol/g, at least 0.60 mmol/g, at least 0.65 mmol/g, at least 0.70 mmol/g, at least 0.75 mmol/g, at least 0.80 mmol/g, at least 0.85 mmol/g, at least 0.90 mmol/g, at least 0.95 mmol/g, at least 1.0 mmol/g, at least 1.1 mmol/g, at least 1.2 mmol/g, at least 1.3 mmol/g, at least 1.4 mmol/g, at least 1.5 mmol/g, at least 1.6 mmol/g, at least 1.7 mmol/g, at least 1.8 mmol/g, at least 1.9 mmol/g, at least 2.0 mmol/g, at least 2.1 mmol/g, at least 2.2 mmol/g, at least 2.3 mmol/g, at least 2.4 mmol/g, or at least 2.5 mmol/g).

E. Additional Embodiments

Additionally or alternatively, the present invention can include one or more of the following embodiments.

Embodiment 1

A zeolitic imidazolate framework composition with an SOD framework type, wherein the zeolitic imidazolate framework structure is capable of sorbing, at a temperature of ~28° C.: (i) at least 0.60 mmol of $CO_2$ per gram of zeolitic imidazole framework composition at a $CO_2$ partial pressure of ~75 Torr; (ii) at least 0.75 mmol of $CO_2$ per gram of zeolitic imidazole framework composition at a $CO_2$ partial pressure of ~100 Torr: (iii) at least 1.15 mmol of $CO_2$ per gram of zeolitic imidazole framework composition at a $CO_2$ partial pressure of ~200 Torr; and/or (iv) at least 0.35 mmol of $CO_2$ per gram of zeolitic imidazole framework composition at a $CO_2$ partial pressure of ~39 Torr.

Embodiment 2

A zeolitic imidazolate framework composition having an empirical formula, Zn(5-azabenzimidazolate)$_2$, wherein the zeolitic imidazolate framework structure is capable of sorbing, at a temperature of ~28° C.: (i) at least 0.60 mmol of $CO_2$ per gram of zeolitic imidazole framework composition at a $CO_2$ partial pressure of ~75 Torr; (ii) at least 0.75 mmol of $CO_2$ per gram of zeolitic imidazole framework composition at a $CO_2$ partial pressure of ~100 Torr; (iii) at least 1.15 mmol of $CO_2$ per gram of zeolitic imidazole framework composition at a $CO_2$ partial pressure of ~200 Torr; and/or (iv) at least 0.35 mmol of $CO_2$ per gram of zeolitic imidazole framework composition at a $CO_2$ partial pressure of ~39 Torr.

Embodiment 3

A porous crystalline material having an empirical formula Zn(5-aza-benzimidazolate)$_2$, exhibiting an SOD framework type, and exhibiting an x-ray diffraction pattern with peaks defined by the d-spacing ranges and relative intensity ranges described in any one of Table 1b, Table 1d, Table 7b, Table 8b, and Table 9b.

Embodiment 4

A method of adsorbing a gas comprising contacting the gas (e.g., comprising hydrogen, nitrogen, oxygen, a noble gas, carbon monoxide, carbon dioxide, sulfur dioxide, sulfur trioxide, hydrogen sulfide, ammonia, a hydrocarbon, or an amine) with the porous crystalline material of embodiment 3.

Embodiment 5

A method of separating a gas from a fluid stream containing the gas (e.g. comprising hydrogen, nitrogen, oxygen, a noble gas, carbon monoxide, carbon dioxide, sulfur dioxide, sulfur trioxide, hydrogen sulfide, ammonia, a hydrocarbon, or an amine) comprising contacting the fluid stream with the porous crystalline material of embodiment 3.

Embodiment 6

A method for forming a zeolitic imidazolate framework composition, said method comprising the steps of: (a) mixing together a reaction medium, a source of a imidazolate or a substituted imidazolate reactant, IM, and a reactant source of metals $M^1$ and $M^2$ to form a synthesis mixture, wherein $M^1$ and $M^2$ comprise the same or different metal cations, at least one of which reactants is relatively insoluble in the reaction medium itself and in the synthesis mixture; (b) maintaining the synthesis mixture having at least one relatively insoluble reactant under conditions sufficient to form a zeolitic imidazolate framework composition having a tetrahedral framework comprising a general structure, $M^1$-IM-$M^2$; and (c) treating the zeolitic imidazolate framework composition under conditions sufficient to stably reduce its unit cell volume.

Embodiment 7

The method according to embodiment 6, wherein the zeolitic imidazolate framework composition product has a framework type that is different from the framework type obtained when a zeolitic imidazolate framework composition is prepared by crystallizing substantially soluble sources of $M^1$, $M^2$ and IM in the same reaction medium.

Embodiment 8

The method according to embodiment 6 or embodiment 7, wherein the zeolitic imidazolate framework composition product exhibits a framework type selected from the group consisting of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAG, CAN, CAS, CDO, CFI, CGF, CGS, CHA, CHI, CLO, CON, CRB, CZP, DAC, DDR, DFO, DFT, DIA, DOH, DON, EAB, EDI, EMT, EON, EPI, ERI, ESV, ETR, EUO, EZT, FAR, FAU, FER, FRA, FRL, GIS, GIU, GME, GON, GOO, HEU, IFR, IHW, ISV, ITE, ITH, ITW, IWR, IWV, IWW, JBW, KFI, LAU, LCS, LEV, LIO, LIT, LOS, LOV, LTA, LTL, LTN, MAR, MAZ, MET, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, POZ, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG, ZNI, ZON, and combinations thereof, such as selected from the group consisting of CRB, DFT, CAG, SOD, MER, RHO, ANA, LTA, DIA, ZNI, GME, LCS, FRL, GIS, POZ, MOZ, and combinations thereof, e.g., SOD.

Embodiment 9

The method according to any one of embodiments 6-8, wherein the reaction medium comprises N,N-dimethylformamide (DMF), N,N-diethylformamide (DEF), N,N-dimethylacetamide (DMAc), 1,3-dimethylpropyleneurea (DMPU), a sulfoxide, a phosphoramide, acetonitrile (MeCN), triethylamine (TEA), water, ammonia, ethanol, or a combination thereof.

Embodiment 10

The method according to any one of embodiments 6-9, wherein the metals are selected from the group consisting of Be, Mg, Ca, Sr, Ba, Ra, Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, Uub, and combinations thereof, e.g. Zn.

Embodiment 11

The method according to any one of embodiments 6-10, wherein the imidazolate or substituted imidazolate, IM, is selected from the group consisting of IV, V, VI, or any combination thereof:

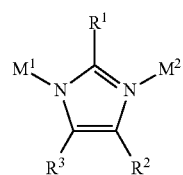
(IV)

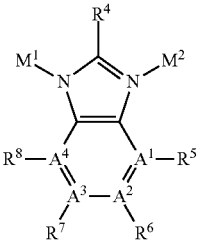
(V)

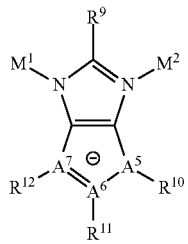
(VI)

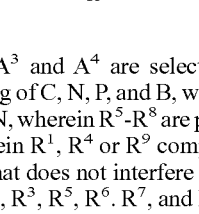

wherein $A^1$, $A^2$, $A^3$ and $A^4$ are selected from a group of elements consisting of C, N, P, and B, wherein $A^5$, $A^6$, and $A^7$ can be either C or N, wherein $R^5$-$R^8$ are present when $A^1$ to $A^4$ comprise C, wherein $R^1$, $R^4$ or $R^9$ comprise a non-sterically hindering group that does not interfere with the adjacent $M^1$ or $M^2$, wherein $R^2$, $R^3$, $R^5$, $R^6$, $R^7$, and $R^8$ are each individually hydrogen, alkyl, halo, cyano, or nitro, wherein $M^1$ and $M^2$ comprise the same or different metal cation, and wherein $R^{10}$, $R^{11}$, and $R^{12}$ are each individually electron withdrawing groups.

Embodiment 12

The method according to embodiment 11, wherein the imidazolate or substituted imidazolate, IM, is selected from the group consisting of VII, VIII, IX, X, XI, XII, XIII, XIV, XV, XVI, XVII, and/or XVIII:

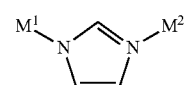
(VII)

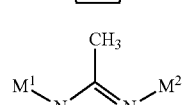
(VIII)

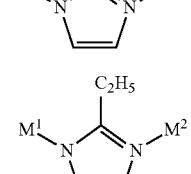
(IX)

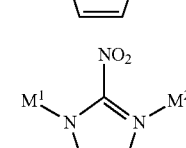
(X)

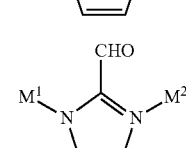
(XI)

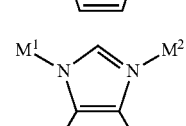
(XII)

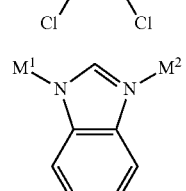
(XIII)

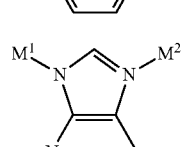
(XIV)

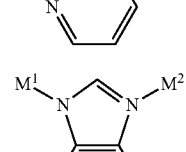
(XV)

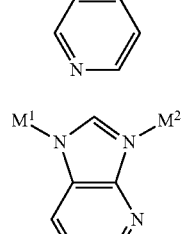
(XVI)

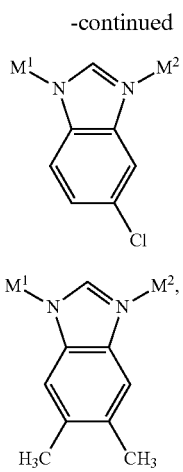

(XVII)

(XVIII)

e.g., wherein the imidazolate or substituted imidazolate, IM, comprises the structure of formula XV.

Embodiment 13

The method according to any one of embodiments 6-12, wherein the sufficient conditions comprise a contact/crystallization time from 1 hour to 10 days (e.g., from 12 hours to 7 days), a temperature from about −78° C. to the boiling point of the reaction medium (e.g., from about 15° C. to about 150° C.), and a reaction pressure from about 1 kPaa to about 10 MPaa (e.g., from about 100 kPaa to about 10 Mpaa).

Embodiment 14

The method according to any one of embodiments 6-13, wherein the imidazolate or substituted imidazolate, IM, is 5-azabenzimidazolate, and wherein the zeolitic imidazolate framework composition has an SOD framework type.

Embodiment 15

The method according to any one of embodiments 6-14, wherein the conditions sufficient for the treatment step comprise removing the reaction medium and introducing an inert gas for a continuous period of at least 1 day. e.g., at least 2 days, at least 3 days, at least 5 days, at least 7 days, at least 10 days, at least 14 days, at least 17 days, at least 20 days, at least 23 days, at least 26 days, or at least 30 days, and optionally up to 365 days.

The invention will now be more particularly described with reference to the Examples and the accompanying drawings.

EXAMPLES

In Examples 1-15, all chemicals used in the synthesis of materials were commercial grade and purchased from Aldrich, except as noted: zinc nitrate tetrahydrate (EM Science, 98.5%), benzimidazole (98%), 4-azabenzimidazole (99%). 5-azabenzimidazole (97%), purine (98%), N,N-dimethylformamide (99.8%), triethylamine (99.5%), acetonitrile (99.5%), chloroform (99.8%), zinc oxide (99.999%); average particle size approximated after purchase by scanning electron microscopy to be between about 200 nm and about 500 nm, with a particle size distribution extending at least from about 50 nm to about 2 microns). All chemicals were handled in air unless otherwise specified.

ZIF-8, in the activated form (i.e., with solvent molecules substantially removed), was purchased from Aldrich under the brand name Basolite Z1200. ZIF-7 was synthesized and activated according to the procedure disclosed in U.S. Patent Application Publication No. 2009/0211440. Activated ZIF-8 and ZIF-7 are both believed to be highly hydrophobic solids, and thus were stored under ambient condition and handled in air. ZIF-8 is a material having the empirical formula Zn(2-methyl imidazolate)$_2$ and the framework type SOD. ZIF-7 is a material having the empirical formula Zn(benzimidazolate)$_2$ and the framework type SOD. Although both materials are of the same framework type, they should be relatively easily differentiated by powder X-ray diffraction, due to the different symmetries of the framework.

The reaction vessels used in the Examples were ~23-mL or ~45-mL Parr Acid Digestion Bombs with PTFE liners. For larger quantity reactions, a Parr Pressure Reactor (autoclave) with PTFE liner and Series 4843 temperature controller was used.

The powder X-ray diffraction patterns were measured on a PANalytical X'Pert diffractometer equipped with an X'celerator detector in Bragg-Brentano geometry using Cu Kα radiation (~45 kV and ~40 mA tube voltage and current), a ~¼° fixed divergence slit, and a ~0.017° step size for the two-theta range from ~3 to ~50 degrees. All data processing was conducted using Materials Data JADE 9 software.

Quantitative $^{13}$C MAS NMR spectra were acquired using a Varian InfinityPlus-500™ wide bore spectrometer operating at a static magnetic field of ~11.74 T, corresponding to a Larmor frequency of about 125 MHz and about 500 MHz for $^{13}$C and $^1$H, respectively. The spectra were recorded using ~0.4 microsecond 90-degree pulse, ~60-120 second repetition pulse delay on samples loaded in ~5-mm (o.d.) rotors, spinning at a magic angle rate of about 9.5 kHz, and $^1$H decoupling during data acquisition. Chemical shifts shown are relative to tetramethylsilane (TMS, $\delta_C \approx 0$ ppm). Activated ZIF samples were used for the measurements and a typical sample size was about 75-105 mg, although samples as small as about 10 mg can easily be tested.

The gas sorption measurements were conducted on a Quantachrome Autosorb-1™ automatic gas sorption analyzer. The instrument measures pressure differences due to sorption (in this case physical adsorption and desorption) at the gas/solid interface. At a specified temperature, and using the non-ideality correction factor of the gas at that temperature, the instrument utilizes a proprietary algorithm from basic gas laws to calculate the volume of gas adsorbed onto, and desorbed from, the solid adsorbent for each pressure selected by the user. Volume of gas is converted into millimoles (mmol) and scaled to the weight of adsorbent, resulting in the common units of adsorption (i.e., mmol gas divided by grams of adsorbent, or mmol/g). A plot of amount adsorbed versus pressure, at constant temperature, can represent the sorption isotherm of a particular gas/solid interface. All isotherms were measured at ~28° C. for a single-component gas adsorbate for pressures up to about 760 Torr. Before each isotherm measurement, a sample of about 50-100 mg of an activated ZIF material was outgassed on the pre-treatment station of the Autosorb-1™ under relatively high vacuum (less than 10 mTorr) at about 65-70° C. for about 10-18 hours.

Example 1

Exchange of ZIF-8 (Zn(2-methylimidazolate)$_2$) to Form ZIF-7 (Zn(benzimidazolate)$_2$)

About 240 mg of ZIF-8, ~415 mg benzimidazole, and ~5 mL DMF were thoroughly mixed in an NMR sample tube.

The sample tube was then subjected to five heating cycles as described below. In a first cycle, the sample tube was placed in oil bath at a first temperature ($T_1$) of ~26° C. (i.e., approximately room temperature). After a short period of time sufficient to achieve a sample temperature of ~26° C., the sample was inserted into an NMR probe and was maintained at the same temperature of ~26° C. In subsequent cycles, the oil bath was maintained at higher temperatures, and the sample was heated in the oil bath for longer time periods. e.g., ranging from 18 to 21 hours, as specified below. In each cycle, the NMR sample tube was inserted into an NMR probe sitting at a pre-set temperature, which was the same as that of the oil bath, e.g., ($T_1$) for the first cycle. $^1$H NMR and $^{13}$C NMR at spinrate≈0 Hz were recorded in each cycle. The transfer time from the oil bath to the NMR probe at the same temperature was kept to less than 10 minutes in each cycle. After recording the NMR spectra, the next cycle was initiated by ejecting the sample tube from NMR probe and moving the sample tube to oil bath at a higher temperature, e.g., ($T_2$) for the second cycle. The transfer time from the NMR probe to the oil bath was less than 4 minutes in each cycle. In the first cycle, the temperature ($T_1$) of the oil bath and the NMR probe was ~26° C. In the second cycle, the temperature ($T_2$) of the oil bath and the NMR probe was ~40° C., and the sample tube was heated in the oil bath for about 18 hours. In the third cycle, the temperature ($T_3$) of the oil bath and the NMR probe was ~60° C., and the sample tube was heated in the oil bath for about 19 hours. In the fourth cycle, the temperature ($T_4$) of the oil bath and the NMR probe was ~80° C., and the sample tube was heated in the oil bath for about 21 hours. In the fifth cycle, the temperature (TS) of the oil bath and the NMR probe was ~100° C., and the sample tube was heated in the oil bath for about 19 hours.

Figure 2:
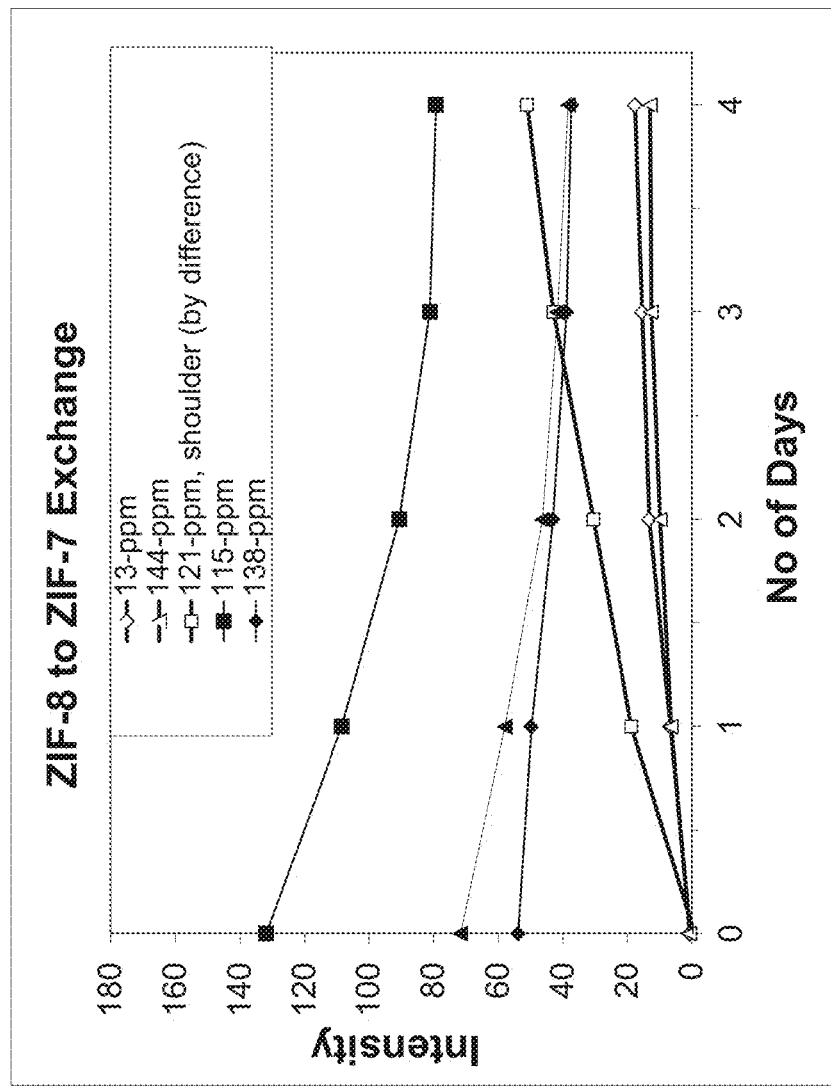
FIG. 2 shows relative intensity changes as a function of time for relevant portions of the spectra shown in FIG. 1.

The 125-MHz liquid-state $^{13}$C NMR spectra are shown in FIG. 1, and results obtained from the spectra are shown in FIG. 2. In FIG. 1, the bottom line represents the spectra for the first cycle at ~26° C., the line second from the bottom represents the spectra for the second cycle at ~40° C., the middle line represents the spectra for the third cycle at ~60° C., the line second from the top line represents the spectra for the fourth cycle at ~80° C., and the top line represents the spectra for the fifth cycle at ~100° C. Certain relevant sections of the spectra are highlighted by shaded regions in FIG. 1.

In FIG. 2, the intensity was observed to change as a function of time for relevant portions of the spectra, as shown. Intensities shown were relative to the ~30 ppm peak arbitrarily set at 1000 counts. In FIG. 2, day zero represented the spectra for cycle 1, day 1 represented the spectra for cycle 2, day 2 represented the spectra for cycle 3, day 3 represented the spectra for cycle 4, and day 4 represented the spectra for cycle 5. The effective exchange of imidazolate linkers, as observed through the disappearance of benzimidazole from, and the appearance of 2-methyl imidazole in, the DMF solvent, can be conveniently seen by the signals at ~115 ppm and ~138 ppm (characteristic of benzimidazole), and at ~13 ppm, ~121-122 ppm, and ~141 ppm (characteristic of 2-methyl imidazole), respectively.

Figure 3:
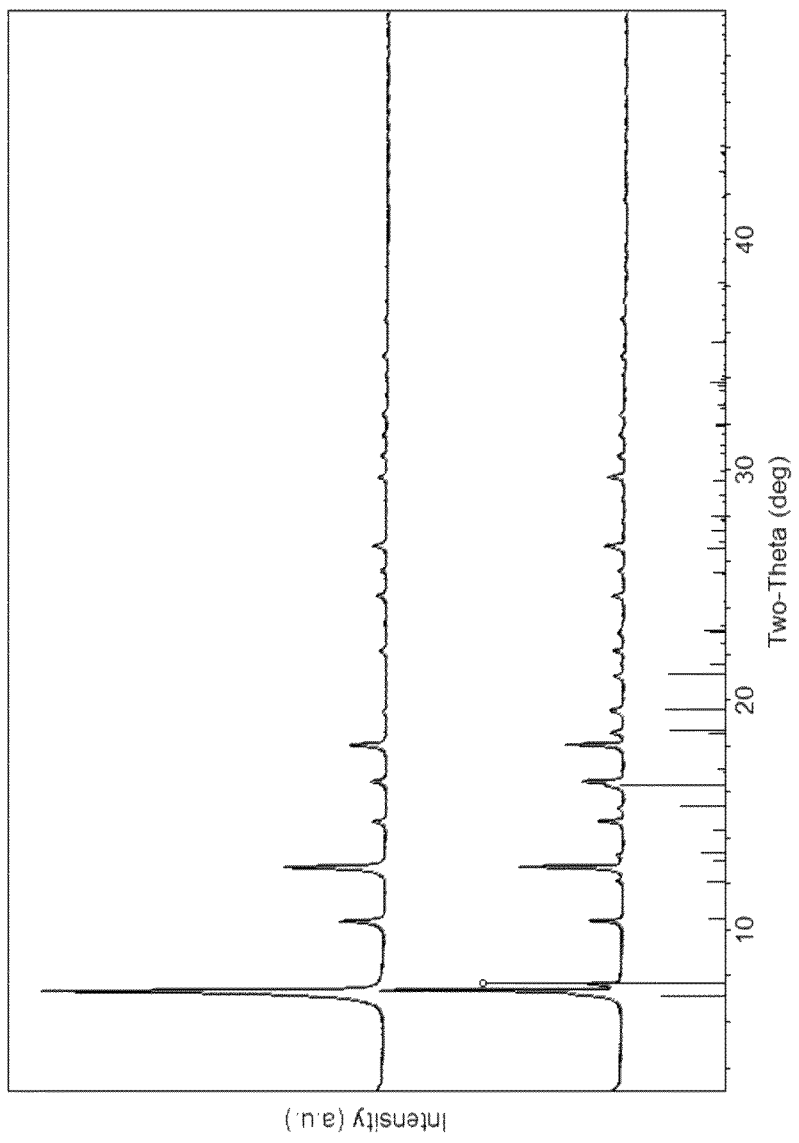
FIG. 3 is an overlay of the X-ray diffraction patterns of the ZIF-8 starting material (top), the solid product recovered in Example 1 (middle), and the calculated stick pattern for ZIF-7 (bottom) based on single-crystal data (*Proc. Nat. Acad. Sci.*, U.S.A., 2006 (103), 10186-10191, Yaghi et al.).

After cycle 5, the solid product was recovered by thoroughly washing with fresh DMF (~5 mL×3). As indicated by the powder X-ray diffraction patterns shown in FIG. 3, the product was identified as comprising ZIF-7, which has the empirical formula Zn(benzimidazolate)$_2$ and the framework type SOD, along with some residual unconverted ZIF-8 (which also has the SOD framework type).

Example 2

Exchange of ZIF-8 (Zn(2-methylimidazolate)$_2$) to Form EMM-19 (Zn(5-azabenzimidazolate)$_2$)

A clear solution of ~1.00 g 5-azabenzimidazole in ~10 mL DMF was prepared in a glass vial, and then added to ~100 mg of solid ZIF-8, which was previously weighed out in a PTFE cup of a ~45-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF. The product was designated herein as as-synthesized EMM-19.

Figure 4:
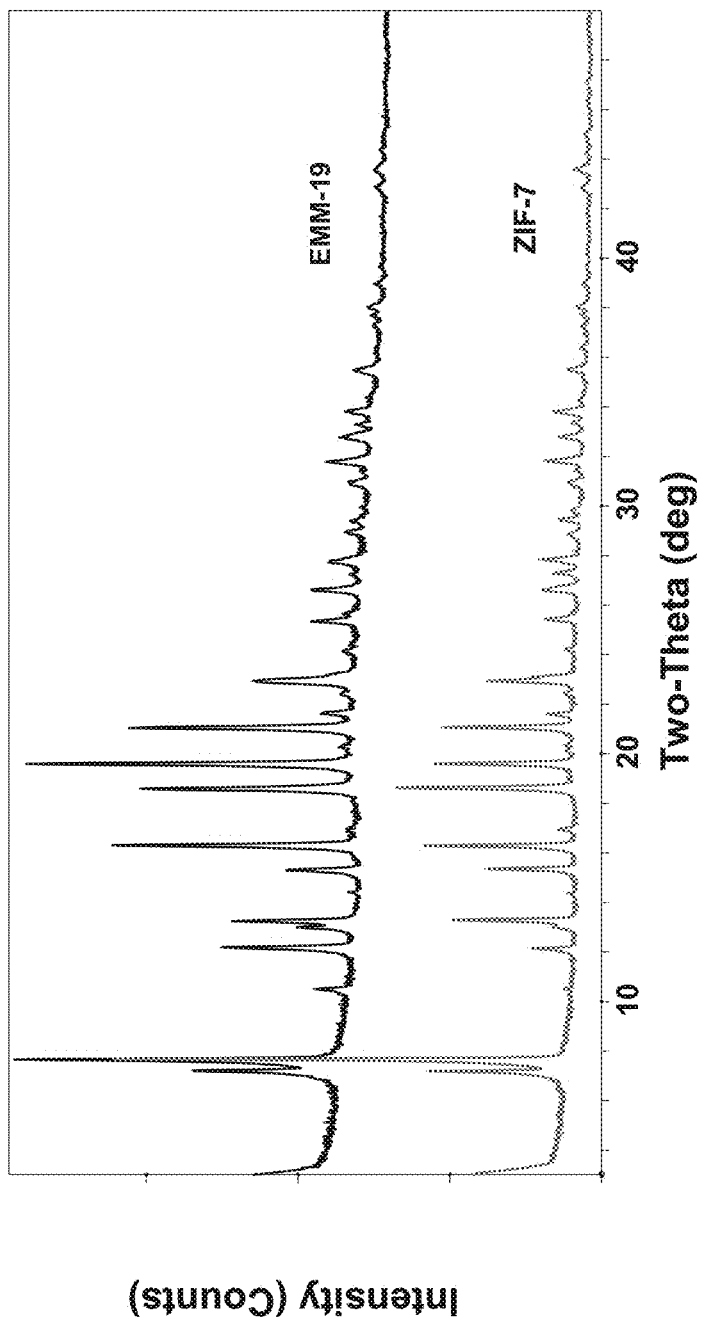
FIG. 4 is an overlay of the X-ray diffraction patterns of the as-synthesized EMM-9 product from Example 2 (top) and as-synthesized ZIF-7 (bottom).

FIG. 4 compares the powder X-ray diffraction patterns of EMM-19 and ZIF-7, both in the as-synthesized form. The excellent agreement of the patterns supports the conclusion that these two materials have the same framework type (SOD). EMM-19, which has the empirical formula Zn(5-azabenzimidazolate)$_2$ and the framework type SOD, is believed to be a new composition of matter. As reflected in the literature, when 5-azabenzimidazolate is used to form a ZIF by a conventional solvothermal crystallization technique, the resulting ZIF has been known to exhibit only the framework type LTA. Table 1a, below left, details the precise XRD peak maxima in degrees two-theta and in d-spacing, with concomitant precise relative peak intensity, for an as-synthesized EMM-19 sample made according to the procedure in this Example (e.g., made in DMF). Table 1b, below right, details acceptable ranges of XRD peak maxima in d-spacing only, with concomitant acceptable ranges of relative peak intensity, for as-synthesized EMM-19 samples (e.g., made in DMF).

TABLE 1a

| 2-Theta | d spacing (Å) | Rel. intens. (%) |
|---|---|---|
| 7.19 | 12.278 | 52 |
| 7.63 | 11.583 | 92 |
| 10.48 | 8.434 | 10 |
| 12.21 | 7.246 | 41 |
| 12.96 | 6.826 | 29 |
| 13.19 | 6.705 | 36 |
| 15.25 | 5.806 | 23 |
| 16.30 | 5.434 | 70 |
| 16.85 | 5.256 | 6 |
| 18.52 | 4.786 | 66 |
| 18.72 | 4.736 | 20 |
| 19.56 | 4.534 | 100 |
| 20.21 | 4.391 | 3 |
| 21.01 | 4.224 | 84 |
| 21.62 | 4.107 | 13 |
| 22.39 | 3.968 | 4 |
| 22.80 | 3.897 | 60 |
| 23.27 | 3.819 | 11 |
| 24.07 | 3.694 | 6 |
| 25.28 | 3.521 | 17 |
| 25.68 | 3.467 | 5 |
| 26.56 | 3.353 | 20 |
| 27.13 | 3.284 | 4 |
| 27.67 | 3.222 | 17 |
| 27.93 | 3.192 | 4 |
| 29.00 | 3.076 | 9 |
| 29.32 | 3.044 | 6 |
| 30.76 | 2.905 | 9 |
| 31.02 | 2.880 | 10 |
| 31.31 | 2.855 | 7 |
| 31.74 | 2.817 | 25 |
| 32.68 | 2.738 | 14 |
| 32.91 | 2.719 | 11 |
| 33.18 | 2.698 | 7 |

TABLE 1a-continued

| 2-Theta | d spacing (Å) | Rel. intens. (%) |
|---|---|---|
| 33.83 | 2.647 | 19 |
| 35.39 | 2.535 | 18 |
| 37.31 | 2.408 | 10 |
| 37.51 | 2.396 | 9 |
| 37.93 | 2.370 | 11 |
| 38.83 | 2.317 | 4 |
| 42.79 | 2.112 | 9 |
| 43.27 | 2.089 | 9 |
| 44.54 | 2.033 | 5 |

TABLE 1b

| d spacing (Å) | Rel. intens. (%) |
|---|---|
| 12.5-12.0 | 30-80 |
| 11.8-11.4 | 60-100 |
| 8.56-8.31 | 5-30 |
| 7.33-7.16 | 20-70 |
| 6.91-6.75 | 10-40 |
| 6.78-6.63 | 20-70 |
| 5.86-5.75 | 10-40 |
| 5.48-5.38 | 50-90 |
| 5.30-5.21 | 0-20* |
| 4.82-4.75 | 30-80 |
| 4.77-4.70 | 10-40 |
| 4.57-4.50 | 60-100 |
| 4.42-4.36 | 0-10* |
| 4.25-4.19 | 60-100 |
| 4.14-4.08 | 5-30 |
| 3.99-3.94 | 0-10* |
| 3.92-3.87 | 30-80 |
| 3.84-3.80 | 5-30 |
| 3.72-3.67 | 0-20* |
| 3.54-3.50 | 5-30 |
| 3.49-3.45 | 0-20* |
| 3.37-3.33 | 5-30 |
| 3.30-3.27 | 0-10* |
| 3.24-3.20 | 5-30 |
| 3.21-3.17 | 0-10* |
| 3.09-3.06 | 0-20* |
| 3.06-3.03 | 0-20* |
| 2.919-2.891 | 0-20* |
| 2.894-2.867 | 0-20* |
| 2.868-2.842 | 0-20* |
| 2.830-2.804 | 10-40 |
| 2.750-2.726 | 5-30 |
| 2.731-2.707 | 5-30 |
| 2.710-2.686 | 0-20* |
| 2.659-2.636 | 5-30 |
| 2.545-2.524 | 5-30 |
| 2.418-2.399 | 0-20* |
| 2.405-2.387 | 0-20* |
| 2.379-2.361 | 5-30 |
| 2.326-2.309 | 0-10* |
| 2.119-2.105 | 0-20* |
| 2.096-2.082 | 0-20* |
| 2.039-2.026 | 0-20* |

*in some embodiments, one, some, or all these peaks can have non-zero intensities, e.g., ≥1.

The as-synthesized EMM-19 was activated by using the same method as that for as-synthesized ZIF-7, which was disclosed in U.S. Patent Application Publication No. 2009/0211440. Specifically, (1) a sample of about 100 mg of the as-synthesized EMM-19 was immersed in about 15 mL acetonitrile (3 times in ~3 days) at ambient temperature (about 20-25° C.) to achieve a partial exchange of the DMF solvent molecules occluded in the pores; (2) the solvent was decanted and the sample was dried under vacuum at ~200° C. for ~3 hours; (3) the dried sample was soaked in ~10 mL acetonitrile at ~75° C. for ~24 hours and then rinsed with fresh acetonitrile to give MeCN-exchanged EMM-9; and (4) the acetonitrile-exchanged sample was placed under vacuum (less than about 10 mTorr) at ~70° C. for about 10 hours to yield activated EMM-19. Table 1c, below left, details the precise XRD peak maxima in degrees two-theta and in d-spacing, with concomitant precise relative peak intensity, for an MeCN-exchanged EMM-19 sample made according to the procedure in this Example. Table 1d, below right, details acceptable ranges of XRD peak maxima in d-spacing only, with concomitant acceptable ranges of relative peak intensity, for MeCN-exchanged EMM-19 samples.

TABLE 1c

| 2-Theta | d spacing (Å) | Rel. intens. (%) |
|---|---|---|
| 7.21 | 12.25 | 43 |
| 7.93 | 11.14 | 92 |
| 10.72 | 8.25 | 29 |
| 11.96 | 7.40 | 37 |
| 13.32 | 6.64 | 21 |
| 13.75 | 6.44 | 45 |
| 14.38 | 6.16 | 11 |
| 15.88 | 5.58 | 63 |
| 16.42 | 5.39 | 100 |
| 18.44 | 4.81 | 16 |
| 19.21 | 4.62 | 34 |
| 19.95 | 4.448 | 98 |
| 21.53 | 4.125 | 72 |
| 23.00 | 3.863 | 20 |
| 23.72 | 3.748 | 49 |
| 23.97 | 3.710 | 36 |
| 26.28 | 3.389 | 17 |
| 27.70 | 3.218 | 22 |
| 28.89 | 3.088 | 21 |
| 30.29 | 2.949 | 13 |
| 32.44 | 2.757 | 20 |
| 32.90 | 2.721 | 8 |
| 33.53 | 2.671 | 16 |
| 34.25 | 2.616 | 31 |

TABLE 1d

| d spacing (Å) | Rel. intens. (%) |
|---|---|
| 12.5-12.0 | 20-70 |
| 11.4-10.9 | 60-100 |
| 8.36-8.13 | 10-40 |
| 7.49-7.30 | 20-70 |
| 6.72-6.57 | 10-40 |
| 6.51-6.37 | 20-70 |
| 6.22-6.09 | 5-30 |
| 5.63-5.52 | 30-80 |
| 5.44-5.35 | 60-100 |
| 4.85-4.77 | 5-30 |
| 4.65-4.58 | 20-70 |
| 4.48-4.42 | 60-100 |
| 4.15-4.10 | 50-90 |
| 3.89-3.84 | 5-30 |
| 3.77-3.72 | 20-70 |
| 3.73-3.69 | 20-70 |
| 3.41-3.37 | 5-30 |
| 3.23-3.20 | 10-40 |
| 3.10-3.07 | 10-40 |
| 2.963-2.934 | 5-30 |
| 2.770-2.745 | 5-30 |
| 2.733-2.709 | 0-20* |
| 2.682-2.659 | 5-30 |
| 2.627-2.605 | 20-70 |

*in some embodiments, one, some, or all these peaks can have non-zero intensities, e.g., ≥1.

The activated EMM-19 was stored under ambient conditions and used for further experiments described below, including solid-state NMR (Example 3), gas adsorption/desorption (Example 5), and seeded synthesis (Example 14).

Example 3

Solid-State $^{13}$C MAS NMR of ZIF-7 and EMM-19

Figure 5:
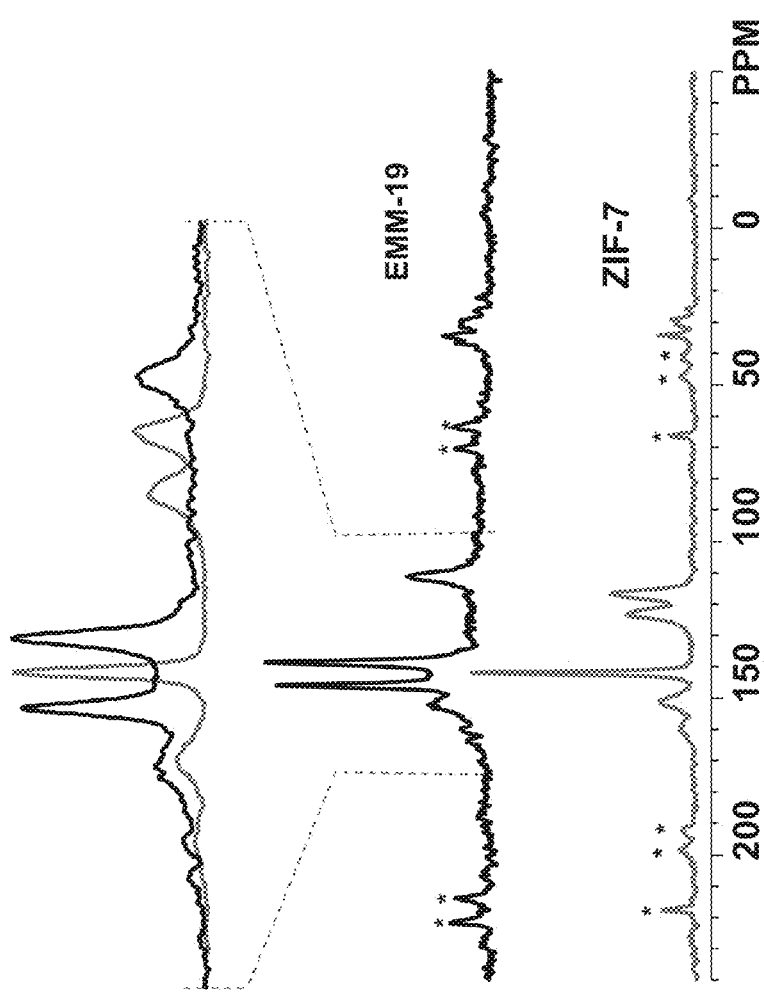
FIG. 5 shows solid-state magic-angle spinning 125 MHz $^{13}C$ NMR peaks for activated ZIF-7 and activated EMM-19, as measured in Example 3.

FIG. 5 provides a comparison of the activated EMM-19 product of Example 2 and activated ZIF-7, as measured by 125-MHz $^{13}$C magic-angle spinning (MAS) NMR. In FIG. 5, the spectrum for ZIF-7 is shown on the bottom, the spectrum for EMM-19 is shown in the middle, and zoomed superimposed spectra are shown on the top. Asterisks in FIG. 5 are believed to indicate spinning sidebands.

FIG. 5 shows distinct peaks corresponding to 5-azabenzimidazolate and benzimidazolate linkers, respectively, which are believed to support the conclusion that the organic linker content of EMM-19 was indeed substantially 5-azabenzimidazolate, thereby indicating an empirical formula of Zn(5-azabenzimidazolate)$_2$ for EMM-19.

Example 4

Preparation and Activation of ZIF-22

Figure 6:
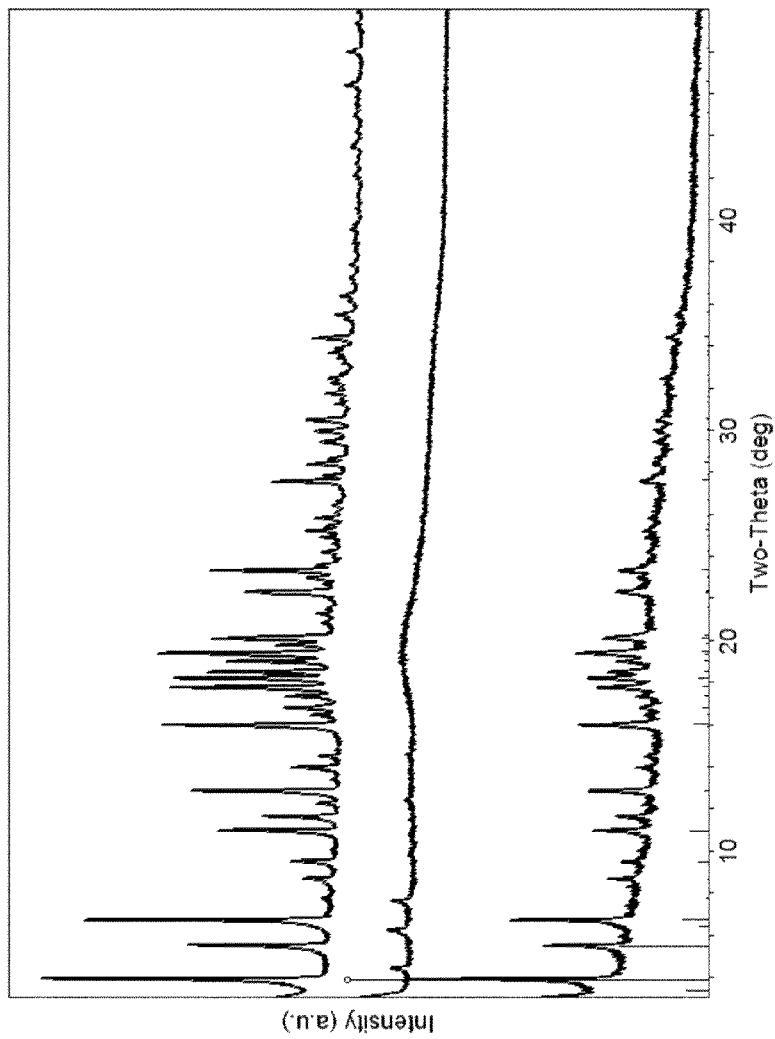
FIG. 6 is an overlay of the X-ray diffraction patterns of the as-synthesized ZIF-22 (top), acetonitrile-exchanged ZIF-22 (middle), and activated ZIF-22 (bottom) prepared in Example 4, and the calculated stick pattern for ZIF-22 based on single-crystal data (*Nat. Mater.*, 2007 (6), 501-596, Yaghi et al.).

To a solution of ~232 mg Zn(NO$_3$)$_2$.4H$_2$O and ~2 g 5-azabenzimidazole in ~20 mL DMF in a glass vial was added ~244 µL triethylamine by using a micro-pipette. After the resulting mixture was substantially homogenized by sonication, it was transferred to a PTFE cup of a ~45-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3), stored in DMF, and labelled "as-synthesized ZIF-22". The purity of the product was confirmed by the excellent agreement of the powder X-ray diffraction pattern of as-synthesized ZIF-22 and the calculated pattern based on the crystal structure of ZIF-22 determined by single-crystal X-ray crystallography (FIG. 6).

An attempt to exchange the DMF solvent molecules occluded in as-synthesized ZIF-22 with acetonitrile, by using the procedure established for EMM-19 and ZIF-7 (Example 2), proved unsuccessful. This was evidenced by the compromised powder X-ray diffraction pattern of acetonitrile-exchanged ZIF-22 (FIG. 6).

Instead, the as-synthesized ZIF-22 was activated according to a procedure disclosed in the article "Insight into the crystal synthesis, activation and application of ZIF-20", *RSC Advances*, Vol. 1, 2011, pp. 917-22 by Seoane et al. (ZIF-20 is the purine counterpart of ZIF-22). Specifically, (1) a sample of about 110 mg as-synthesized ZIF-22 was dried on a vacuum line (ultimate vacuum of about 20 mTorr) at ~70° C. for about 6 hours to remove the DMF at the external surface of the sample and possibly the loosely occluded DMF inside the pores; (2) the dried sample was transferred to a glass vial, thoroughly washed with chloroform (~15 mL×3), and then continuously stirred in ~15 mL chloroform by using a magnetic stirrer at ambient temperature (about 25° C.) for about 30 hours; (3) the chloroform-exchanged sample was evacuated on a vacuum line (ultimate vacuum of about 20 mTorr) at ~70° C. for about 10 hours to yield "activated ZIF-22". The activated ZIF-22 sample prepared through chloroform-exchange had retained the original crystalline framework structure (FIG. 5).

Example 5

Comparison of Adsorption/Desorption Properties of EMM-19, ZIF-7, and ZIF-22

CO$_2$ and N$_2$ adsorption/desorption isotherms were measured at ~28° C. for the activated EMM-19 of Example 2, the activated ZIF-22 of Example 4, and an activated ZIF-7, with two separate CO$_2$ isotherm experiments, starting at two different pressure points, being conducted for the EMM-19 sample.

Figure 7:
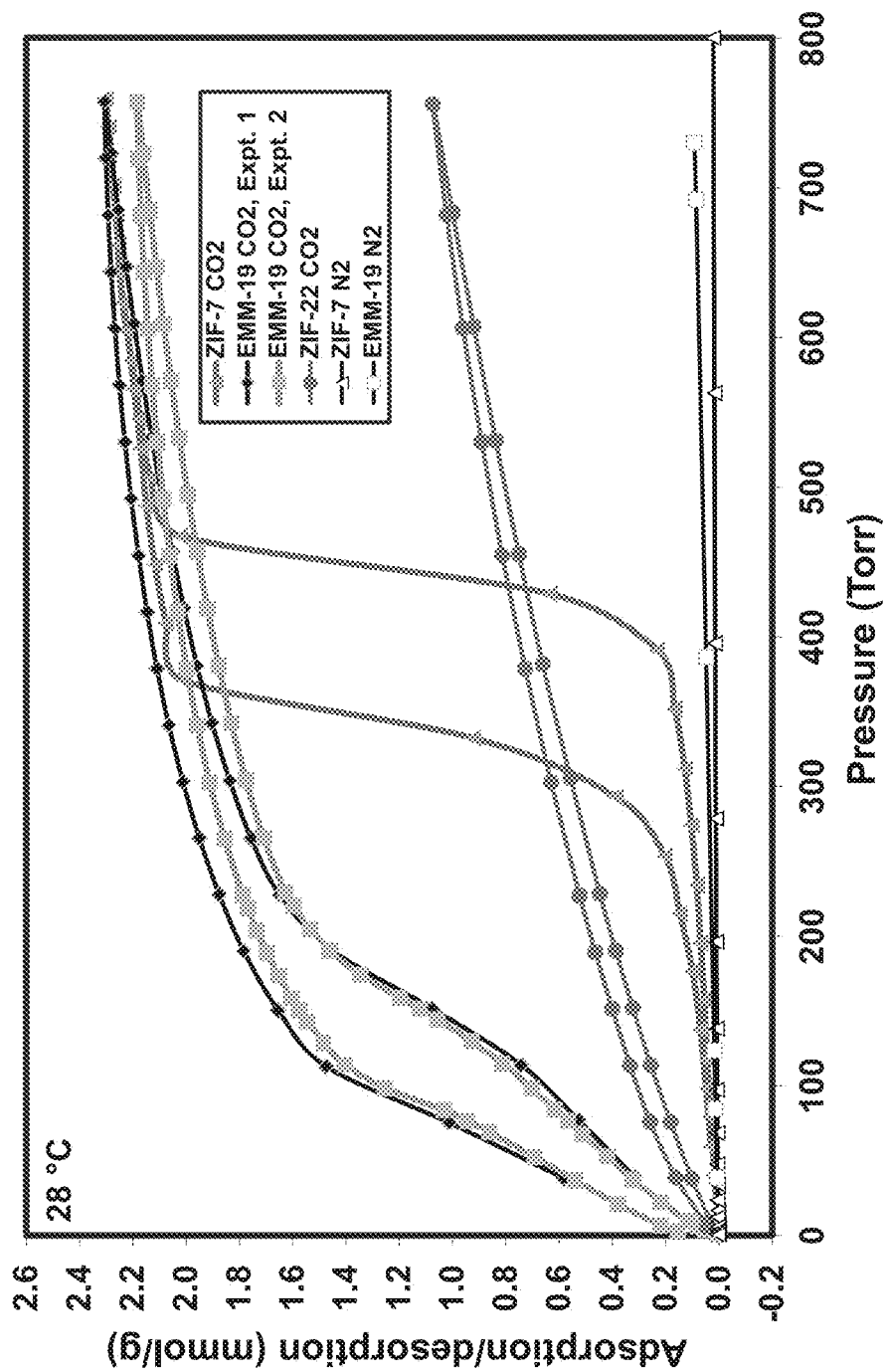
FIG. 7 shows $CO_2$ adsorption/desorption isotherms for ZIF-7, ZIF-22, and two different experiments for EMM-19, as well as $N_2$ adsorption/desorption isotherms for ZIF-7 and EMM-19.

FIG. 7 compares the CO$_2$ isotherms for EMM-19, ZIF-7, and ZIF-22, and the N$_2$ isotherms for EMM-19 and ZIF-7, with solid symbols being used for the adsorption branches and open symbols for the desorption branches. FIG. 7 seems to show that EMM-19 sorbed more CO$_2$ at a lower CO$_2$ partial pressures, compared to that observed for ZIF-7. In addition, FIG. 7 seems to show that the isotherm of ZIF-22 did not exhibit step-shaped hysteresis and that ZIF-22 exhibited far lower adsorption capacities at ~760 Torr (~1.1 mmol/g) and ~76 Torr (~0.18 mmol/g) CO$_2$ partial pressures, as compared to the EMM-19 samples, over the measured pressure range.

FIG. 7 also seems to show, based on the CO$_2$ isotherms of EMM-19 and ZIF-7, that both materials exhibited a step-shaped hysteresis and exhibited a CO$_2$ adsorption capacity of about 2.0-2.2 mmol/g at about 760 Torr (i.e., in the near-plateau region after the step on the adsorption branch), but differed significantly in the onset point of the step, with the uptake threshold CO$_2$ partial pressure having shifted to a much lower pressure for EMM-19 (about 400 Torr for ZIF-7, less than about 50 Torr for EMM-19). Consequently, EMM-19 appeared to adsorb more CO$_2$ than ZIF-7 in the relatively low CO$_2$ partial pressure region.

Without being bound by theory, the enhanced CO$_2$ adsorption at lower partial pressures observed for EMM-19 was believed to indicate the suitability of the material for separating CO$_2$ from lower-pressure gas streams, for example, carbon capture for flue gas streams, in which a major challenge can be to separate CO$_2$ (minor component) from N$_2$ (major component).

Even though process schemes can be designed to operate at low ratios of adsorption loading (in mmol/g) for the minor component (CO$_2$) vs. the adsorption loading (in mmol/g) for the major component (in this case, N$_2$), it can be preferred in some embodiments for an adsorptive loading ratio for CO$_2$ over N$_2$ for the ZIF material be at least 5, e.g., at least 10, at least 15, at least 20, at least 25, at least 30, at least 35, at least 40, at least 45, or at least 50. Since the required equipment size, cost, and operating expenses can tend to be significantly lowered at higher adsorptive loading ratios, the separations processes can become much more attractive by utilizing materials and conditions that lead to higher adsorptive loading ratios. The adsorptive loading ratio is a property for a specific adsorbate-adsorbent pair, at given conditions of pressure and temperature ("standard" conditions of pressure and temperature can be measured at either operating partial pressures for the specific components and operating temperature conditions for the feedstream contacting the ZIF-containing adsorbent, or alternately at single component testing conditions, such as about 301 K (about 28° C.) and about 106.6 kPaa (about 800 Torr)). Other details of adsorptive loading ratios of CO$_2$ over N$_2$ for ZIF materials, and their context in commercial separations processes, can be found, e.g., in U.S. Patent Application Publication No. 2009/0214407.

Examples 6-11

Other Linker Exchange Reactions in DMF

A series of further linker exchange reactions using DMF as the solvent for different ZIF starting materials (in this case, ZIF-8 and ZIF-7) and different imidazole starting materials (in this case, 5-azabenzimidazole, 4-azabenzimidazole, and purine) were conducted as Examples 6-11. The results are summarized in Table 2 below.

Example 6

Exchange of ZIF-8 with 4-Azabenzimidazole

A clear solution of ~500 mg 4-azabenzimidazole in ~5 mL DMF was prepared in a glass vial, and then added to ~50 mg of solid ZIF-8, which was previously weighed out in a PTFE cup of a ~45-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 8:
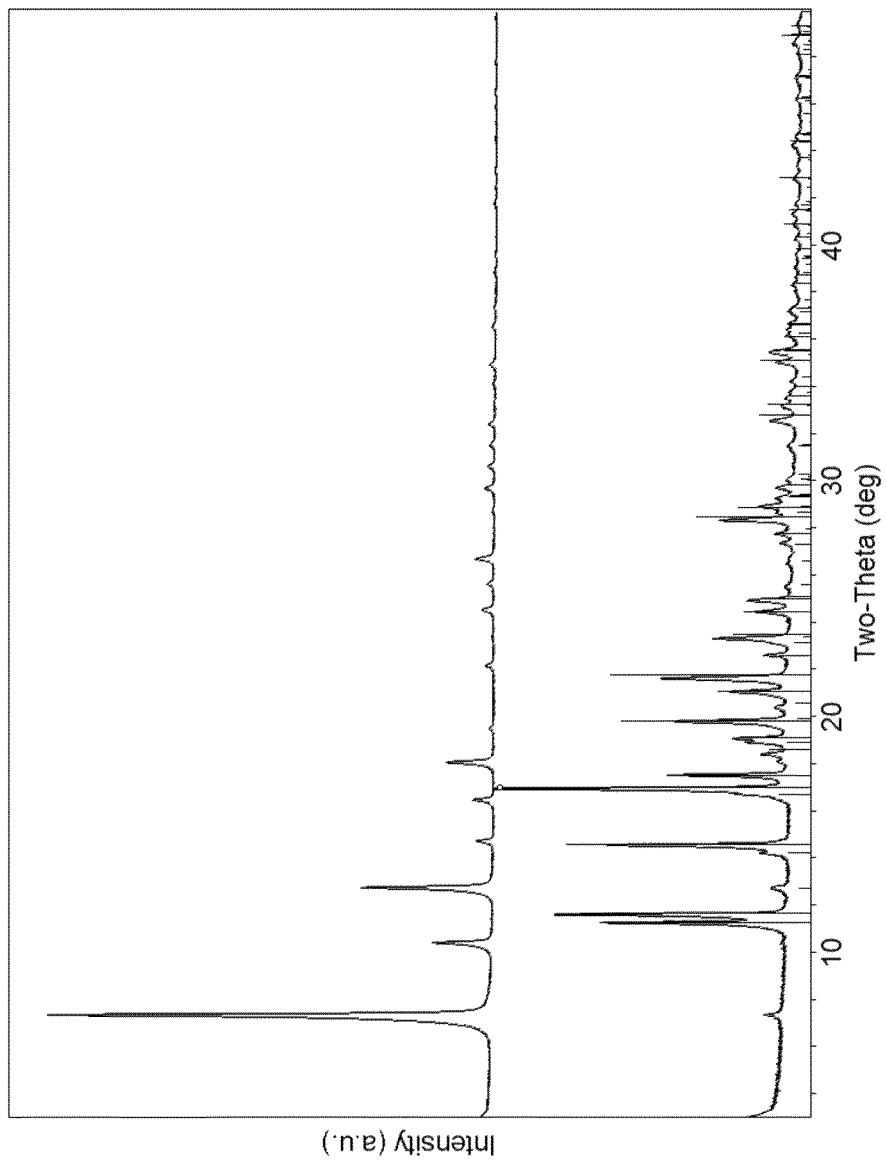
FIG. 8 is an overlay of the X-ray diffraction patterns of the ZIF-8 starting material (top), the product of Example 6 (middle), and the calculated stick pattern for ZIF-23 (bottom) based on single-crystal data (*Nat. Mater.*, 2007 (6), 501-596. Yaghi et al.).

As indicated by the powder X-ray diffraction patterns shown in FIG. 8, the product appeared to comprise a mixture of ZIF-23 (DIA) with a small amount of unreacted ZIF-8 (SOD).

Example 7

Exchange of ZIF-8 with 5-Azabenzimidazole

A clear solution of ~200 mg 5-azabenzimidazole in ~15 mL DMF was prepared in a glass vial, and then added to ~50 mg of solid ZIF-8, which was previously weighed out in a PTFE cup of a ~45-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 9:
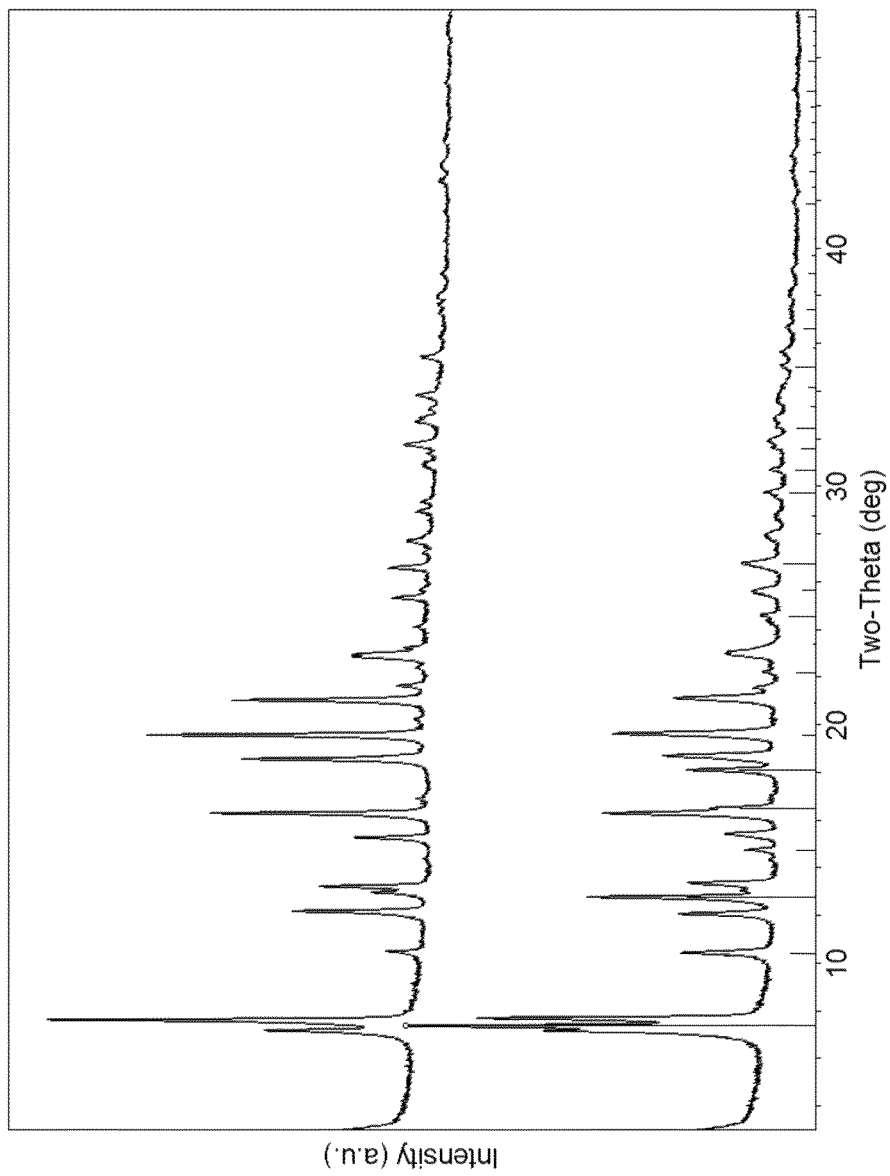
FIG. 9 is an overlay of the X-ray diffraction patterns of the as-synthesized EMM-19 of Example 2 (top), the product of Example 7 (middle), and the calculated stick pattern for ZIF-8 (bottom) based on single-crystal data (*Proc. Nat. Acad. Sci.*, U.S.A., 2006 (103), 10186-10191, Yaghi et al.).

As indicated by the powder X-ray diffraction patterns shown in FIG. 9, the product appeared to comprise a mixture of EMM-19 (SOD) and unreacted ZIF-8 (SOD).

Example 8

Exchange of ZIF-8 with 4-Azabenzimidazole

A clear solution of ~200 mg 4-azabenzimidazole in ~15 mL DMF was prepared in a glass vial, and then added to ~50 mg of solid ZIF-8, which was previously weighed out in a PTFE cup of a ~45-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 10:
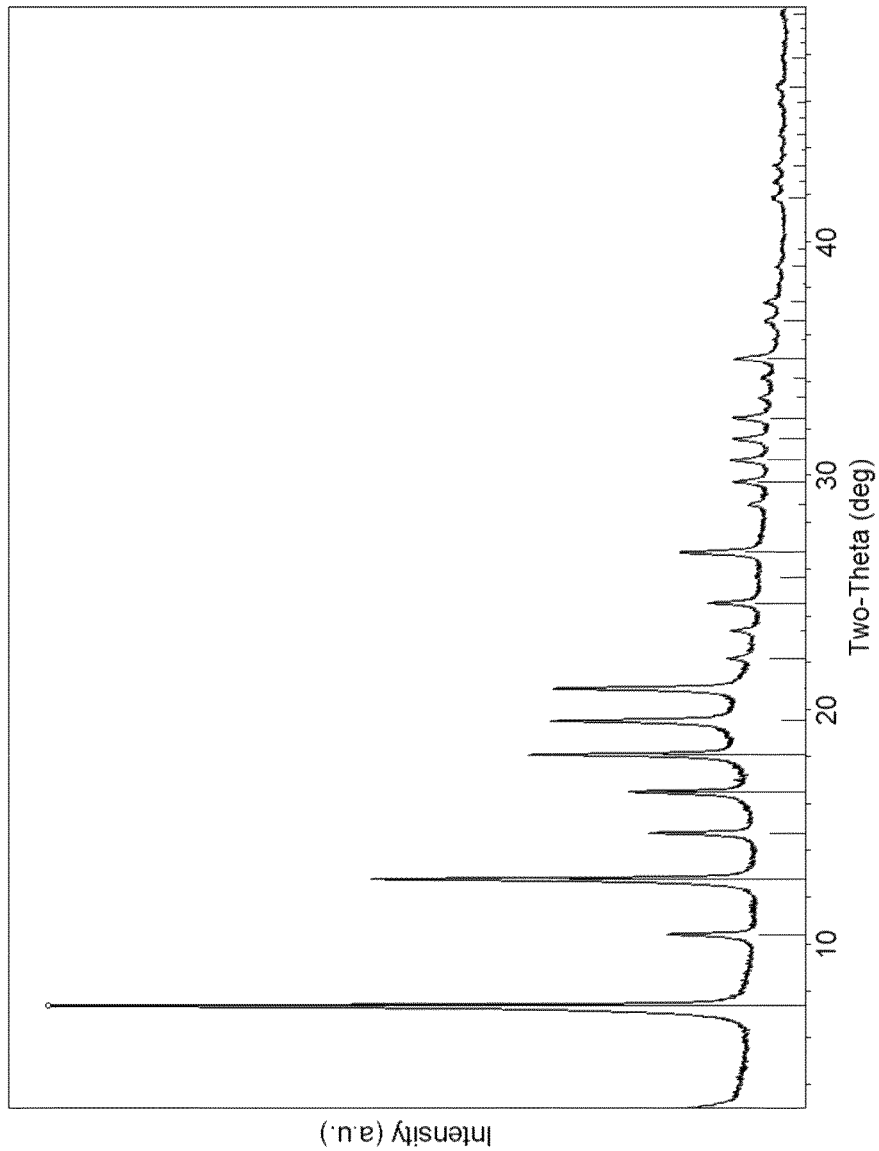
FIG. 10 is an overlay of the X-ray diffraction patterns of the product of Example 8 (top) and the calculated stick pattern for ZIF-8 (bottom) based on single-crystal data (*Proc. Nat. Acad. Sci.*, U.S.A., 2006 (103), 10186-10191. Yaghi et al.).

As indicated by the powder X-ray diffraction patterns shown in FIG. 10, the product appeared to be unreacted ZIF-8 (SOD).

Example 9

Exchange of ZIF-8 with Purine

A clear solution of ~200 mg purine in ~15 mL DMF was prepared in a glass vial, and then added to ~50 mg of solid ZIF-8, which was previously weighed out in a PTFE cup of a ~23-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 11:
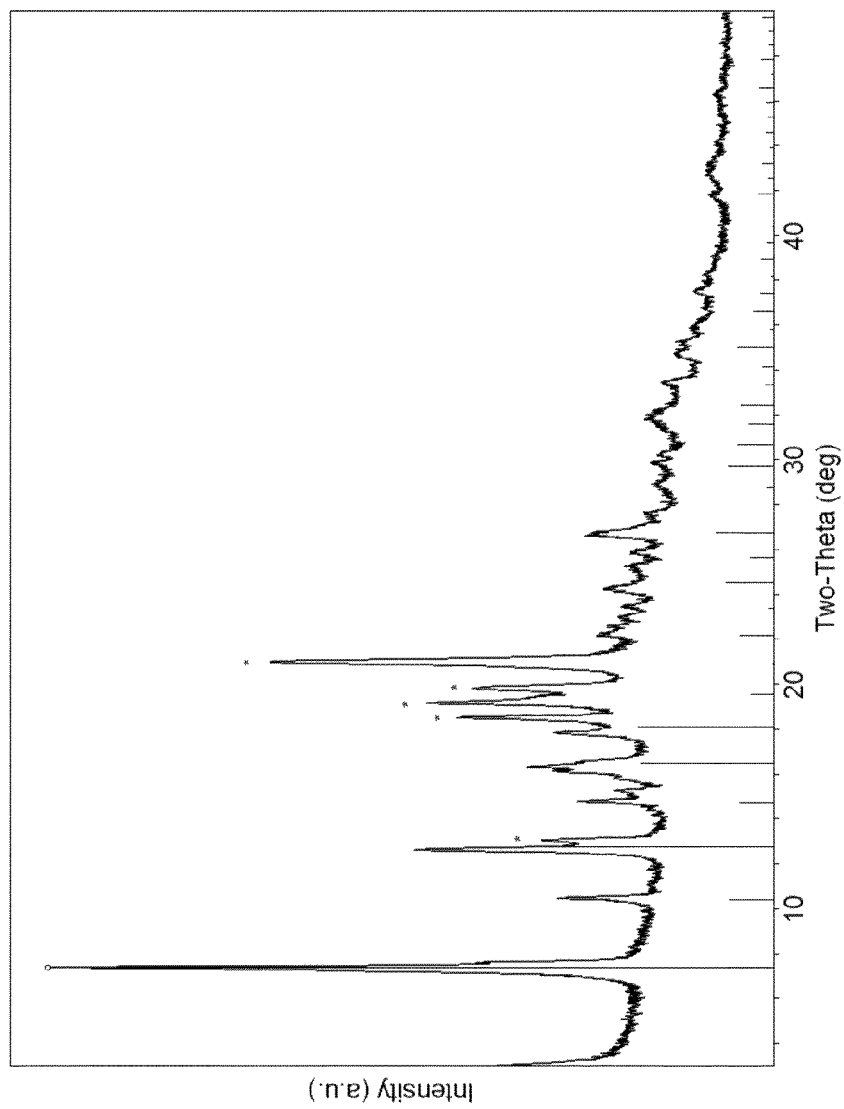
FIG. 11 is an overlay of the X-ray diffraction patterns of the product of Example 9 (top) and the calculated stick pattern for ZIF-8 (bottom) based on single-crystal data (*Proc. Nat. Acad. Sci.* U.S.A., 2006 (103), 10186-10191, Yaghi et al.).

As indicated by the powder X-ray diffraction patterns shown in FIG. 11, the product appeared to comprise a mixture of unreacted ZIF-8 (SOD) with an unidentified crystalline phase. The diffraction peaks corresponding to the unidentified phase (with asterisk marks) all appeared at two-theta angles greater than about 13°, which can typically indicate a small unit cell, and thus are likely believed to indicate the presence of a dense/non-porous phase.

Example 10

Exchange of ZIF-7 with 5-Azabenzimidazole

A clear solution of ~1 g 5-azabenzimidazole in ~10 mL DMF was prepared in a glass vial, and then added to ~100 mg of solid activated ZIF-7, which was previously weighed out in a PTFE cup of a ~45-mL Parr bomb. The Parr bomb was then sealed and heated in an isothermal oven at ~140° C. for about 72 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 12:
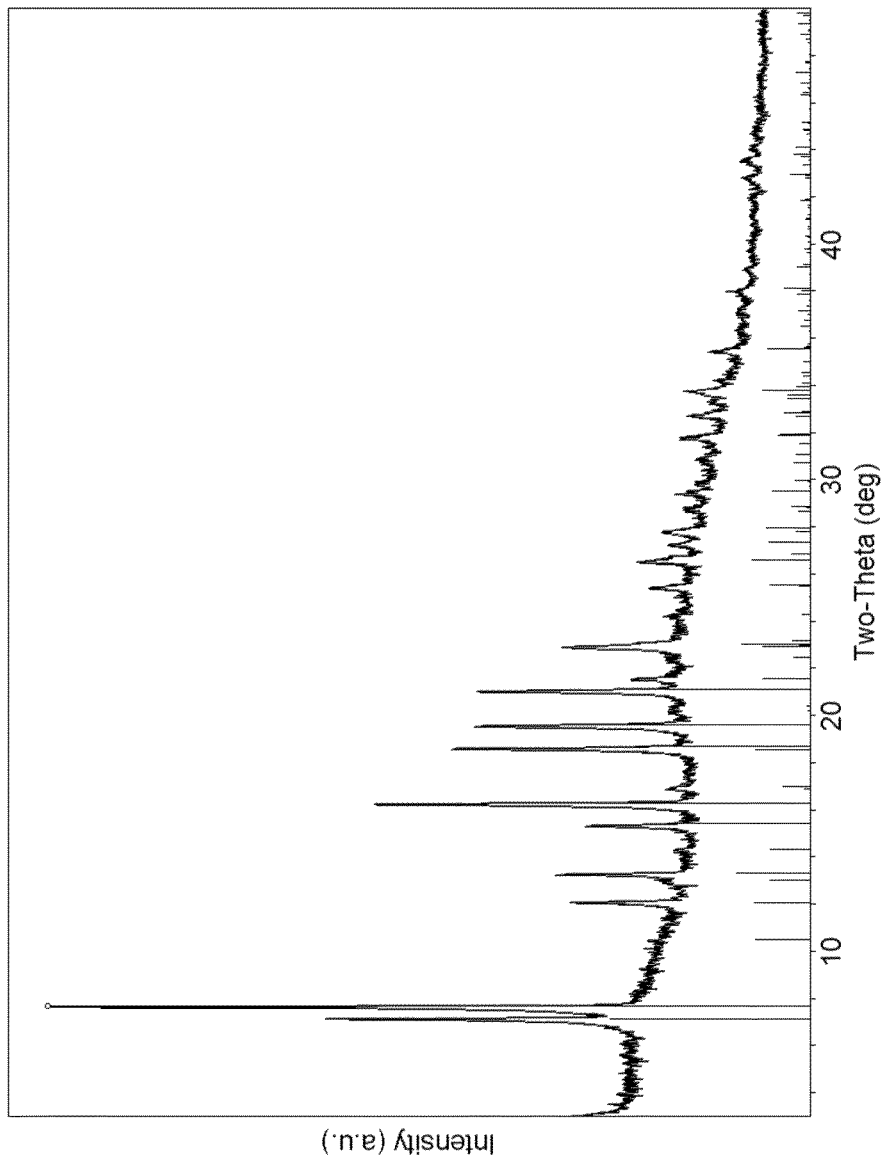
FIG. 12 is an overlay of the X-ray diffraction patterns of the product of Example 10 (top) and the calculated stick pattern for ZIF-7 (bottom) based on single-crystal data (*Proc. Nat. Acad. Sci.*, U.S.A., 2006 (103), 10186-10191. Yaghi et al.).
Figure 13:
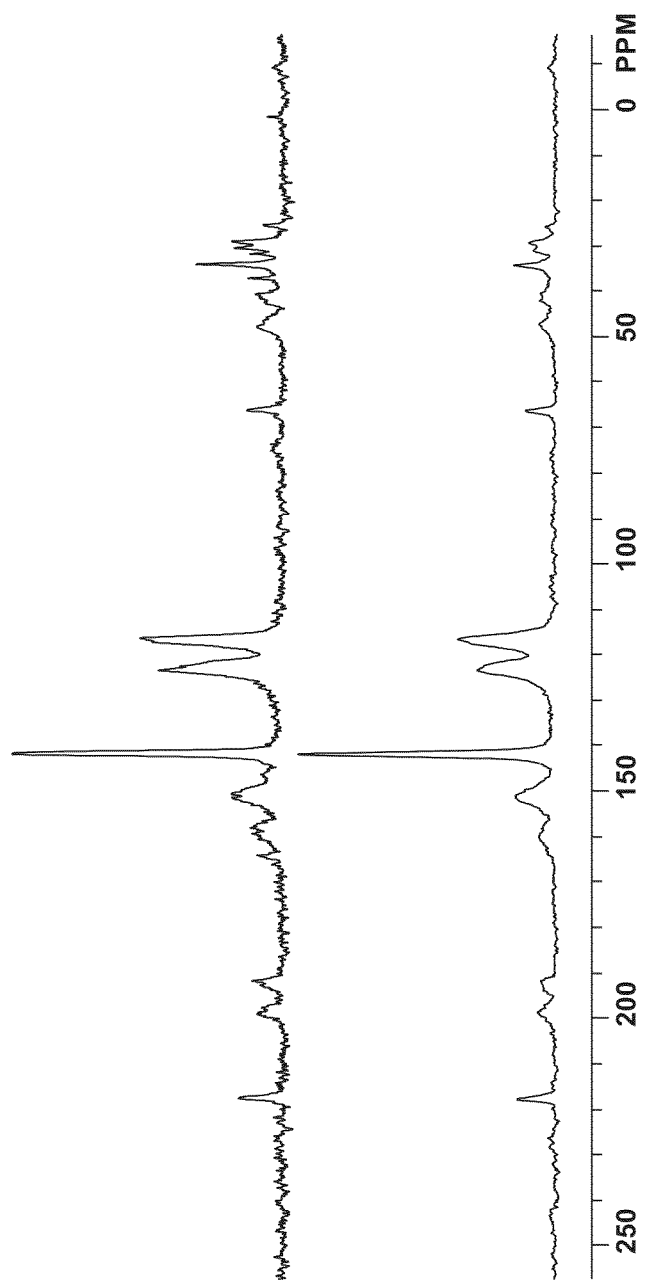
FIG. 13 is an overlay of the solid-state $^{13}C$ NMR spectra of the activated product of Example 10 (top) and activated ZIF-7 (bottom).

As shown in FIG. 12, the powder X-ray diffraction pattern of the as-synthesized product appeared identical to that of ZIF-7 (SOD). As shown in FIG. 13, the solid-state $^{13}C$ NMR data of the activated product appeared to confirm that the product was unreacted ZIF-7.

Example 11

Exchange of ZIF-7 with Purine

A clear solution of ~646 mg purine in ~6.5 mL DMF was prepared in a glass vial, and then added to ~65 mg of solid activated ZIF-7, which was previously weighed out in a PTFE cup of a ~45-mL Parr bomb. The Parr bomb was then sealed and heated in an isothermal oven at ~140° C. for about 72 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 14:
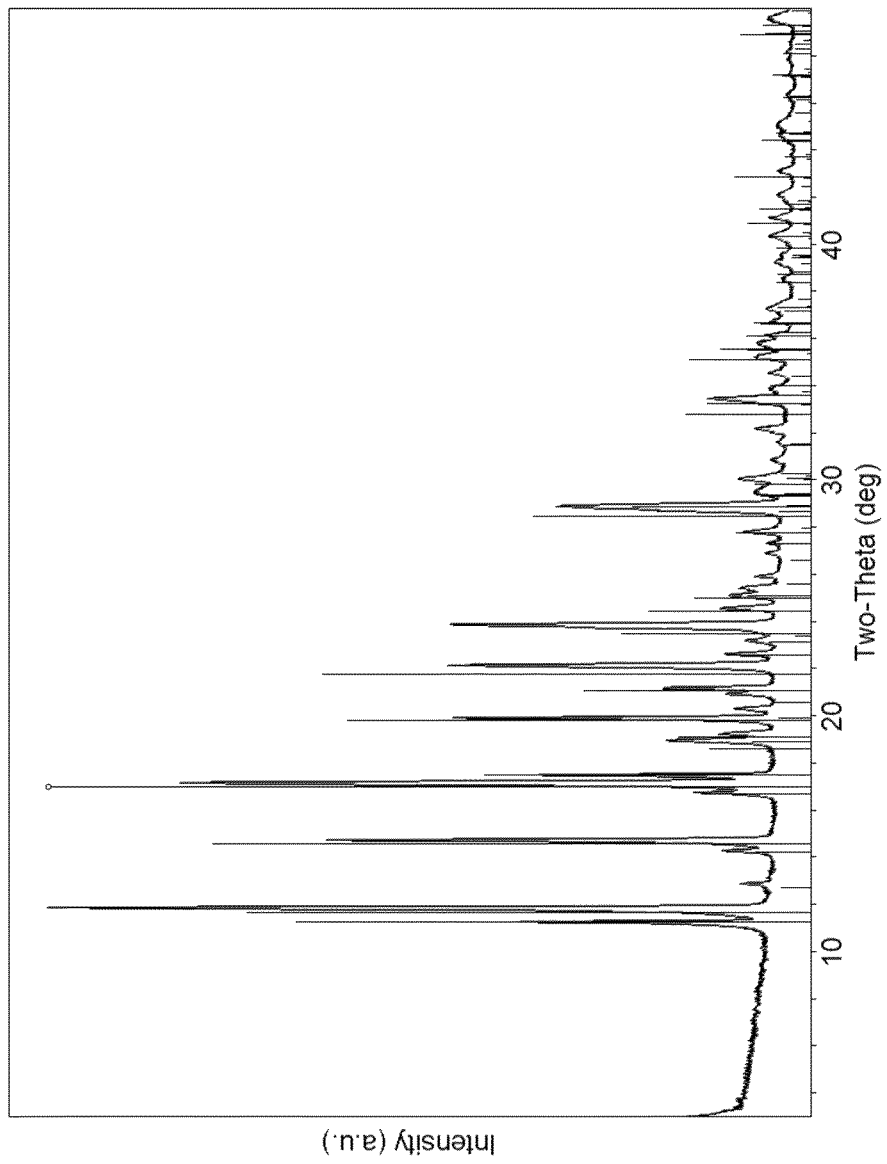
FIG. 14 is an overlay of the X-ray diffraction patterns of the product of Example 11 (top) and the calculated stick pattern for ZIF-23 (bottom) based on single-crystal data (*Nat. Mater.*, 2007 (6), 501-596, Yaghi et al.).

As shown in FIG. 14, the powder X-ray diffraction pattern of the product closely resembled that of ZIF-23 (DIA).

Figure 15:
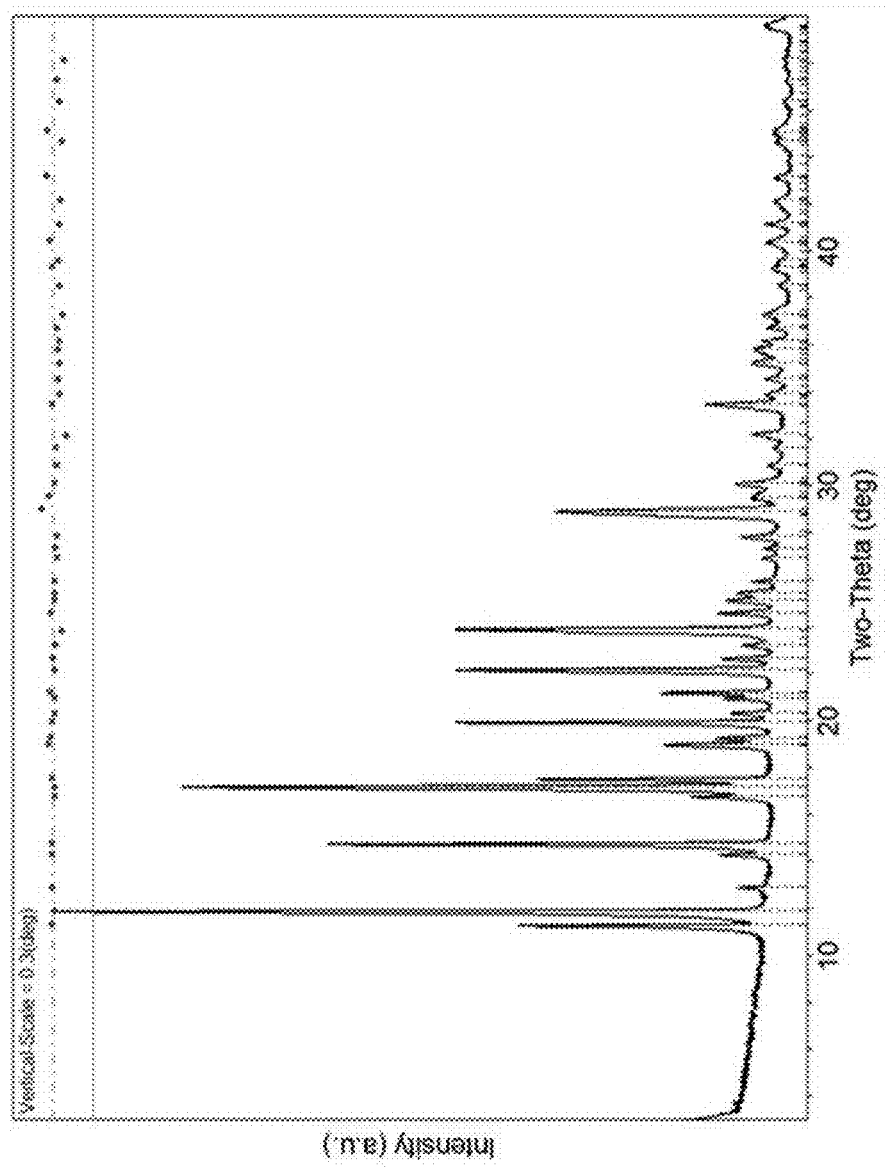
FIG. 15 shows the results of indexing the X-ray diffraction pattern of the product of Example 11 using Materials Data JADE 9 software.

As shown in FIG. 15, the powder X-ray diffraction pattern of the product was indexed by using Materials Data JADE 9 software to an orthorhombic unit cell, space group $P2_12_12_1$, a≈9.358 Å, b≈10.154 Å, c≈12.434 Å, α≈β≈γ≈90°, which was very close to that of ZIF-23 (orthorhombic, $P2_12_12_1$, a≈9.5477 Å, b≈10.1461 Å, c≈12.4459 Å, α≈β≈γ≈90°) reported in the Supplementary Information for "Zeolite A Imidazolate Frameworks", *Nature Materials*, Vol. 6, 2007, pp. 501-6 by Yaghi and co-workers. Without being bound by theory, it is believed that the product comprised the purine counterpart of ZIF-23, i.e., a Zn(purinate)$_2$ of the framework type DIA.

TABLE 2

| | Example No. | | | | | | |
|---|---|---|---|---|---|---|---|
| | 2 | 6 | 7 | 8 | 9 | 10 | 11 |
| Starting ZIF | ZIF-8 | ZIF-8 | ZIF-8 | ZIF-8 | ZIF-8 | ZIF-7 | ZIF-7 |
| Starting Linker[1] | 5-Aza | 4-Aza | 5-Aza | 4-Aza | Purine | 5-Aza | Purine |
| Linker/Zn (mol/mol) | 19 | 19 | 7.6 | 7.6 | 7.6 | 25 | 25 |
| Linker Conc. (mol/L) | 0.84 | 0.84 | 0.11 | 0.11 | 0.11 | 0.84 | 0.84 |
| Temperature (° C.) | 140 | 140 | 140 | 140 | 140 | 140 | 140 |
| Time (hour) | 24 | 24 | 24 | 24 | 24 | 72 | 72 |

[1]5-Aza = 5-azabenzimidazole; 4-Aza = 4-azabenzimidazole

Example 12

Linker Exchange Reactions for ZIF-8 in Acetonitrile

A series of three separate exchange reactions for ZIF-8 using acetonitrile as the solvent for different imidazole starting materials (in this case, 5-azabenzimidazole, 4-azabenzimidazole, and purine) were conducted as described below. The results are summarized in Table 3 below.

A solid mixture of ~50 mg ZIF-8 and ~200 mg 5-azabenzimidazole was placed in a ~20-mL glass vial. About 15 mL acetonitrile was added into the vial, and the mixture was homogenized by sonication. The vial was then capped and labeled as Reaction 1. The procedure described above was repeated twice, using respectively 4-azabenzimidazole (Reaction 2) and purine (Reaction 3), instead of 5-azabenzimidazole.

These three capped vials were placed in a ~300-mL autoclave. A small amount of acetonitrile was added into the autoclave to balance the acetonitrile vapor pressure inside the vials. The autoclave was then sealed and heated at ~140° C. for ~48 hours (~2° C./min ramp rate). After the autoclave had cooled naturally to ambient temperature (about 25° C.), the three reaction vials were retrieved from it. For each vial, the mother liquor was decanted, and the solid product was washed thoroughly with acetonitrile (~5 mL×3) and stored in acetonitrile.

Figure 16:
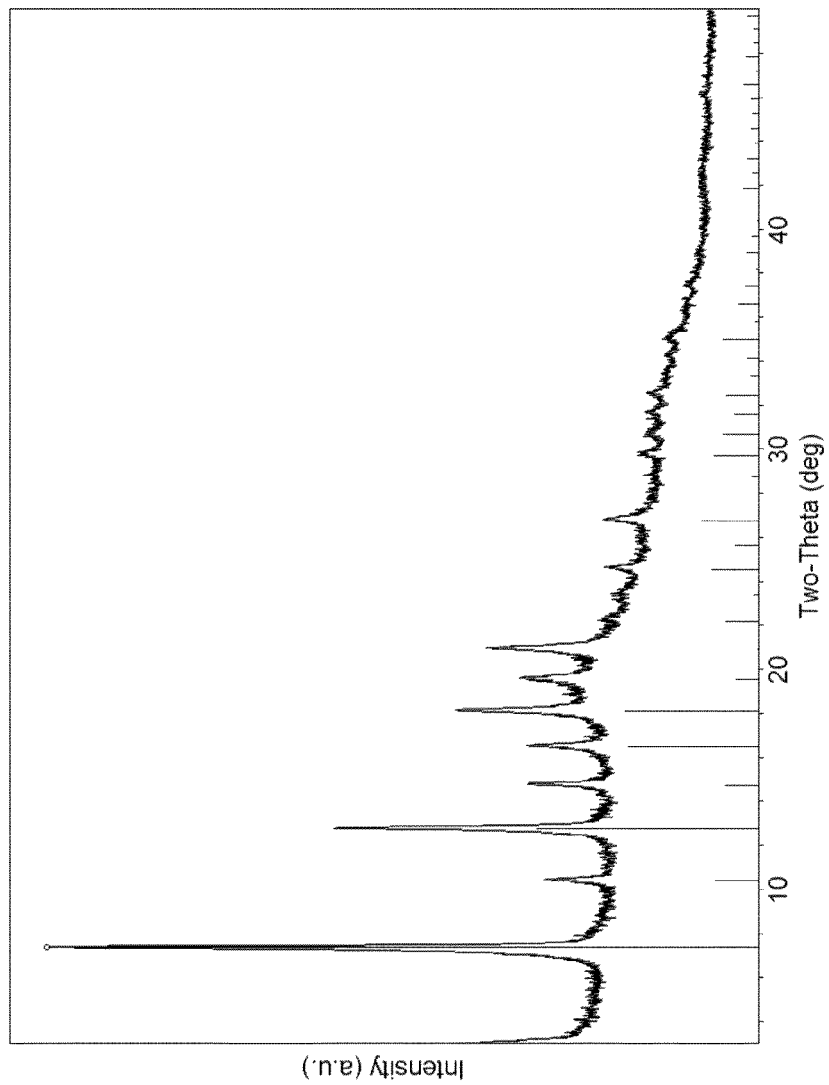
FIG. 16 is an overlay of the X-ray diffraction patterns of the product of Reaction 1 of Example 12 (top) and the calculated stick pattern for ZIF-8 (bottom) based on single-crystal data (*Proc. Nat. Acad. Sci.*, U.S.A., 2006 (103), 10186-10191, Yaghi et al.).

As indicated by the powder X-ray diffraction patterns shown in FIG. 16, the product of Reaction 1 was believed to comprise unreacted ZIF-8 (SOD).

Figure 17:
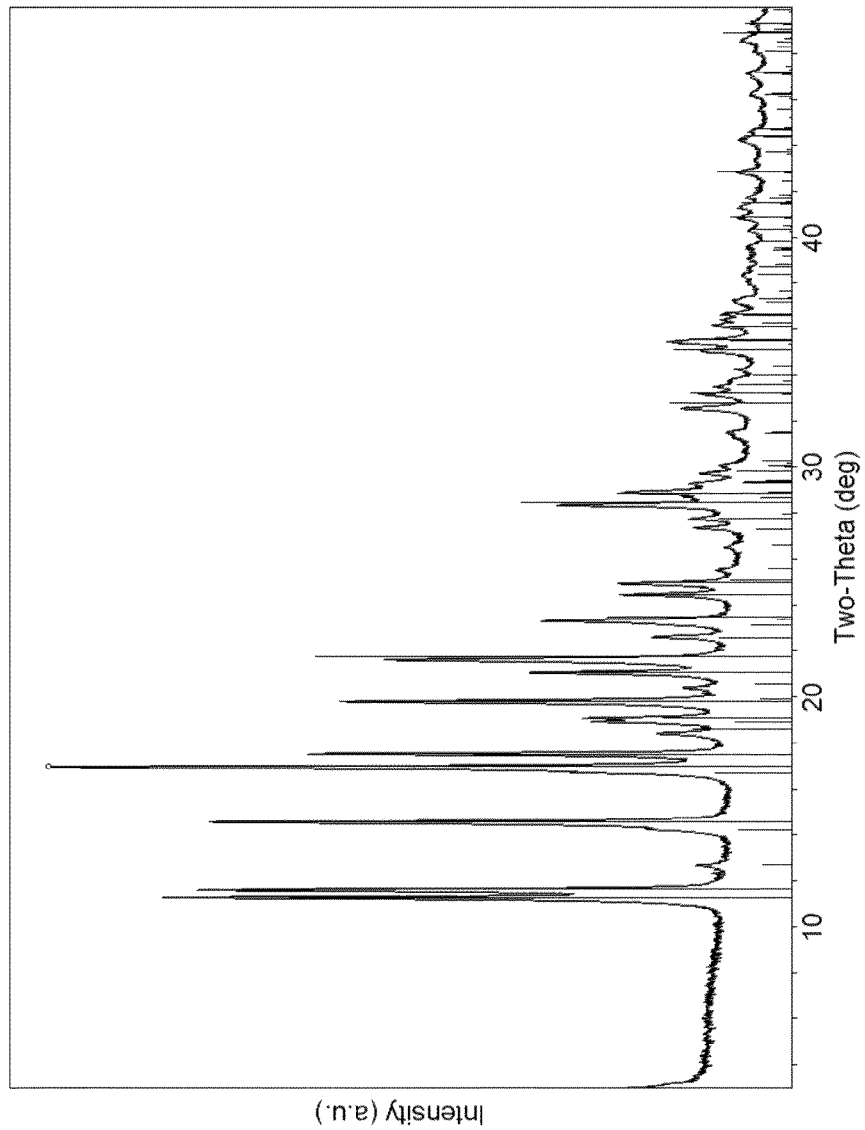
FIG. 17 is an overlay of the X-ray diffraction patterns of the product of Reaction 2 of Example 12 (top) and the calculated stick pattern for ZIF-23 (bottom) based on single-crystal data (*Nat. Mater.*, 2007 (6), 501-596, Yaghi et al.).

As indicated by the powder X-ray diffraction patterns shown in FIG. 17, the product of Reaction 2 was believed to comprise ZIF-23 (DIA).

Figure 18:
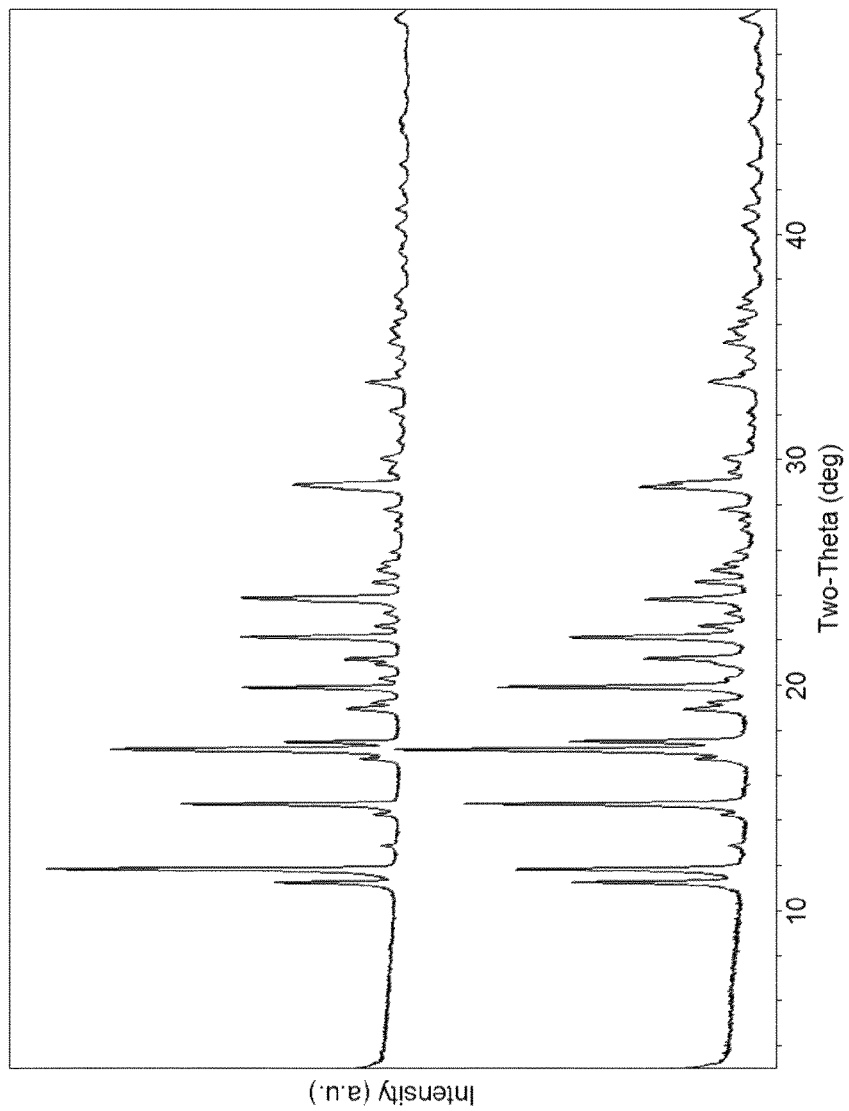
FIG. 18 is an overlay of the X-ray diffraction patterns of product of Example 11 (top) and the product of Reaction 3 of Example 12 (bottom).

As indicated by the powder X-ray diffraction patterns shown in FIG. 18, the product of Reaction 3 appeared to be the same as that of Example 11, i.e., a Zn(purinate)$_2$ of the framework type DIA.

TABLE 3

| | Reaction No. | | |
|---|---|---|---|
| | 1 | 2 | 3 |
| Starting ZIF | ZIF-8 | ZIF-8 | ZIF-8 |
| Starting Linker[1] | 5-Aza | 4-Aza | Purine |
| Linker/Zn (mol/mol) | 7.6 | 7.6 | 7.6 |
| Temperature (° C.) | 140 | 140 | 140 |
| Time (hour) | 48 | 48 | 48 |

[1]5-Aza = 5-azabenzimidazole; 4-Aza = 4-azabenzimidazole

Example 13

Solvothermal Synthesis in DMF Using ZnO as the Zinc Source

A clear solution of ~500 mg 5-azabenzimidazole in ~5 mL DMF was prepared in a glass vial, and then added to ~18 mg of solid ZnO, which was previously weighed out in a PTFE cup of a ~45-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 19:
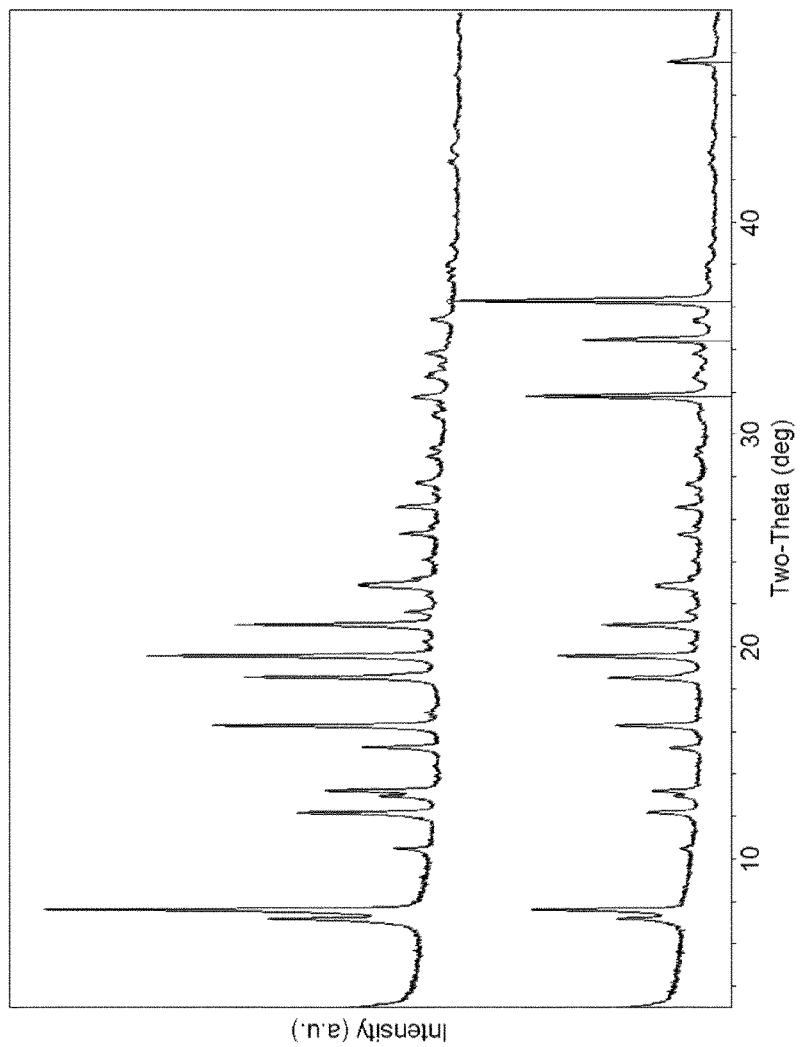
FIG. 19 is an overlay of the X-ray diffraction patterns of the as-synthesized EMM-19 of Example 2 (top), the product of Example 13 (middle), and the calculated stick pattern for zincite, ZnO (bottom).

As indicated by the powder X-ray diffraction patterns shown in FIG. 19, the product appeared to comprise a mixture of EMM-19 (SOD) and unreacted ZnO.

A comparison of the results of Example 13 with those of Example 2 are shown in Table 4 below.

TABLE 4

| | Example 2 | Example 13 |
|---|---|---|
| Zinc Source | ZIF-8 | ZnO |
| Starting Linker[1] | 5-Aza | 5-Aza |
| Linker/Zn (mol/mol) | 19 | 19 |
| Linker Conc. (mol/L) | 0.84 | 0.84 |
| Temperature (° C.) | 140 | 140 |
| Time (hour) | 24 | 24 |

[1]5-Aza = 5-azabenzimidazole

Example 14

Solvothermal Synthesis in DMF Seeded with EMM-19

A solution of ~1 g 5-azabenzimidazole and ~116 mg Zn(NO$_3$)$_2$.4H$_2$O in ~10 mL DMF was prepared in a glass vial, and then added to ~5 mg of solid activated EMM-19 (prepared according to Example 2), which was previously weighed out in a PTFE cup of a ~23-mL Parr bomb. The Parr bomb was then sealed and heated in an isothermal oven at ~140° C. for about 24 hours. After reaction, the Parr bomb was removed from the oven and allowed to cool naturally to ambient temperature (about 25° C.). Then, the Parr bomb was opened, the mother liquor decanted, and the solid product washed thoroughly with DMF (~5 mL×3) and stored in DMF.

Figure 20:
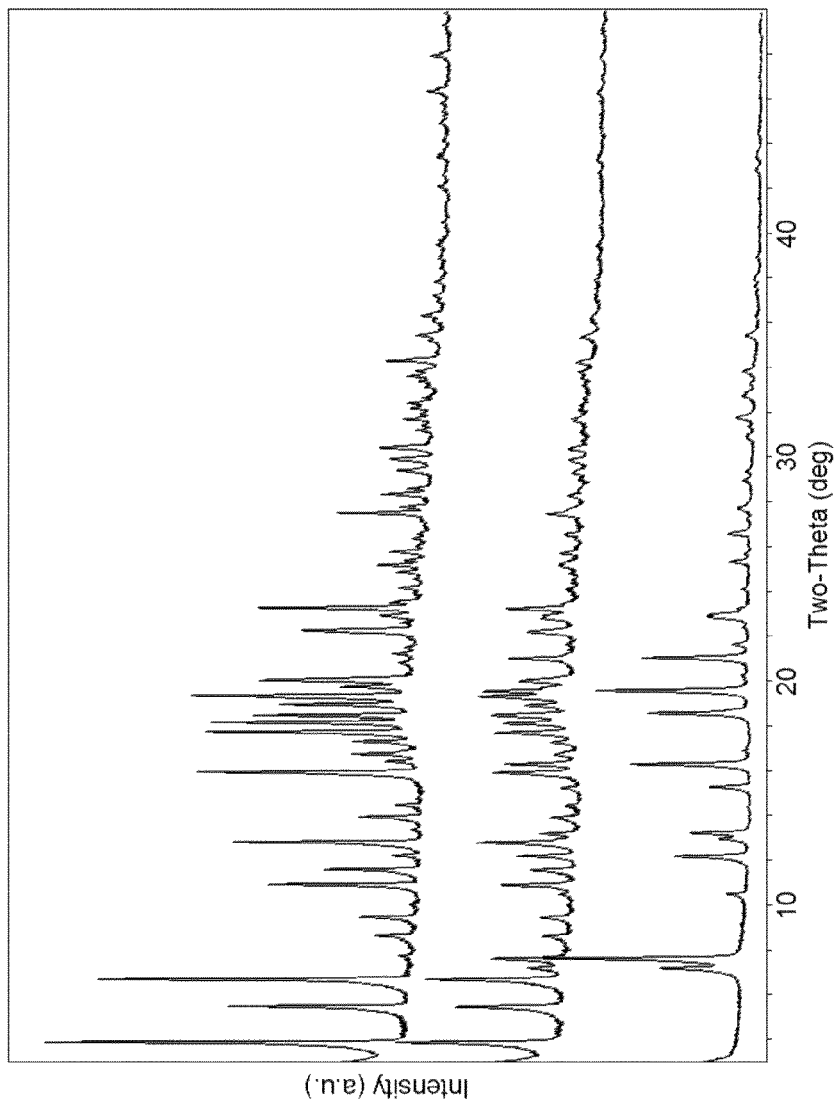
FIG. 20 is an overlay of the X-ray diffraction patterns of the as-synthesized ZIF-22 of Example 4 (top), the product of Example 14 (middle), and the as-synthesized EMM-19 of Example 2 (bottom).
Figure 21:
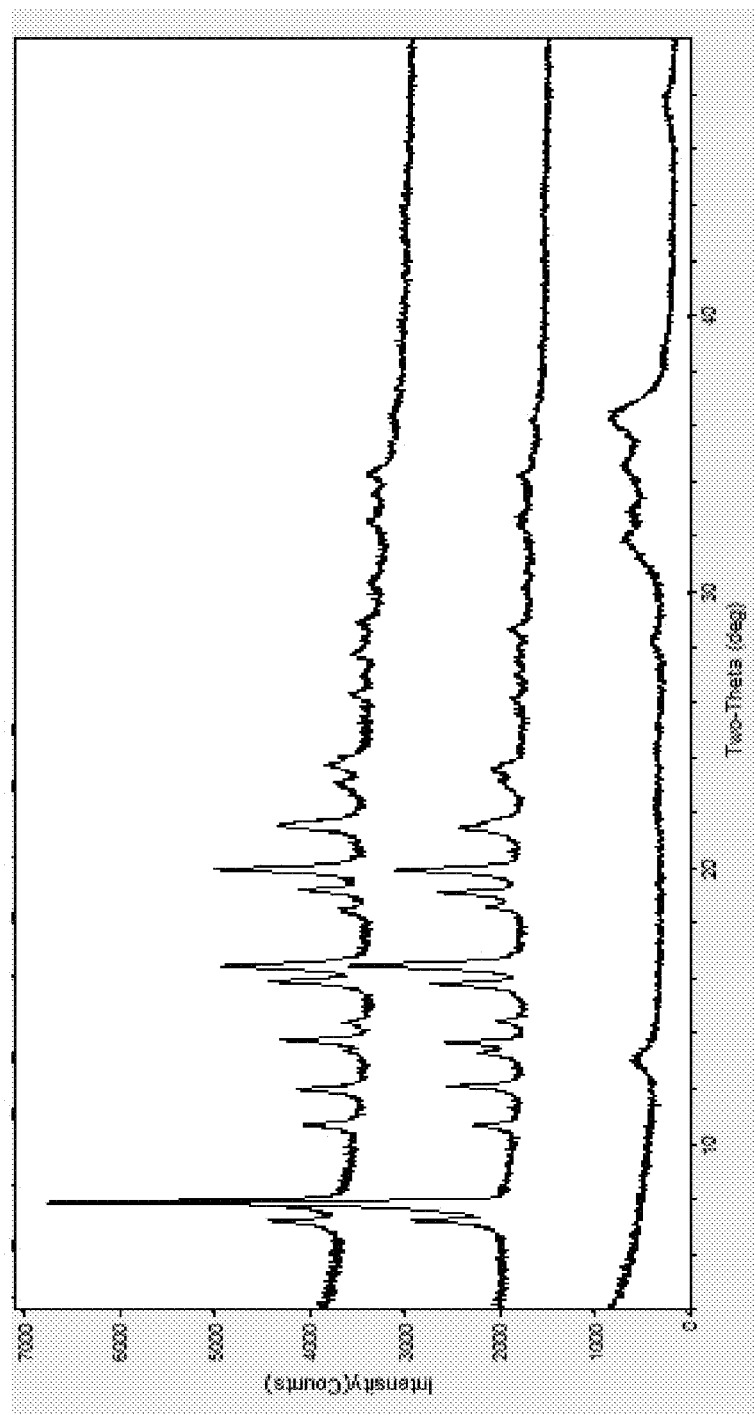
FIG. 21 is an overlay of the X-ray diffraction patterns of the product of Example 19 (middle); a product made according to the procedure of Example 2 (top); and a zinc oxide nanopowder from Strem Chemicals having an average particle size of ≤10 nm (bottom).
Figure 22:
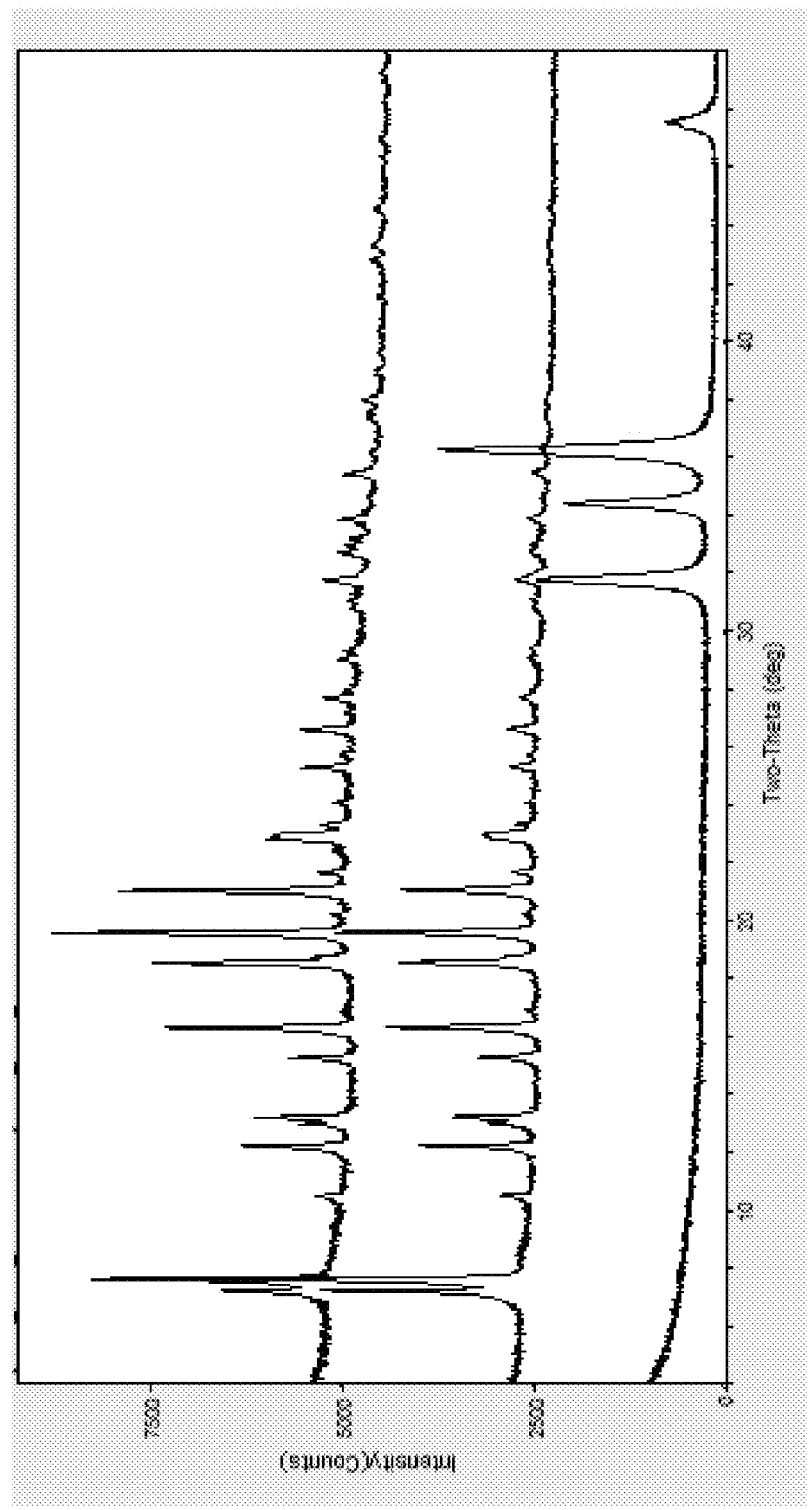
FIG. 22 is an overlay of the X-ray diffraction patterns of the product of Example 22 (middle); a product made according to the procedure of Example 2 (top); and a zinc oxide from Alfa Aesar having an average particle size of ~20 nm (bottom).
Figure 23:
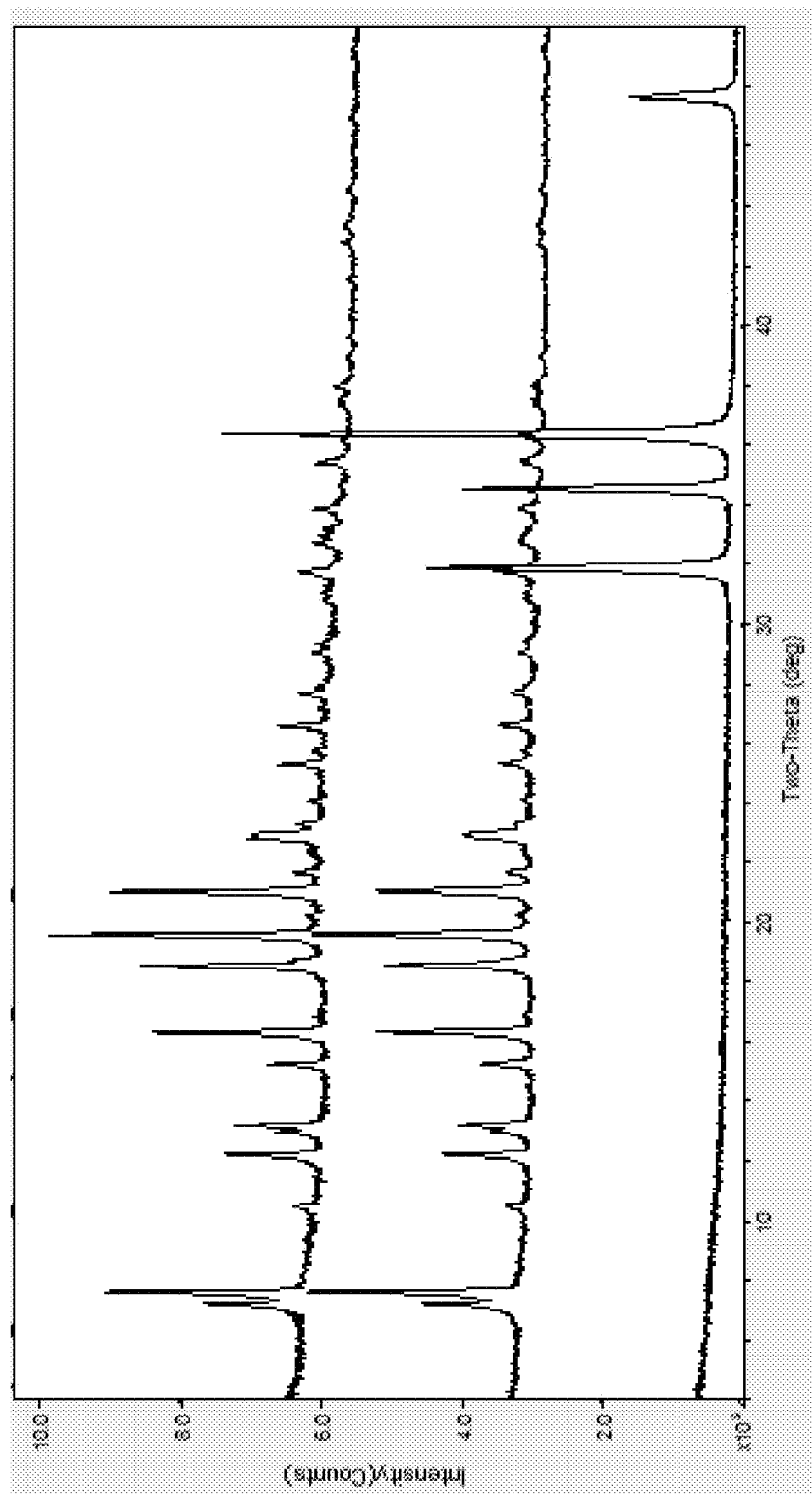
FIG. 23 is an overlay of the X-ray diffraction patterns of the product of Example 23 (middle); a product made according to the procedure of Example 2 (top); and a zinc oxide from Alfa Aesar having an average particle size of ~67 nm (bottom).
Figure 24:
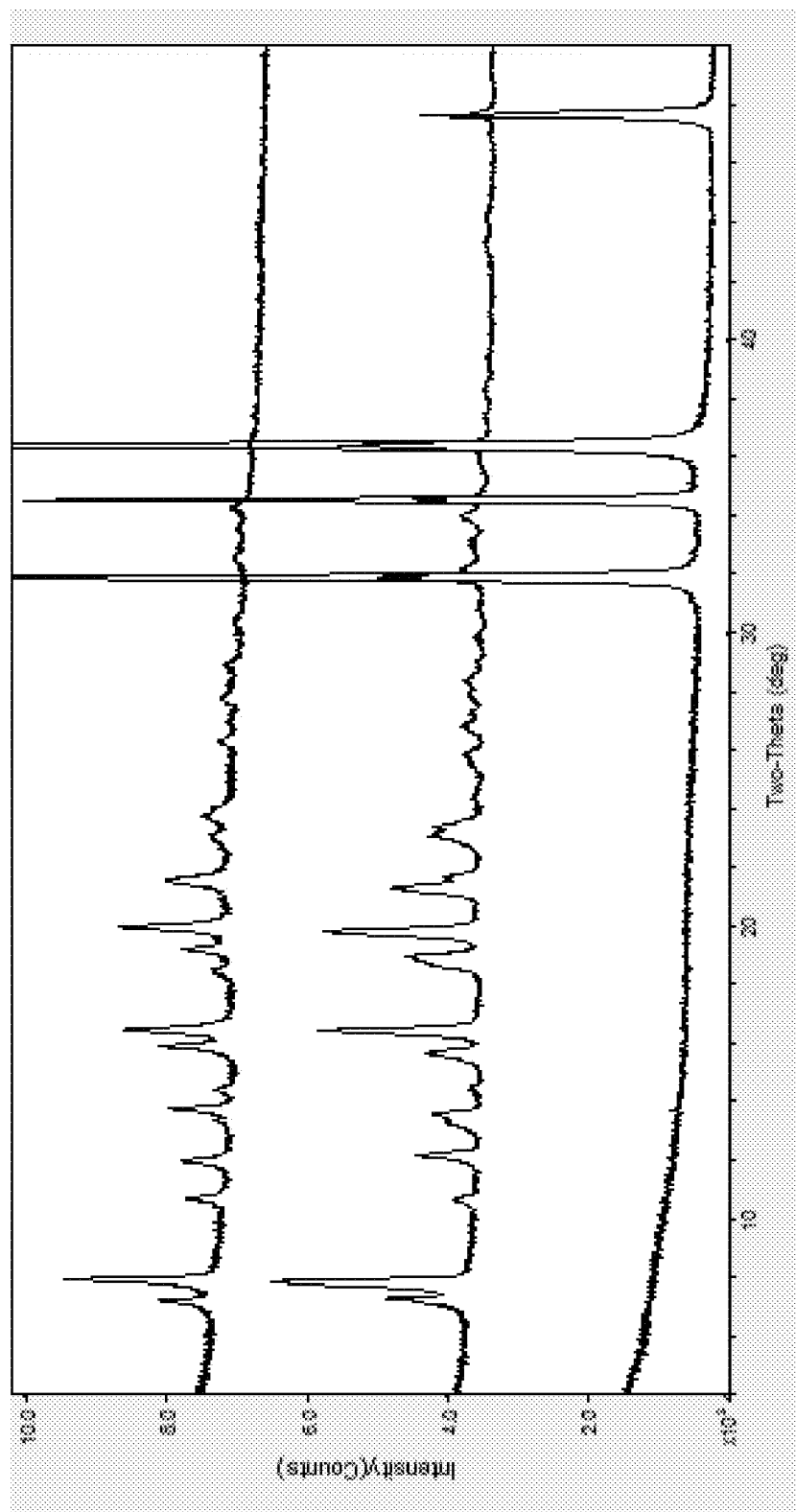
FIG. 24 is an overlay of the X-ray diffraction patterns of the product of Example 26 (middle); a product made according to the procedure of Example 2 (top); and a zinc oxide from Aldrich having an average particle size in the range from about 200 nm to about 500 nm (bottom).

As indicated by the powder X-ray diffraction patterns shown in FIG. 20, the product appeared to comprise a mixture of ZIF-22 (LTA) and EMM-19 (SOD), which appeared to indicate the relative ineffectiveness of seeding in inhibiting the formation of the commonly observed LTA phase, thus appearing to confirm a lack of fundamental change in the crystallization mechanism of the system.

A comparison of the results of Example 14 with those of Example 2 are shown in Table 5 below.

TABLE 5

|  | Example 2 | Example 14 |
|---|---|---|
| Zinc Source | ZIF-8 | $Zn(NO_3)_2 \cdot 4H_2O$ |
| Starting Linker[1] | 5-Aza | 5-Aza |
| Linker/Zn (mol/mol) | 19 | 19 |
| Linker Conc. (mol/L) | 0.84 | 0.84 |
| Temperature (° C.) | 140 | 140 |
| Time (hour) | 24 | 24 |
| Seed Crystal | None | EMM-19 |

[1]5-Aza = 5-azabenzimidazole

Example 15

Synthesis of ZIF-7 in Solvent Mixture of MeCN and TEA

A mixture of ~4.8 g (~40 mmol) benzimidazole and ~5.33 g (~20 mmol) $Zn(NO_3)_2 \cdot 4 H_2O$ in ~240 mL acetonitrile was prepared in a vessel and sonicated for about 20 minutes. Then ~5.66 mL (~40 mmol) of triethylamine (Brønsted base) was added and the corresponding mixture then sonicated for an additional ~40 minutes. The solution was then sealed in a Parr acid digestion bomb and heated in an isothermal oven at ~100° C. for about 48 hours. After reaction, the Parr bomb was removed from the oven and allowed to cool naturally to ambient temperature (about 25° C.). Then, the Parr bomb was opened, the mother liquor decanted, and the solid product washed thoroughly with acetonitrile (~90 mL×3) and stored in acetonitrile. Powder x-ray diffraction (not shown) of a dried slurry of the product indicated it was indeed ZIF-7. Further measurements indicated that the product also had a BET surface area of ~12.7 $m^2/g$ (sample was outgassed for ~3 hours at about 75° C.). A $CO_2$ adsorption isotherm on the product was also done on the product (also not shown), yielding relatively similar adsorption, desorption, and hysteresis behavior as a standard ZIF-7 product synthesized in DMF. These testing results appear to indicate that ZIF-7, or more generally potentially all ZIFs and MOFs (or some subset of ZIFs and MOFs), can be synthesized using solvents (or solvent mixtures) that have a relatively low boiling point and/or a relatively high vapor pressure, e.g., higher than DMF, and perhaps higher than water.

The significance of being able to use relatively low boiling point and/or a relatively high vapor pressure solvents/solvent mixtures as synthesis media is tied to the difficulty of removing detectable traces of higher boiling point and/or lower vapor pressure solvents, even under relatively severe and repeated solvent removal/exchange conditions. For instance, in the case of ZIF-8 made by a conventional synthesis in DMF and stored in DMF, experiments were undertaken to determine the severity of the treatment necessary to remove all traces of DMF from the ZIF-8 sample. $^{13}C$ SS-MAS Bloch decay NMR was used to detect trace amounts of DMF in each sample. A single solvent exchange with acetonitrile (desolvated of DMF at ambient temperature at a reduced pressure of no more than about 20 mTorr, then washed with excess MeCN, and desolvated again at ambient temperature at a reduced pressure of no more than about 20 mTorr) was ineffective at removing DMF—indeed, considerable DMF was still found to be detectable by NMR techniques. DMF was also still detectable upon drying a ZIF-8/DMF sample at a temperature of about 100° C. under a reduced pressure of no more than about 10 mTorr for about 2 hours, and even upon drying a ZIF-8/DMF sample at a temperature of about 250° C. (almost 100° C. higher than its atmospheric boiling point!) under a reduced pressure of no more than about 10 mTorr for about 2 hours. Only when a ZIF-8/DMF sample was dried at a temperature of about 250° C. under a reduced pressure of no more than about 10 mTorr overnight (for about 16 hours) were there no detectable traces of DMF, as measured by $^{13}C$ NMR techniques. As this exemplary case shows, considerable money, effort, time, and resources could be saved if such synthesis reactions were able to be conducted in solvents (or solvent mixtures) having relatively low boiling points and/or relatively high vapor pressures.

Examples 16-33

Syntheses Attempting to Form EMM-19 Using Solid ZnO Reactant

A series of synthesis reactions using relatively insoluble zinc oxide and 5-azabenzimidazole in DMF were conducted as Examples 16-29. Different molar proportions of the reactants and the solvent/medium were tested, as well as different zinc oxide sources having different particle sizes (and particle size distributions). The results are summarized in Table 6 below.

In Example 16, ~1.8 mmol of 5-azabenzimidazole was dissolved with stirring/sonication in ~230 mmol of N,N-dimethylformamide. The solution was then added to a ~23 mL Teflon™ liner containing ~150 mg of zinc oxide (~1.8 mmol) nanopowder having an average particle size ≤10 nm. The Teflon™ liner was then sealed in a Parr acid digestion bomb and heated in an isothermal oven to ~140° C. and tumbled (at ~40 rpm) for about 3 days. Upon cooling to room temperature (~20-25° C.), the product was filtered and the solids washed with DMF (~20 mL) and optionally acetonitrile (~20 mL). The product was transferred to a ~200-mL round bottom flask with ~100 mL of acetonitrile and stirred for ~24 hours. The solvent was removed (by filtration or a rotary evaporator) and another ~100 mL of acetonitrile was added and the mixture was stirred for another ~24 hours. That solvent washing/exchange process was repeated once more to obtain the acetonitrile-washed product. Activation was performed in vacuo by slowly heating the dried sample to ~200° C. over ~1 hour and holding the final temperature for ~3 hours before cooling back to room temperature. The solids were mixed with ~30 mL acetonitrile in a Parr bomb and heated to ~75° C. without stirring for ~24 hours. Filtration and washing of the solids with acetonitrile (~20 mL) yielded the acetonitrile-exchanged product(s) shown in Table 6 below.

The details of the preps of Examples 17-25 are similar to the Example 16 prep, but with the respective ZnO amounts/specifics and component molar ratios detailed in Table 6 below. It should be noted that Example 24 used the same prep as Example 23, except that the isothermal heating was done for ~7 days, instead of for ~3 days.

In Example 26, ~21 mmol (~2.5 g) of 5-azabenzimidazole was dissolved with sonication in ~290 mmol (~25 mL) of N,N-dimethylformamide. The solution was then added to a Teflon™ liner containing ~90 mg of zinc oxide (~1.1 mmol) from Aldrich (99.999%) having an average particle size estimated from SEM to be ~200-500 nm. The Teflon™ liner was then sealed in a Parr acid digestion bomb and heated in an isothermal oven to ~140° C. and tumbled (at ~40 rpm) for about 3 days. Upon cooling to room temperature (~20-25° C.), the product was filtered and the solids washed with DMF (~20 mL) and optionally acetonitrile (~20 mL) to obtain the as-synthesized product. The product was transferred to a ~200-mL round bottom flask with ~100 mL of acetonitrile and stirred for ~24 hours. The solvent was removed (by filtration or a rotary evaporator) and another ~100 mL of acetonitrile was added and the mixture was stirred for another ~24 hours. That solvent washing/exchange process was repeated once more to obtain the acetonitrile-washed product. Activation was performed in vacuo by slowly heating the dried sample to ~200° C. over ~1 hour and holding the final temperature for ~3 hours before cooling back to room temperature. The solids were mixed with ~30 mL acetonitrile in a Parr autoclave and heated to ~75° C. without stirring for ~24 hours, followed by filtration and another washing of the solids with acetonitrile (~20 mL) to yield the acetonitrile-exchanged product(s).

The details of the preps of Examples 27-33 are similar to the Example 26 prep, but with the respective ZnO amounts/specifics and component molar ratios detailed in Table 6 below.

TABLE 6

| Example | ZnO mass, in mg [source] | 5-aza (mol ratio) | Solvent (mol ratio) | Product(s) |
|---|---|---|---|---|
| 16 | ~150 [1] | ~1 | ~130 | EMM-19 + ZnO (~25%) |
| 17 | ~150 [1] | ~1 | ~63 | EMM-19 + ZnO (~23%) |
| 18 | ~25 [1] | ~10 | ~630 | EMM-19# |
| 19 | ~25 [1] | ~10 | ~300 | EMM-19# |
| 20 | ~20 [1] | ~20 | ~850 | EMM-19# |
| 21 | ~20 [1] | ~20 | ~420 | EMM-19# |
| 22 | ~50 [2] | ~10 | ~300 | EMM-19 + trace ZnO (≤3%) |
| 23 | ~50 [3] | ~10 | ~300 | EMM-19 + trace ZnO (~4%) |
| 24 | ~50 [3] | ~10 | ~300 | EMM-19 + trace ZnO (~4%) |
| 25 | ~50 [4] | ~10 | ~300 | ZnO |
| 26 | ~90 [5] | ~19 | ~290 | EMM-19 + ZnO (~23%) |
| 27 | ~20 [5] | ~19 | ~790 | No product isolated |
| 28 | ~20 [5] | ~34 | ~790 | EMM-19 + trace ZnO (~6%) |
| 29 | ~20 [5] | ~34 | ~1600 | No product isolated |
| 30 | ~80 [1] | ~2 | ~200 | EMM-19# |
| 31 | ~25 [1] | ~5 | ~510 | EMM-19# |
| 32 | ~50 [1] | ~2.2 | ~250 | EMM-19# |
| 33 | ~50 [1] | ~3 | ~320 | EMM-19# |

[1] - ZnO nanopowder, from Strem Chemicals, reported average crystallite size ≤10 nm
[2] - ZnO (99%), from Alfa Aesar, reported average particle size ~20 nm
[3] - ZnO NanoGard ™, from Alfa Aesar, reported average particle size ~67 nm
[4] - ZnO (99.99%), from Alfa Aesar, reported average particle size ~200 nm
[5] - ZnO (99.999%), from Aldrich, average particle size estimated by SEM to be ~200-500 nm, with a particle size distribution extending at least from ~50 nm to ~2 microns.
these EMM-19 products were substantially pure, as not even a trace of ZnO was detected; nevertheless, it should be noted that these products can more rigorously be characterized as having ≤3% ZnO as well.

Examples 16-17 and 26 yielded moderately impure EMM-19 with ~25%, ~23%, and ~23% of what appeared to be ZnO co-product, respectively. Examples 22-24 and 28 yielded relatively pure EMM-19 with only trace impurities (<3%, ~4%, ~4%, and ~6%, respectively) of what appeared to be ZnO co-product. Examples 18-21 and 30-33 yielded substantially pure EMM-19 product with no detectable co-products (~3% is believed to be the approximate detection limit for trace co-products to be detected using XRD techniques). Example 25 yielded only a ZnO impurity product, while Examples 27 and 29 yielded substantially no product.

FIGS. 21-24 compare the XRD patterns of certain EMM-19-containing products made using the linker exchange method from Example 2 against their corresponding EMM-19-containing products made using the solid metal oxide method from these Examples and the zinc oxide insoluble reactant source, the relative purity of EMM-9 in the solid metal oxide product can be distinguished from any unreacted ZnO, which would not be present in the linker exchange product. These Figures enabled quantitation of the ZnO contents of the respective Examples in Table 6. It should be noted that the linker exchange synthesis method appeared to have a roughly similar product purity to the synthesis method using relatively insoluble reactants, despite the vast differences in those respective preparations. Additionally, from inspecting these top spectra in FIGS. 21-24 carefully, one may notice that the XRD spectra of the relatively pure EMM-19 products appear to have peak shifts from the moderately impure EMM-19 product. Without being bound by theory, the fact that there is a simple peak shift can still indicate a relatively similar crystalline structure but can be attributed to differing unit cell dimensions in the EMM-19 product, which may be due to distortions within the unit cell (such as torsion of angle, $\alpha$, from ~90° to as much as ~108°).

From these Examples, we can conclude that the linker exchange method appears to successfully/adequately make desired ZIF product of useful purity at a higher ratio of IM component to metals source than using the relatively insoluble reactant method. Also, it is noted that the metal oxide materials are considerably cheaper than the ZIF reactants.

Examples 34-38

Comparison of Various EMM-19* and EMM-19 Materials

For Example 34, an EMM-19 product was reproduced according to the general procedure in Example 2 herein.

For Example 35, the EMM-19 product of Example 34 was solvent exchanged with acetonitrile according to the general activation procedure described in Example 2 herein and stored under acetonitrile.

For Example 36, the acetonitrile-exchanged EMM-19 product of Example was filtered to remove most of the acetonitrile and stored under $N_2$ for ~26 days to thus unexpectedly form EMM-19-STAR product. Table 7a, below left, details the precise XRD peak maxima in degrees two-theta and in d-spacing, with concomitant precise relative peak intensity, for the EMM-19-STAR ($N_2$ 26 days) sample according Example 36. Table 7b, below right, details acceptable ranges of XRD peak maxima in d-spacing only, with concomitant acceptable ranges of relative peak intensity, for the EMM-19-STAR ($N_2$ 26 days) sample according Example 36.

TABLE 7a

| 2-Theta | d spacing (Å) | Rel. intens. (%) |
|---|---|---|
| 7.33 | 12.056 | 26 |
| 8.08 | 10.933 | 100 |
| 10.87 | 8.132 | 18 |
| 12.14 | 7.284 | 13 |
| 13.56 | 6.524 | 13 |
| 13.98 | 6.330 | 24 |
| 14.60 | 6.063 | 5 |
| 16.20 | 5.466 | 39 |
| 16.69 | 5.309 | 51 |
| 18.69 | 4.744 | 7 |
| 19.51 | 4.546 | 5 |
| 20.30 | 4.372 | 23 |
| 21.90 | 4.055 | 14 |
| 23.37 | 3.804 | 2 |
| 24.26 | 3.666 | 7 |
| 28.70 | 3.108 | 3 |
| 33.10 | 2.704 | 4 |
| 34.70 | 2.583 | 4 |

TABLE 7b

| d spacing (Å) | Rel. intens. (%) |
|---|---|
| 12.3-11.8 | 10-40 |
| 11.1-10.7 | 60-100 |
| 8.25-8.02 | 5-30 |
| 7.37-7.20 | 5-30 |
| 6.60-6.45 | 5-30 |
| 6.40-6.26 | 10-40 |
| 6.13-6.00 | 0-20* |
| 5.52-5.42 | 20-70 |
| 5.36-5.26 | 30-80 |
| 4.78-4.71 | 0-20* |
| 4.58-4.51 | 0-10* |
| 4.40-4.34 | 10-40 |
| 4.08-4.03 | 5-30 |
| 3.83-3.78 | 0-10* |
| 3.69-3.64 | 0-20* |
| 3.12-3.09 | 0-10* |
| 2.716-2.692 | 0-10* |
| 2.594-2.572 | 0-10* |

*in some embodiments, one, some, or all these peaks can have non-zero intensities, e.g., ≥1.

For Example 37, the EMM-19-STAR product of Example 36 was activated in hot acetonitrile according to the general activation procedure detailed for EMM-19 material in Example 2 herein. Table 8a, below left, details the precise XRD peak maxima in degrees two-theta and in d-spacing, with concomitant precise relative peak intensity, for the EMM-19-STAR (MeCN regen) sample according Example 37. Table 8b, below right, details acceptable ranges of XRD peak maxima in d-spacing only, with concomitant acceptable ranges of relative peak intensity, for the EMM-19-STAR (MeCN regen) sample according Example 37.

TABLE 8a

| 2-Theta | d spacing (Å) | Rel. intens. (%) |
|---|---|---|
| 7.18 | 12.303 | 34 |
| 7.93 | 11.142 | 100 |
| 10.69 | 8.271 | 22 |
| 11.97 | 7.385 | 17 |
| 13.33 | 6.639 | 5 |
| 13.75 | 6.438 | 24 |
| 14.38 | 6.154 | 8 |
| 15.85 | 5.586 | 30 |
| 16.44 | 5.389 | 47 |
| 18.45 | 4.804 | 4 |
| 19.19 | 4.621 | 11 |
| 19.94 | 4.448 | 25 |
| 21.50 | 4.130 | 23 |
| 23.05 | 3.855 | 4 |
| 23.74 | 3.746 | 12 |
| 26.28 | 3.389 | 2 |
| 27.68 | 3.220 | 3 |
| 32.43 | 2.759 | 4 |
| 34.23 | 2.617 | 6 |

TABLE 8b

| d spacing (Å) | Rel. intens. (%) |
|---|---|
| 12.6-12.1 | 20-70 |
| 11.4-10.9 | 60-100 |
| 8.39-8.16 | 10-40 |
| 7.48-7.29 | 5-30 |
| 6.71-6.56 | 0-10* |
| 6.51-6.37 | 10-40 |
| 6.22-6.09 | 0-20* |
| 5.64-5.53 | 10-40 |
| 5.44-5.34 | 20-70 |
| 4.84-4.77 | 0-10* |
| 4.66-4.59 | 5-30 |
| 4.48-4.42 | 10-40 |
| 4.16-4.10 | 10-40 |
| 3.88-3.83 | 0-10* |
| 3.77-3.72 | 5-30 |
| 3.41-3.37 | 0-10* |
| 3.24-3.20 | 0-10* |
| 2.771-2.746 | 0-10* |
| 2.629-2.606 | 0-20* |

*in some embodiments, one, some, or all these peaks can have non-zero intensities, e.g., ≥1.

For Example 38, the activated EMM-19-STAR material of Example 37 was stored under acetonitrile for 11 months to produce the stored EMM-19-STAR product. Table 9a, below left, details the precise XRD peak maxima in degrees two-theta and in d-spacing, with concomitant precise relative peak intensity, for the EMM-19-STAR (MeCN stored) sample according Example 38. Table 9b, below right, details acceptable ranges of XRD peak maxima in d-spacing only, with concomitant acceptable ranges of relative peak intensity, for the EMM-19-STAR (MeCN stored) sample according Example 38.

TABLE 9a

| 2-Theta | d spacing (Å) | Rel. intens. (%) |
|---|---|---|
| 7.19 | 12.279 | 36 |
| 7.91 | 11.165 | 100 |
| 10.69 | 8.272 | 21 |
| 11.99 | 7.375 | 20 |
| 13.33 | 6.638 | 7 |
| 13.71 | 6.453 | 24 |
| 14.35 | 6.167 | 7 |
| 15.87 | 5.581 | 32 |
| 16.44 | 5.389 | 50 |
| 18.49 | 4.795 | 7 |
| 19.16 | 4.628 | 14 |
| 19.93 | 4.452 | 39 |
| 21.50 | 4.130 | 31 |
| 23.07 | 3.852 | 9 |
| 23.62 | 3.764 | 18 |
| 23.89 | 3.722 | 10 |
| 26.25 | 3.393 | 3 |
| 27.73 | 3.214 | 3 |
| 28.81 | 3.097 | 3 |
| 32.63 | 2.742 | 2 |
| 34.27 | 2.615 | 7 |

TABLE 9b

| d spacing (Å) | Rel. intens. (%) |
|---|---|
| 12.5-12.0 | 20-70 |
| 11.4-11.0 | 60-100 |
| 8.39-8.16 | 10-40 |
| 7.47-7.28 | 5-30 |
| 6.71-6.56 | 0-20* |
| 6.52-6.38 | 10-40 |
| 6.23-6.10 | 0-20* |
| 5.63-5.53 | 20-70 |
| 5.44-5.34 | 20-70 |
| 4.83-4.76 | 0-20* |
| 4.66-4.59 | 5-30 |
| 4.49-4.42 | 20-70 |
| 4.16-4.10 | 20-70 |
| 3.88-3.83 | 0-20* |
| 3.79-3.74 | 5-30 |
| 3.74-3.70 | 0-20* |
| 3.41-3.37 | 0-10* |
| 3.23-3.20 | 0-10* |
| 3.11-3.08 | 0-10* |

TABLE 9b-continued

| d spacing (Å) | Rel. intens. (%) |
|---|---|
| 2.754-2.730 | 0-10* |
| 2.626-2.604 | 0-20* |

*in some embodiments, one, some, or all these peaks can have non-zero intensities, e.g., ≥1.

Figure 25:
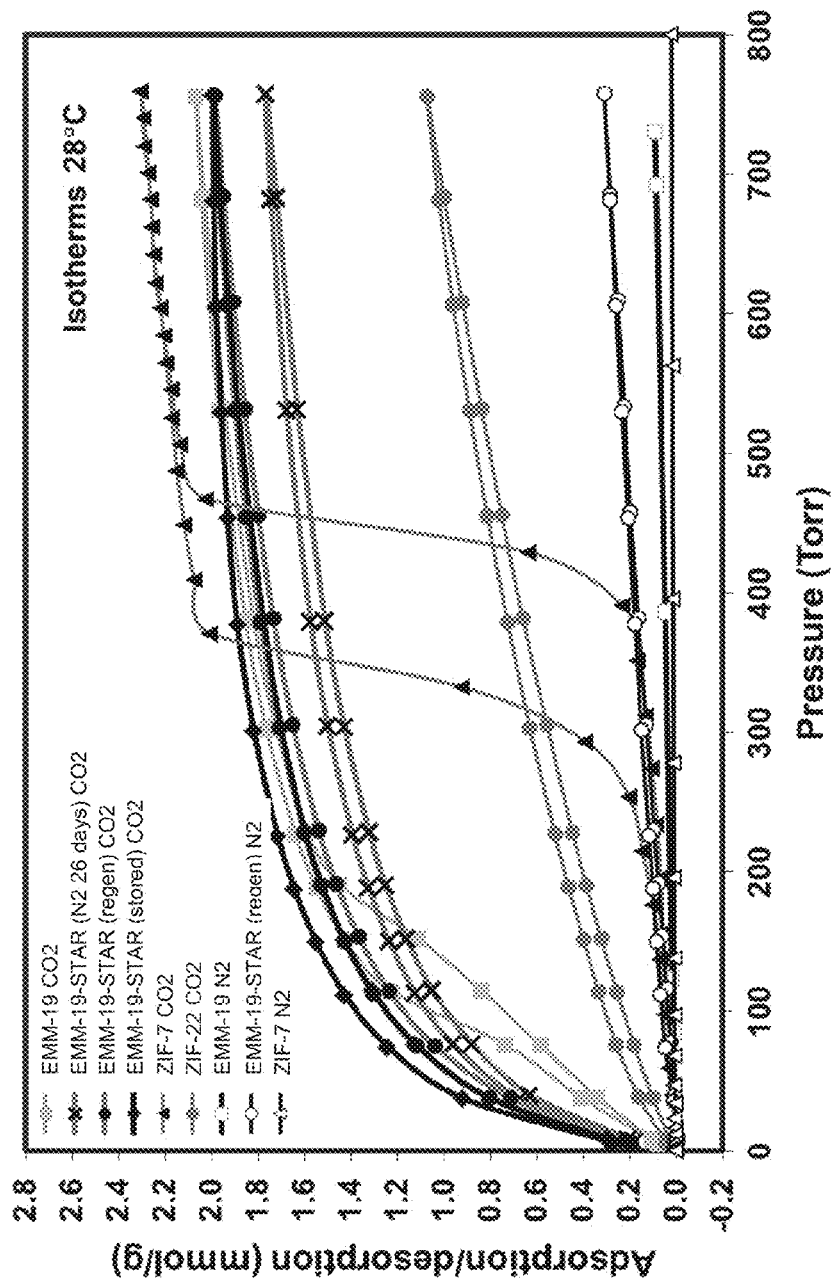
FIG. 25 shows $CO_2$ adsorption/desorption isotherms for ZIF-7, ZIF-22, EMM-19, and three different samples of EMM-19-STAR (Examples 36-38), as well as $N_2$ adsorption/desorption isotherms for ZIF-7, EMM-19, and EMM-19-STAR (Example 37).

XRD patterns of all five samples from Examples 34-38 are plot, top to bottom, offset from each other by an arbitrary value, in FIG. 25. Though both the EMM-19 and EMM-19-STAR materials possess SOD framework types, the various XRD spectra appear to have peak shifts from each other. Without being bound by theory, the fact that there is a simple peak shift without a corresponding alteration of framework type can be attributed to alteration of unit cell dimensions, which may be due to distortions within the unit cell. Such unit cell dimension alterations are shown in Table 10 below and assume a spacegroup of R-3m (166).

TABLE 10

| Example | a (Å) | α | Unit Cell Volume (Å³) | Unit Cell Volume Change compared to Example 34 (%) |
|---|---|---|---|---|
| 34 | 14.4 | 107.8° | 2430 | N/A |
| 35 | 13.9 | 106.2° | 2300 | −5.3 |
| 36 | 13.7 | 106.1° | 2180 | −10.3 |
| 37 | 13.9 | 106.3° | 2300 | −5.3 |
| 38 | 14 | 106.3° | 2300 | −5.3 |

Though the SOD framework is usually cubic, in the case of these Examples 34-38, the cubic unit cell appears to be highly distorted with the usually orthogonal angle, α, increasing from 90° to between about 106° and about 108°. It is noteworthy that the replacement of DMF with McCN between Examples 34 and 35 appeared to result in a ~5% contraction in the unit cell volume. It is further noteworthy that the removal of MeCN for an extended period (under nitrogen blanket) between Examples 35 and 36 appeared to result in an additional ~5% contraction in the unit cell volume. Only ~5% of the contraction appeared to return upon re-loading the ZIF of Example 36 with MeCN in Example 37, but it is not clear that this ~5% volume increase indicates reversibility of the additional contraction in nitrogen (due to the irreversibility of the effect on the $CO_2$ adsorption isotherm, as noted below). Substantially no change was observed in the unit cell parameters by the rather long term storage of the MeCN-loaded ZIF in MeCN (Example 38).

Figure 26:
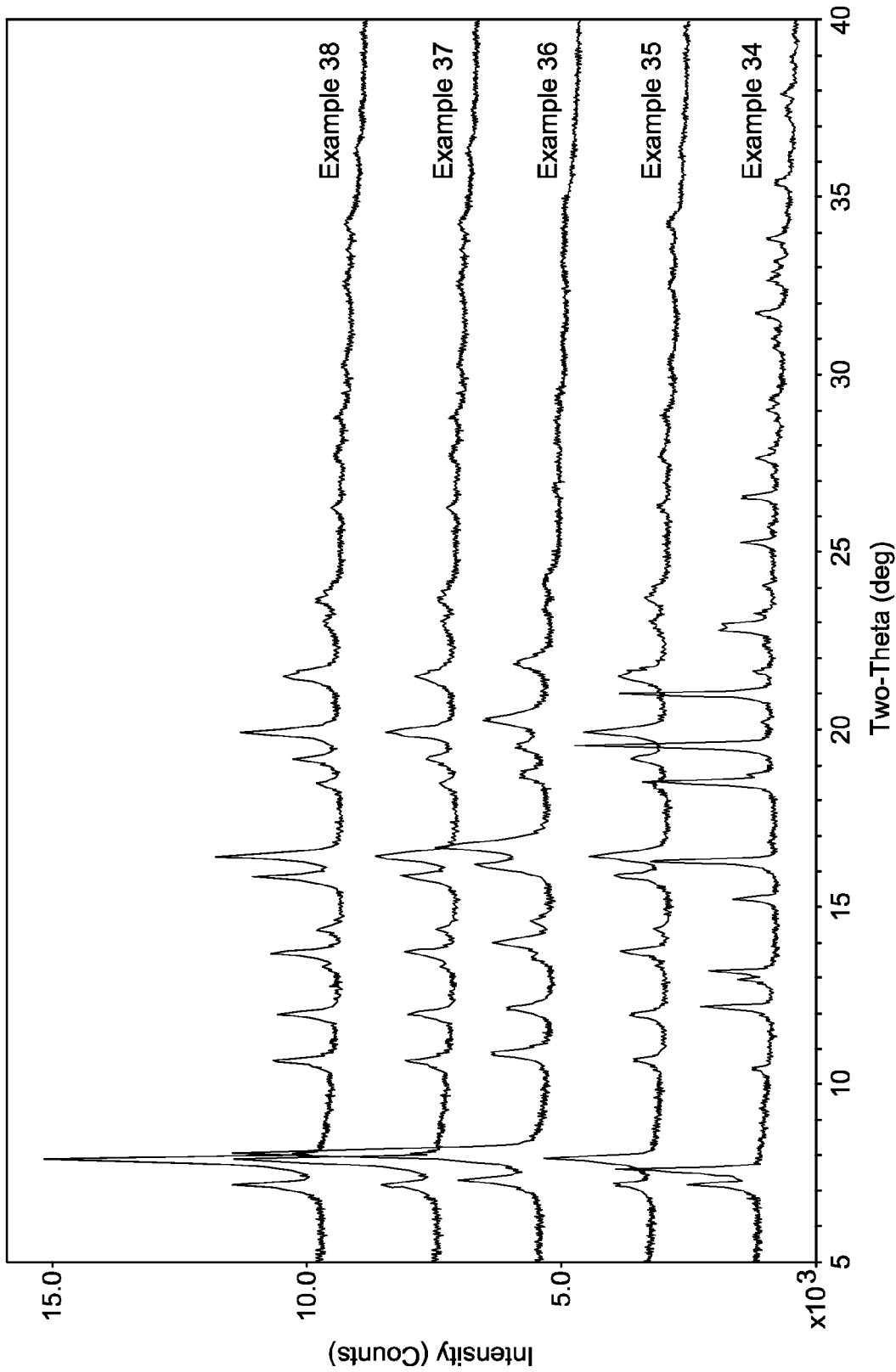
FIG. 26 is an overlay of the X-ray diffraction patterns of the products of Examples 34-38 (bottom to top).

Adsorption/Desorption isotherms for $CO_2$ and $N_2$ are shown in FIG. 26. The product of Example 35 ("EMM-19 CO2") appears to show a $CO_2$ isotherm with a Type V shape indicating an abrupt $CO_2$ uptake with a significant hysteresis (such as seen in the ZIF-7 product of Example 1), but at a lower $CO_2$ partial pressure. The product of Example 36 ("EMM-19-STAR (N2 26 days) CO2") appears to show a $CO_2$ isotherm having a markedly different shape from that of Example 35. The isotherm appears to have essentially no hysteresis and approximates a Type I isotherm. While the saturation $CO_2$ capacity appears to be lower than Example 36, the low partial pressure $CO_2$ adsorption appears to be higher. Also the $CO_2$ uptake does not appear to be accompanied by any structural change, due to the absence of an abrupt change in the $CO_2$ adsorption curve. The product of Example 37 ("EMM-19-STAR (regen) CO2") appears to show a $CO_2$ isotherm retaining its Type I shape and appears to show slightly improved $CO_2$ uptake capacity over Example 36 across the entire pressure range. The product of Example 38 ("EMM-19-STAR (stored) CO2") appears to show a $CO_2$ isotherm retaining the Type I shape and appears to show slightly improved $CO_2$ uptake capacity over Example 37 across the entire pressure range.

EMM-19-STAR materials appear to exhibit greatly enhanced low partial pressure $CO_2$ adsorption over ZIF-7, ZIF-22, and even EMM-19, especially in the region of interest for CCS (carbon capture and storage) of relatively low $CO_2$ content streams, e.g., exhibiting <120 Torr $CO_2$ partial pressure. It is not completely understood what the origin is of the shift from a Type V-like $CO_2$ isotherm of EMM-19 to a Type I-like $CO_2$ isotherm in EMM-19-STAR.

Nevertheless, without being bound by theory, it is possible that some chemical moiety, perhaps water, could be trapped within the ZIF pore structure and somewhat strongly associated with the ZIF, because extreme care was not taken to remove all traces of it by glove box handling and/or anhydrous reactants/preparation. Upon elimination of solvent molecules (DMF, MeCN) and storage in an inert environment (such as under a blanket of nitrogen gas) for a sufficiently long period of time, it is possible for there to be a driving force for the moiety to escape from the framework, thus locking in a relatively inelastic crystalline structure (EMM-19-STAR) that cannot easily revert to the relatively elastic crystalline structure (EMM-19). Additionally or alternately, it is possible that the absence of moderately to strongly interacting chemical moieties within the ZIF structure can allow or encourage the imidazolate components to wiggle or rotate into a particularly stable conformation. Although it is possible that this unit cell distortion phenomenon can be applied to many SOD framework type materials and/or to many ZIFs/MOFs exhibiting Type V-like $CO_2$ isotherms, this phenomenon has not, to date, been observed in ZIF-7 (also SOD) or other ZIF materials.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A zeolitic imidazolate framework composition with the SOD framework type, wherein the zeolitic imidazolate framework structure is capable of sorbing, at a temperature of ~28° C.: (i) at least 0.60 mmol of $CO_2$ per gram of zeolitic imidazole framework composition at a $CO_2$ partial pressure of ~75 Torr; (ii) at least 0.75 mmol of $CO_2$ per gram of zeolitic imidazole framework composition at a $CO_2$ partial pressure of ~100 Torr; (iii) at least 1.15 mmol of $CO_2$ per gram of zeolitic imidazole framework composition at a $CO_2$ partial pressure of ~200 Torr; and/or (iv) at least 0.35 mmol of $CO_2$ per gram of zeolitic imidazole framework composition at a $CO_2$ partial pressure of ~39 Torr.

2. A zeolitic imidazolate framework composition having the empirical formula, Zn(5-azabenzimidazolate)$_2$, wherein the zeolitic imidazolate framework structure is capable of sorbing, at a temperature of ~28° C.: (i) at least 0.60 mmol of $CO_2$ per gram of zeolitic imidazole framework composition at a $CO_2$ partial pressure of ~75 Torr; (ii) at least 0.75 mmol of $CO_2$ per gram of zeolitic imidazole framework composition at a $CO_2$ partial pressure of ~100 Torr; (iii) at least 1.15 mmol of $CO_2$ per gram of zeolitic imidazole framework composition at a $CO_2$ partial pressure of ~200 Torr; and/or (iv) at least 0.35 mmol of $CO_2$ per gram of zeolitic imidazole framework composition at a $CO_2$ partial pressure of ~39 Torr.

3. A porous crystalline material having the empirical formula Zn(5-azabenzimidazolate)$_2$, exhibiting an SOD framework type, and exhibiting an x-ray diffraction pattern with peaks defined by the d-spacing ranges and relative intensity ranges described in Table 1b.

4. A porous crystalline material having the empirical formula Zn(5-azabenzimidazolate)$_2$, exhibiting an SOD framework type, and exhibiting an x-ray diffraction pattern with peaks defined by the d-spacing ranges and relative intensity ranges described in Table 1d.

5. A porous crystalline material having the empirical formula Zn(5-azabenzimidazolate)$_2$, exhibiting an SOD framework type, and exhibiting an x-ray diffraction pattern with peaks defined by the d-spacing ranges and relative intensity ranges described in Table 7b.

6. A porous crystalline material having the empirical formula Zn(5-azabenzimidazolate)$_2$, exhibiting an SOD framework type, and exhibiting an x-ray diffraction pattern with peaks defined by the d-spacing ranges and relative intensity ranges described in Table 8b.

7. A porous crystalline material having the empirical formula Zn(5-azabenzimidazolate)$_2$, exhibiting an SOD framework type, and exhibiting an x-ray diffraction pattern with peaks defined by the d-spacing ranges and relative intensity ranges described in Table 9b.

8. A method of adsorbing a gas comprising contacting the gas with the porous crystalline material of claim 3.

9. The method of claim 8, wherein the gas is hydrogen, nitrogen, oxygen, a noble gas, carbon monoxide, carbon dioxide, sulfur dioxide, sulfur trioxide, hydrogen sulfide, ammonia, a hydrocarbon or an amine.

10. A method of separating a gas from a fluid stream containing the gas comprising contacting the fluid stream with the porous crystalline material of claim 3.

11. The method of claim 10, wherein the gas is hydrogen, nitrogen, oxygen, a noble gas, carbon monoxide, carbon dioxide, sulfur dioxide, sulfur trioxide, hydrogen sulfide, ammonia, a hydrocarbon or an amine.

12. A method of adsorbing a gas comprising contacting the gas with the porous crystalline material of claim 4.

13. The method of claim 12, wherein the gas is hydrogen, nitrogen, oxygen, a noble gas, carbon monoxide, carbon dioxide, sulfur dioxide, sulfur trioxide, hydrogen sulfide, ammonia, a hydrocarbon or an amine.

14. A method of separating a gas from a fluid stream containing the gas comprising contacting the fluid stream with the porous crystalline material of claim 4.

15. The method of claim 14, wherein the gas is hydrogen, nitrogen, oxygen, a noble gas, carbon monoxide, carbon dioxide, sulfur dioxide, sulfur trioxide, hydrogen sulfide, ammonia, a hydrocarbon or an amine.

16. A method of adsorbing a gas comprising contacting the gas with the porous crystalline material of claim 5.

17. The method of claim 16, wherein the gas is hydrogen, nitrogen, oxygen, a noble gas, carbon monoxide, carbon dioxide, sulfur dioxide, sulfur trioxide, hydrogen sulfide, ammonia, a hydrocarbon or an amine.

18. A method of separating a gas from a fluid stream containing the gas comprising contacting the fluid stream with the porous crystalline material of claim 5.

19. The method of claim 18, wherein the gas is hydrogen, nitrogen, oxygen, a noble gas, carbon monoxide, carbon dioxide, sulfur dioxide, sulfur trioxide, hydrogen sulfide, ammonia, a hydrocarbon or an amine.

20. A method for forming a zeolitic imidazolate framework composition, said method comprising the steps of: (a) mixing together a reaction medium, a source of aimidazolate or a substituted imidazolate reactant, IM, and a reactant source of metals $M^1$ and $M^2$ to form a synthesis mixture, wherein $M^1$ and $M^2$ comprise the same or different metal cations, at least one of which reactants is relatively insoluble in the reaction medium itself and in the synthesis mixture; (b) maintaining the synthesis mixture having at least one relatively insoluble reactant under conditions sufficient to form a zeolitic imidazolate framework composition having a tetrahedral framework comprising a general structure, $M^1$-IM-$M^2$; and (c) treating the zeolitic imidazolate framework composition under conditions sufficient to stably reduce its unit cell volume.

21. The method according to claim 20, wherein the zeolitic imidazolate framework composition product has a framework type that is different from the framework type obtained when a zeolitic imidazolate framework composition is prepared by crystallizing substantially soluble sources of $M^1$, $M^2$ and IM in the same reaction medium.

22. The method according to claim 20, wherein the zeolitic imidazolate framework composition product exhibits a framework type selected from the group consisting of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAG, CAN, CAS, CDO, CFI, CGF, CGS, CHA, CHI, CLO, CON, CRB, CZP, DAC, DDR, DFO, DFT, DIA, DOH, DON, EAB, EDI, EMT, EON, EPI, ERI, ESV, ETR, EUO, EZT, FAR, FAU, FER, FRA, FRL, GIS, GIU, GME, GON, GOO, HEU, IFR, IHW, ISV, ITE, ITH, ITW, IWR, IWV, IWW, JBW, KFI, LAU, LCS, LEV, LIO, LIT, LOS, LOV, LTA, LTL, LTN, MAR, MAZ, MEI, MEL, MEP, MER, MFI, MFS, MON, MOR, MOZ, MSE, MSO, MTF, MTN, MTT, MTW, MWW, NAB, NAT, NES, NON, NPO, NSI, OBW, OFF, OSI, OSO, OWE, PAR, PAU, PHI, PON, POZ, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SIV, SOD, SOS, SSY, STF, STI, STT, SZR, TER, THO, TON, TSC, TUN, UEI, UFI, UOZ, USI, UTL, VET, VFI, VNI, VSV, WEI, WEN, YUG, ZNI, ZON, and combinations thereof.

23. The method according to claim 20, wherein the zeolitic imidazole framework composition product exhibits a framework type selected from the group consisting of CRB, DFT, CAG, SOD, MER, RHO, ANA, LTA, DIA, ZNI, GME, LCS, FRL, GIS, POZ, MOZ, and combinations thereof.

24. The method according to claim 20, wherein the reaction medium comprises N,N-dimethylformamide (DMF), N,N-diethylformamide (DEF), N,N-dimethylacetamide (DMAc), 1,3-dimethylpropyleneurea (DMPU), a sulfoxide, a phosphoramide, acetonitrile (MeCN), triethylamine (TEA), or a combination thereof.

25. The method according to claim 20, wherein the metals are selected from the group consisting of Be, Mg, Ca, Sr, Ba, Ra, Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, Uub, and combinations thereof.

26. The method according to claim 20, wherein the imidazolate or substituted imidazolate, IM, is selected from the group consisting of IV, V, VI, or any combination thereof:

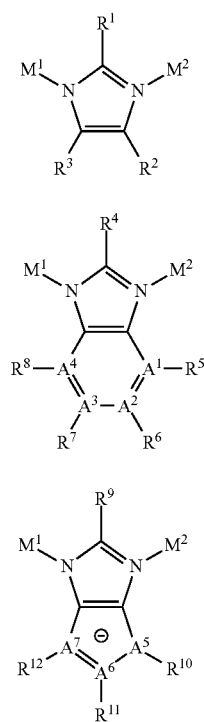

(IV)

(V)

(VI)

wherein $A^1$, $A^2$, $A^3$ and $A^4$ are selected from a group of elements consisting of C, N, P, and B, wherein $A^5$, $A^6$, and $A^7$ can be either C or N, wherein $R^5$-$R^8$ are present when $A^1$ to $A^4$ comprise C, wherein $R^1$, $R^4$ or $R^9$ comprise a non-sterically hindering group that does not interfere with the adjacent $M^1$ or $M^2$, wherein $R^2$, $R^3$, $R^5$, $R^6$, $R^7$, and $R^8$ are each individually hydrogen, alkyl, halo, cyano, or nitro, wherein $M^1$ and $M^2$ comprise the same or different metal cation, and wherein $R^{10}$, $R^{11}$, and $R^{12}$ are each individually electron withdrawing groups.

27. The method according to claim 26, wherein the imidazolate or substituted imidazolate, IM, is selected from the group consisting of VII, VIII, IX, X, XI, XII, XIII, XIV, XV, XVI, XVII, and/or XVIII:

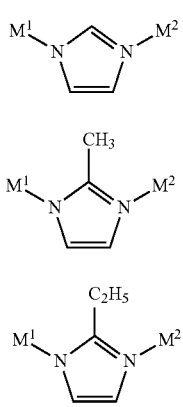

(VII)

(VIII)

(IX)

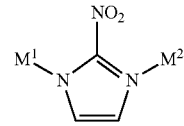

(X)

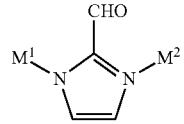

(XI)

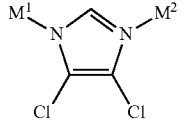

(XII)

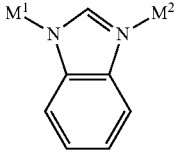

(XIII)

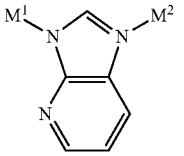

(XIV)

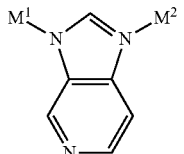

(XV)

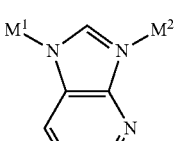

(XVI)

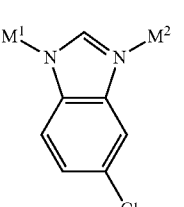

(XVII)

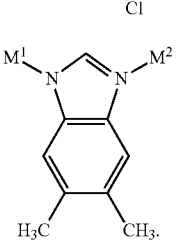

(XVIII)

28. The method according to claim 27, wherein the imidazolate or substituted imidazolate, IM, comprises the structure of formula XV.

29. The method according to claim 20, wherein the sufficient conditions for the maintaining step comprise a contact/crystallization time from 1 hour to 10 days, a temperature from about −78° C. to the boiling point of the reaction medium, and a reaction pressure from about 1 kPaa to about 10 MPaa.

30. The method according to claim 20, wherein the sufficient conditions comprise a contact/crystallization time from 12 hours to 7 days, a temperature from about 15° C. to about 150° C., and a reaction pressure from about 100 kPaa to about 10 MPaa.

31. The method according to claim 20, wherein the imidazolate or substituted imidazolate, IM, is 5-azabenzimidazolate, and wherein the zeolitic imidazolate framework composition has an SOD framework type.

32. The method according to claim 20, wherein the conditions sufficient for the treatment step comprise removing the reaction medium and introducing an inert gas for a continuous period of at least 10 days.

* * * * *